United States Patent
Kim

(10) Patent No.: US 10,558,322 B2
(45) Date of Patent: Feb. 11, 2020

(54) METHOD AND APPARATUS FOR DISPLAYING OBJECTS AND A BACKGROUND IMAGE ON A DISPLAY SCREEN

(71) Applicant: Samsung Electronics Co., Ltd., Gyeonggi-do (KR)

(72) Inventor: Myeong-ho Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 288 days.

(21) Appl. No.: 14/954,156

(22) Filed: Nov. 30, 2015

(65) Prior Publication Data
US 2016/0163052 A1    Jun. 9, 2016

(30) Foreign Application Priority Data
Dec. 8, 2014  (KR) .................... 10-2014-0175373

(51) Int. Cl.
*G06F 3/048*   (2013.01)
*G06F 3/0481*  (2013.01)
(Continued)

(52) U.S. Cl.
CPC ........ *G06F 3/04817* (2013.01); *G06F 3/0482* (2013.01); *G06F 3/0483* (2013.01); *G06F 3/04842* (2013.01); *G06F 3/04845* (2013.01); *G06T 3/40* (2013.01); *G06T 2207/30201* (2013.01)

(58) Field of Classification Search
None
See application file for complete search history.

(56) References Cited

U.S. PATENT DOCUMENTS 5,841,420 A * 11/1998 Kaply ................... G06F 3/0481
                                                         345/421
6,097,389 A *  8/2000 Morris .................. G06F 3/0483
                                                         715/804
(Continued)

FOREIGN PATENT DOCUMENTS

CN      105830007 A    8/2016
EP      2 983 074 A1   2/2016
(Continued)

OTHER PUBLICATIONS

"Key keyboard shortcuts to save you time (selecting files with Windows 7)", http://www.speakeasysolutions.com/blog/2009/11/30/key-keyboard-shortcuts-to-save-you-time-selecting-files-with-windows7/, Nov. 30, 2009, 9 pages (Year: 2009).*
(Continued)

*Primary Examiner* — Andrey Belousov
*Assistant Examiner* — Haimei Jiang
(74) *Attorney, Agent, or Firm* — Cha & Reiter, LLC.

(57) ABSTRACT

An electronic device includes a display unit and a control unit configured to detect a first object included in a background image, determine a first region corresponding to the first object, change an arrangement form of second objects related to the background image based on the first region, and control the display unit to display the second objects such in correspondence to the changed arrangement form.

23 Claims, 69 Drawing Sheets

(51) Int. Cl.
  *G06F 3/0483* (2013.01)
  *G06F 3/0484* (2013.01)
  *G06F 3/0482* (2013.01)
  *G06T 3/40* (2006.01)

(56) References Cited

U.S. PATENT DOCUMENTS

| | | | | |
|---|---|---|---|---|
| 6,300,947 | B1* | 10/2001 | Kanevsky | G06F 17/30905 |
| | | | | 707/E17.121 |
| 6,760,048 | B1* | 7/2004 | Bates | G06F 3/0481 |
| | | | | 715/781 |
| 8,359,541 | B1* | 1/2013 | Landry | G06F 3/0481 |
| | | | | 345/620 |
| 8,943,426 | B2* | 1/2015 | Lu | G06F 3/04817 |
| | | | | 382/190 |
| 9,373,308 | B2* | 6/2016 | Ohba | G09G 5/00 |
| 2006/0086022 | A1* | 4/2006 | Would | G06F 3/0482 |
| | | | | 40/584 |
| 2008/0098326 | A1 | 4/2008 | Kanzaki | |
| 2009/0262139 | A1 | 10/2009 | Tanaka et al. | |
| 2010/0295789 | A1 | 11/2010 | Shin et al. | |
| 2011/0148917 | A1* | 6/2011 | Alberth, Jr. | G09G 5/14 |
| | | | | 345/629 |
| 2013/0135234 | A1* | 5/2013 | Hisano | G06F 3/017 |
| | | | | 345/173 |
| 2013/0305187 | A1* | 11/2013 | Phillips | G06F 3/04817 |
| | | | | 715/800 |
| 2013/0332886 | A1* | 12/2013 | Cranfill | G06F 3/0482 |
| | | | | 715/835 |
| 2014/0013271 | A1* | 1/2014 | Moore | G06F 3/0482 |
| | | | | 715/792 |
| 2014/0068477 | A1 | 3/2014 | Roh | |
| 2014/0165006 | A1* | 6/2014 | Chaudhri | G06F 3/04817 |
| | | | | 715/835 |
| 2015/0054978 | A1* | 2/2015 | Shibagami | G02B 7/365 |
| | | | | 348/222.1 |
| 2016/0154541 | A1* | 6/2016 | Brown | G06F 3/0481 |
| | | | | 715/794 |
| 2016/0284321 | A1 | 9/2016 | Cho | |

FOREIGN PATENT DOCUMENTS

| | | |
|---|---|---|
| KR | 10-2014-0031036 A | 3/2014 |
| WO | 2014/112852 A1 | 7/2014 |

OTHER PUBLICATIONS

International Search Report dated Apr. 14, 2016.
European Search Report dated May 2, 2016.
European Search Report dated May 19, 2016.
Chinese Search Report dated Apr. 18, 2018.

* cited by examiner (a)

METHOD AND APPARATUS FOR DISPLAYING OBJECTS AND A BACKGROUND IMAGE ON A DISPLAY SCREEN

CLAIM OF PRIORITY

This application claims the benefit of Korean Patent Application No. 10-2014-0175373, filed on Dec. 8, 2014, in the Korean Intellectual Property Office, the disclosure of which is incorporated herein in its entirety by reference.

BACKGROUND

1. Field of the Disclosure

The present disclosure relates to electronic devices, in general, and more particularly to a method and apparatus for rearranging objects.

2. Description of the Related Art

When objects such as icons, widgets, and the like are arranged in a background image displayed on an electronic device, a user may manipulate the electronic device to arrange the objects at desired locations. Alternatively, when a plurality of icons exist in a background image of a home screen of the electronic device, the electronic device may orderly arrange the plurality of icons according to a certain criterion.

However, if objects are continuously added to the background image, the objects continuously accumulate on the home screen. Accordingly, when many objects exist on the home screen, the objects cover the background image, and thus, the user may not view a desired portion of the background image. In order for objects not to hide the desired portion of the background image, the user has to manually arrange the objects at other locations.

SUMMARY

According to aspects of the disclosure, an electronic device is provided comprising: a memory; a display unit for displaying a background image; and at least one processor operatively coupled to the memory, configured to: identify a first object depicted in the background image, identify a first region corresponding to the first object, and relocate a second object that overlaps with the first region.

According to aspects of the disclosure, a method is provided comprising: displaying, by an electronic device, a background image; identifying, by the electronic device, a first object depicted in the background image; identifying, by the electronic device, a first region corresponding to the first object; and relocating, by the electronic device, a second object that overlaps with the first region.

BRIEF DESCRIPTION OF THE DRAWINGS

These and/or other aspects will become apparent and more readily appreciated from the following description of various embodiments, taken in conjunction with the accompanying drawings in which.

DETAILED DESCRIPTION

Figure 1:
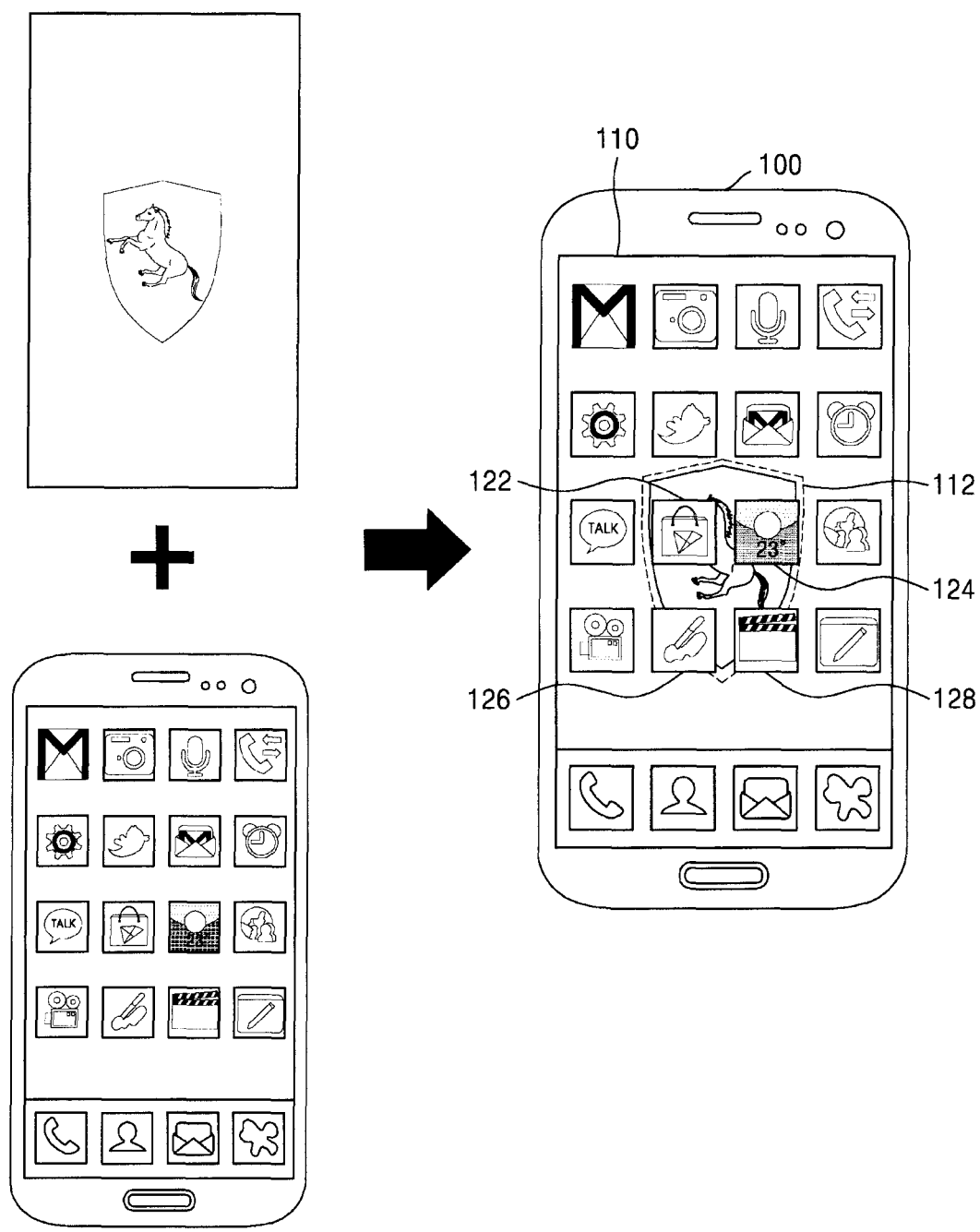
FIG. 1 is a diagram of an example of a user interface, according to aspects of the disclosure.

Advantages and features of the inventive concept and a method for achieving them will be clear with reference to the accompanying drawings, in which embodiments of the inventive concept are shown. The inventive concept may, however, be embodied in many different forms and should not be construed as being limited to the embodiments set forth herein; rather, these embodiments are provided so that this disclosure will be thorough and complete and will fully convey the concept of the inventive concept to those of ordinary skill in the art, and the inventive concept is defined by the scope of claims.

The terms used in the specification will be schematically described, and then, the inventive concept will be described in detail.

Although general current terms have been used to describe the inventive concept based on the functions in the inventive concept, the terms may vary according to the intention of one of ordinary skill in the art, case precedents, and the appearance of new technology. In addition, in specific situations, terms selected by the applicant may be used, and in these situations, the meaning of these terms will be disclosed in corresponding descriptions of the specification. Accordingly, the terms used in the specification to describe the inventive concept are defined not by their simple names but by their meanings in the context of the inventive concept.

In the specification, an expression in the singular includes an expression in the plural unless they are clearly different from each other in context.

In the specification, when a certain part "includes" a certain component, this indicates that the part may further include another component instead of excluding the other component unless there is different disclosure. In addition, a term such as " . . . unit" disclosed in the specification indicates a component including software or hardware, such as a Field Programmable Gate Array (FPGA) or an Application-Specific Integrated Circuit (ASIC), and the " . . . unit" performs certain roles. However, the " . . . unit" is not limited to software or hardware. The " . . . unit" may be configured to be included in an addressable storage medium or to reproduce one or more processors. Therefore, for example, the " . . . unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and " . . . units" may combine them into a smaller number of components and " . . . units" or further divide them into additional components and " . . . units".

In the specification, the term "application" indicates a series of computer program codes designed to perform a specific task. Various applications may be described in the specification. For example, the applications may include a call application, a message application, a social network service (SNS) application, a game application, a video replay application, a map application, a memo application, a broadcast application, an exercise support application, a payment application, a photograph editing application, and the like but are not limited thereto.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. In the drawings, parts irrelevant to the description are omitted to clearly describe the inventive concept As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a case where both a background image 110 and at least one object corresponding to at least one application are displayed on an electronic device 100.

In detail, the electronic device 100 may display the background image 110. For example, the background image 110 may be a desktop, wallpaper or the like displayed as a background of the electronic device 100, and the background image 110 displayed on the electronic device 100 may be displayed as a background of an application drawer and the like, or background images other than the background image 110 may be displayed for the application drawer and the like. In addition, the background image 110 may be displayed identically or differently displayed on each of a plurality of pages such as a home screen and the like of the electronic device 100 or uniquely displayed all over the plurality of pages. Hereinafter, for convenience of description, a case where the same background image is displayed on the home screen and each page of the electronic device 100 will be described as an example, but the scope of the inventive concept is not limited thereto, and it could be understood the example is applicable to an arbitrary case where the background image 110 and a second object corresponding to at least one application are displayed. For example, the electronic device 100 may display a second object corresponding to at least one application on the background image 110. Herein, the second object may be an icon or widget indicating the at least one application but is not limited thereto. That is, the second object may be an arbitrary object related to the at least one application, which is displayed on a screen of the electronic device 100. Hereinafter, for convenience of description, an icon indicating an application will be described as an example. The background image 110 may be an image file having no pattern but may include at least one of arbitrary objects such as a matter, a person, a figure, and a character (hereinafter, referred to as "first object"). A user of the electronic device 100 may display such an arbitrary object on the background of the electronic device 100 according to a taste of the user. However, when the number of second objects on the home screen increases, the second objects may cover at least one first object included in the background image 110. According to one embodiment, a first object 112 included in the background image 110 displayed by the electronic device 100 cannot be viewed since the first object 112 is hidden by second objects 122, 124, 126, and 128. In this case, an arrangement of the second objects 122, 124, 126, and 128 needs to be changed in correspondence with the first object 112.

Figure 2:
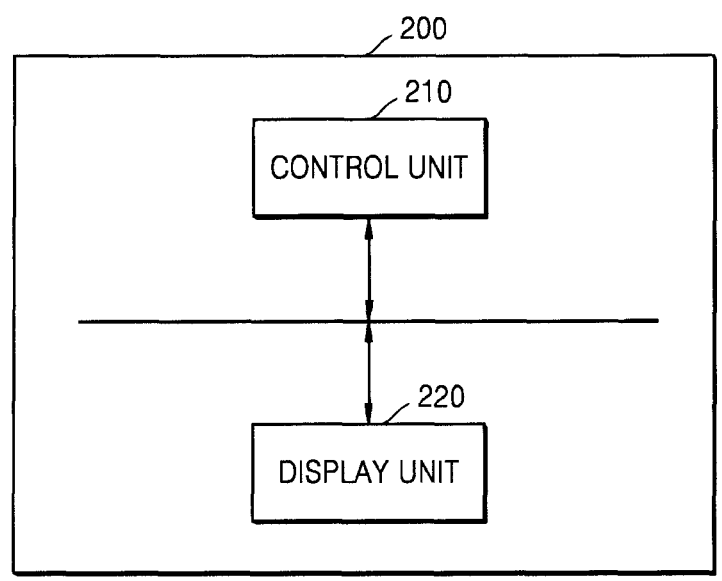
FIG. 2 is a diagram of an example of an electronic device, according to aspects of the disclosure.

FIG. 2 illustrates a block diagram of an electronic device 200 according to an embodiment. The electronic device 200 may include a control unit 210 and a display unit 220.

The control unit 210 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. According to one embodiment, the control unit 210 may control the display unit 220 to display a second object including an icon, a widget, or the like indicating at least one application to be used in the electronic device 200, and to display a background image as a background of a screen on which the second object is displayed.

According to one embodiment, the control unit 210 may detect at least one first object included in the background image from the background image. The control unit 210 may determine a first region corresponding to the detected at least one first object. For example, the control unit 210 may determine, as the first region, a region including an arrangeable space of second objects that overlaps the detected at least one first object.

According to one embodiment, the control unit 210 may change an arrangement of the second objects based on the determined first region and control the display unit 220 to display the second objects in the changed arrangement.

Figure 3:
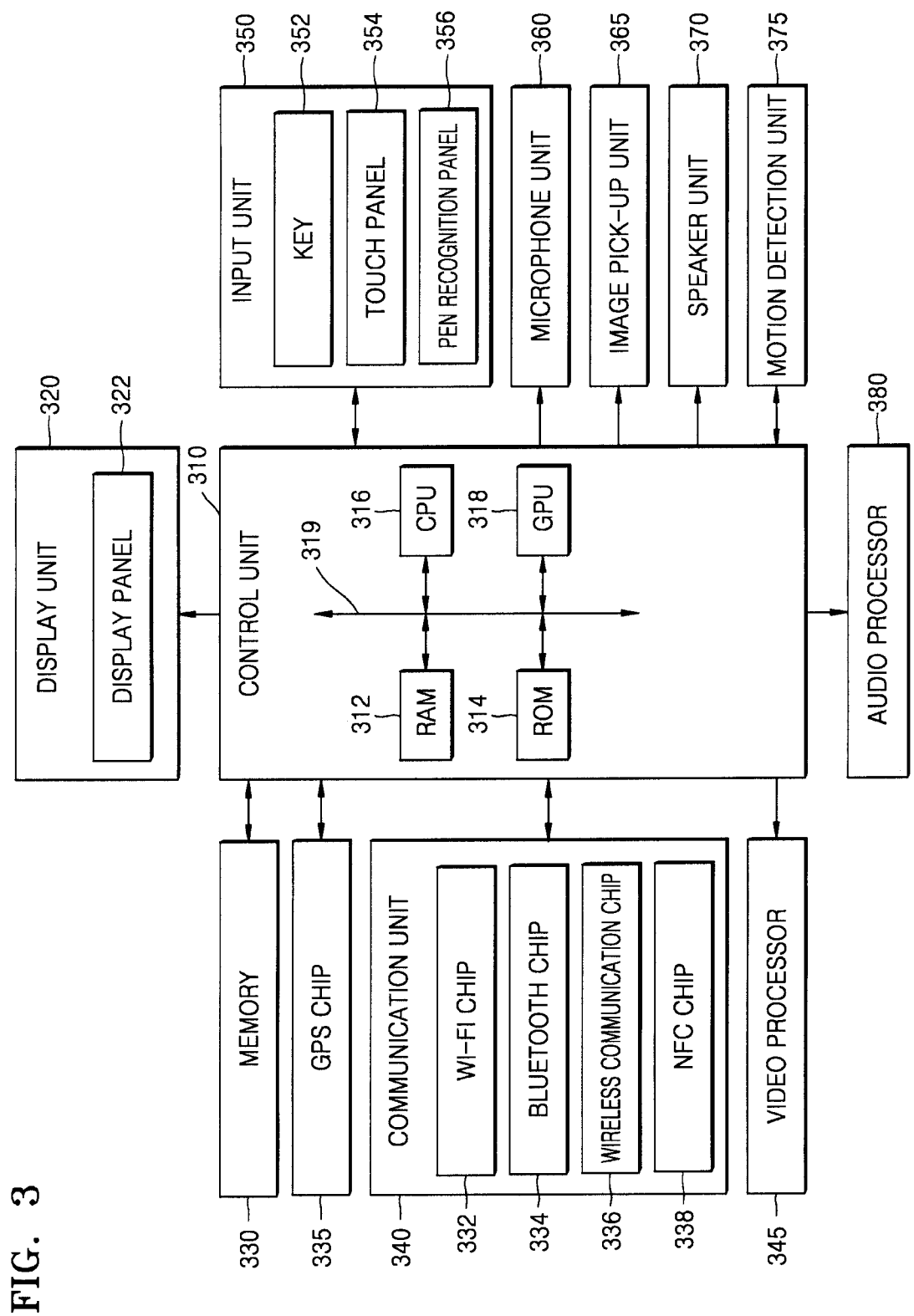
FIG. 3 is a diagram of an example of an electronic device, according to aspects of the disclosure.

FIG. 3 illustrates a block diagram for describing the electronic device 200 shown in FIG. 2. The electronic device 200 may include at least one of a display unit 320, a control unit 310, a memory 330, a global positioning service (GPS) chip 335, a communication unit 340, a video processor 345, an audio processor 380, an input unit 350, a microphone unit 360, an image pick-up unit 365, a speaker unit 370, a motion detection unit 375. The display unit 320 may include a display panel 322 and a controller (not shown) configured to control the display panel 322. The display unit 320 of FIG. 3 may correspond to the display unit 220 of FIG. 2. The display panel 322 may be implemented by various types of displays such as a liquid crystal display (LCD), an organic light-emitting diode (OLED) display, an active-matrix OLED (AM-OLED) display, a plasma display panel (PDP), and the like. The display panel 322 may be implemented to be flexible, transparent, or wearable. The display panel 322 may be coupled to a touch panel 354 of the input unit 350 to be provided as a touchscreen (not shown). For example, the touchscreen may include an integrated module having a stacked structure of the display panel 322 and the touch panel 354.

The memory 330 may include at least one of an internal memory (not shown) and an external memory (not shown).

The internal memory may include at least one of a volatile memory (e.g., dynamic random access memory (DRAM), static RAM (SRAM), synchronous dynamic RAM (SDRAM), or the like), a nonvolatile memory (e.g., one time programmable read only memory (OTPROM), programmable ROM (PROM), erasable programmable ROM (EPROM), electrically EPROM (EEPROM), mask ROM, flash ROM, or the like), a hard disk drive (HDD), a solid-state drive (SSD)), and/or remote storage (e.g., a network-accessible storage (NAS), cloud storage, a File Transfer Protocol (FTP) server, or the like). According to one embodiment, the control unit 310 may load, to the volatile memory, a command or data received from at least one of the nonvolatile memory and the other components and process the loaded command or data. In addition, the control unit 310 may store data received from or generated by another component of the nonvolatile memory.

The external memory may include, for example, at least one of a compact flash (CF) memory, a secure digital (SD) memory, a micro-SD memory, a mini-SD memory, an extreme digital (xD) memory, and a memory stick.

The memory 330 may store various kinds of programs and data to be used for an operation of the electronic device 200. For example, the memory 330 may temporarily or semi-permanently store at least a portion of content to be displayed on a lock screen image.

The control unit 310 may control the display unit 320 to display a portion of the content stored in the memory 330 thereon. In other words, the control unit 310 may display a portion of the content stored in the memory 330 on the display unit 320. The control unit 310 of FIG. 3 may correspond to the control unit 210 of FIG. 2.

The control unit 310 may include at least one of a RAM 312, a ROM 314, a central processing unit (CPU) 316, a graphic processing unit (GPU) 318, and a bus 319. The RAM 312, the ROM 314, the CPU 316, the GPU 318, and the like may be connected to each other via the bus 319.

The CPU 316 may access the memory 330 to boot the electronic device 200 by using an operating system (OS) stored in the memory 330. In addition, the CPU 316 may perform various operations by using various kinds of programs, content, data and the like stored in the memory 330.

The ROM 314 stores a command set and the like for system booting. For example, when a turn-on command is input to supply power to the electronic device 200, the CPU 316 may copy the OS stored in the memory 330 to the RAM 312 according to instructions stored in the ROM 314 and execute the OS to boot the system. If the booting is completed, the CPU 316 may copy various programs stored in the memory 330 to the RAM 312 and execute the copied programs to perform various operations. The GPU 318 may display a user interface (UI) image in a region of the display unit 320 if the electronic device 200 is completely booted. In detail, the GPU 318 may generate a screen image in which an electronic document including various objects such as content, icons, menus, and the like is displayed. The GPU 318 may compute attribute values such as a coordinate value, a shape, a size, a color, and the like of each of the objects to be displayed according to a layout of the screen. In addition, the GPU 318 may generate screen images having various layouts, which include objects, based on the computed attribute values. The screen images generated by the GPU 318 may be provided to the display unit 320 and displayed in respective regions of the display unit 320.

The GPS chip 335 may calculate a current location of the electronic device 200 by receiving GPS signals from GPS satellites. The control unit 310 may calculate a location of a user by using the GPS chip 335 when the user uses a navigation program or when a current location of the user is necessary.

The communication unit 340 may communicate with various types of external devices according to various types of communication schemes. The communication unit 340 may include at least one of a Wi-Fi chip 332, a Bluetooth chip 334, a wireless communication chip 336, and a near-field communication (NFC) chip 338. The control unit 310 may communicate with various types of external devices by using the communication unit 340.

The Wi-Fi chip 332 and the Bluetooth chip 334 may perform communication in a Wi-Fi scheme and a Bluetooth scheme, respectively. When the Wi-Fi chip 332 or the Bluetooth chip 334 is used, various kinds of information may be transmitted and received by first transmitting and receiving various kinds of connection information such as a service set identifier (SSID), a session key, and the like and then connecting communication using the connection information. The wireless communication chip 336 indicates a chip configured to perform communication according to various communication standards such as the Institute of Electrical and Electronics Engineers (IEEE), ZigBee, third generation (3G), long-term evolution (LTE), and the like. The NFC chip 338 indicates a chip operating in an NFC scheme using a 13.56 MHz band among various radio frequency identification (RF-ID) frequency bands such as 135 KHz, 13.56 MHz, 433 MHz, 860 to 960 MHz, 2.45 GHz, and the like.

The video processor 345 may process video data included in content received via the communication unit 340 or stored in the memory 330. The video processor 345 may perform various kinds of image processing such as decoding, scaling, noise filtering, frame rate conversion, size conversion, and the like on the video data.

The audio processor 380 may process audio data included in content received via the communication unit 340 or stored in the memory 330. The audio processor 380 may perform various kinds of processing such as decoding, amplification, noise filtering, and the like on the audio data.

When a replay program for multimedia content is executed, the control unit 310 may operate the video processor 345 and the audio processor 380 to replay the multimedia content. The speaker unit 370 may output audio data generated by the audio processor 380.

The input unit 350 may receive various instructions input by the user. The input unit 350 may include at least one of a key 352, the touch panel 354, and a pen recognition panel 356. The input unit 350 of FIG. 3 may correspond to an input unit 3030 of FIG. 30.

The key 352 may include various types of keys such as mechanical buttons, wheels, and the like formed in various regions such as a front part, a side part, a rear part, and the like of the exterior appearance of a main body of the electronic device 200.

The touch panel 354 may detect a touch input of the user and output a touch event value corresponding to the detected touch signal. When the touch panel 354 is coupled to the display panel 322 to configure the touchscreen, the touchscreen may be implemented by various types of touch sensors such as a capacitive overlay touch sensor, a resistive overlay touch sensor, a piezoelectric touch sensor, and the like. The capacitive overlay touch sensor calculates touch coordinates by detecting micro electricity caused by the user's body of when a portion of the user's body touches a surface of the touchscreen. The resistive overlay touch sensor includes two electrode plates embedded in the touchscreen and calculates by detecting a current flowing according to contact between the two electrode plates at a touched point. A touch event occurring on the touchscreen may be mainly generated by a finger of a human being, but the touch event may be generated by a matter of a conductive material capable of causing a change in capacitance.

The pen recognition panel 356 may detect a proximity input or a touch input of a pen according to use of a touch pen (e.g., a stylus pen or a digitizer pen) of the user and output a pen proximity event or a pen touch event according to the detected proximity input or touch input. The pen recognition panel 356 may be implemented in, for example, an electromagnetic resonance (EMR) scheme and detect a touch or proximity input according to a change in the intensity of an electromagnetic field due to proximity or touch of the pen. In detail, the pen recognition panel 356 may include an electromagnetic induction coil sensor (not shown) having a grid structure and an electronic signal processing unit (not shown) configured to sequentially provide an alternating current (AC) signal having a certain frequency to each of loop coils of the electromagnetic induction coil sensor. If a pen having a built-in resonance circuit exists around the loop coils of the pen recognition panel 356, a magnetic field transmitted from a corresponding loop coil induces a current in the resonance circuit in the pen based on mutual electromagnetic induction. An induction magnetic field is generated based on the current by a coil forming the resonance circuit in the pen, and the pen recognition panel 356 may detect the induction magnetic field by using a loop coil in a signal reception state, thereby detecting a proximity or touch position of the pen. The pen recognition panel 356 may be provided with a certain area, for example, an area by which a display area of the display panel 322 is covered, at a lower part of the display panel 322.

The microphone unit 360 may receive a voice of the user or other sounds and convert the received voice or sounds into audio data. The control unit 310 may use the user's voice, which is input via the microphone unit 360, in a call operation or convert the user's voice into audio data and store the audio data in the memory 330.

The may pick up a still image or a video under control of the user. The image pick-up unit 365 may be plural in number with a front camera, a rear camera, and the like.

When the image pick-up unit 365 and the microphone unit 360 are provided, the control unit 310 may perform a control operation according to a user's voice input via the microphone unit 360 or a user's motion recognized by the image pick-up unit 365. For example, the electronic device 200 may operate in a motion control mode or a voice control mode. When the electronic device 200 operates in the motion control mode, the control unit 310 may activate the image pick-up unit 365 to photograph the user, track a change in a user's motion, and perform a control operation corresponding to the change in the user's motion. When the electronic device 200 operates in the voice control mode, the control unit 310 may operate in a voice recognition mode of analyzing a user's voice input via the microphone unit 360 and performing a control operation according to the analyzed user's voice.

The motion detection unit 375 may detect a motion of the main body of the electronic device 200. The electronic device 200 may be rotated or leaned in various directions. In this case, the motion detection unit 375 may detect motion characteristics such as a rotation direction and angle, a gradient, and the like by using at least one of various sensors such as a geomagnetic sensor, a gyro sensor, an acceleration sensor, and the like.

Figure 4:
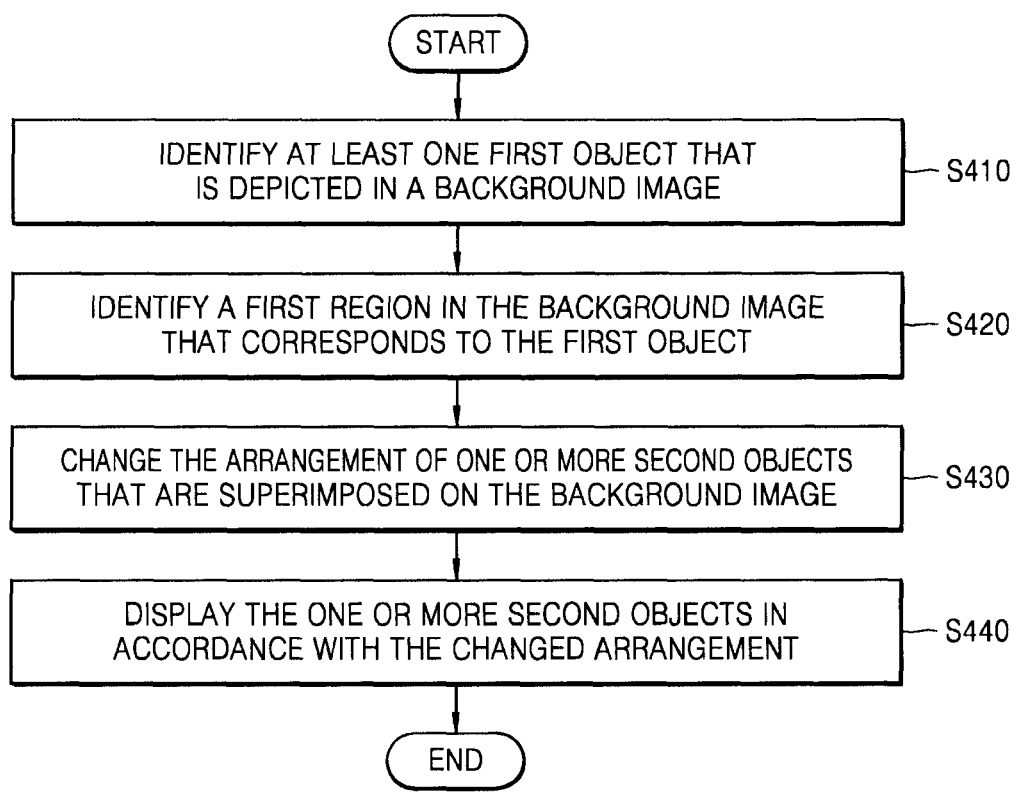
FIG. 4 is a flowchart of an example of a process, according to aspects of the disclosure.

FIG. 4 is a flowchart of an example of a process, according to aspects of the disclosure. According to the process, the electronic device 200 may change the arrangement of second objects according to at least one first object included in a background image displayed on the display unit 220 of the electronic device 200.

Figure 5:
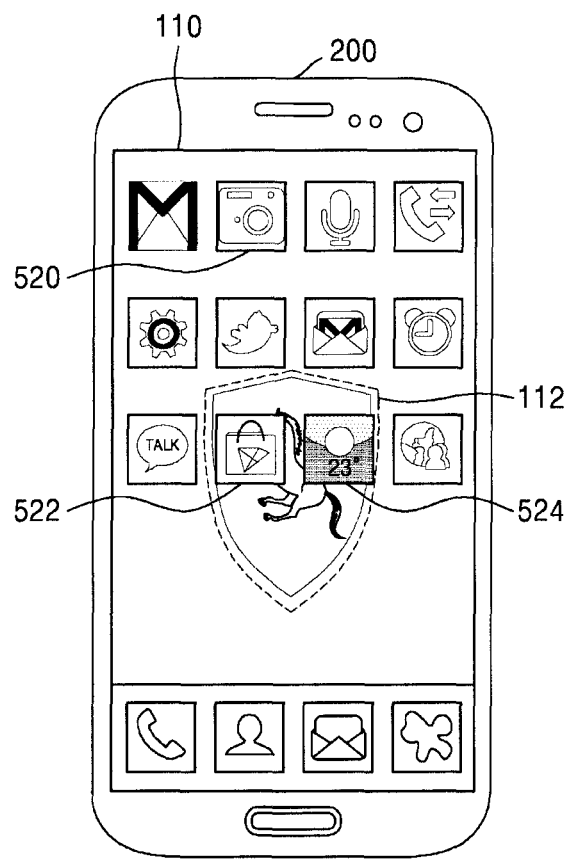
FIG. 5 is a diagram of an example of a user interface, according to aspects of the disclosure.

In operation S410, the control unit 210 may identify at least one first object depicted in a background image of a user interface page (e.g., a page on a home screen). The at least one first object may include a portion of the background image that depicts a predetermined representation (e.g., a representation of a horse, a representation of a car, a representation of a face, text, etc.). The first object may be identified by using any suitable type of image processing technique, such as a segmentation technique, e.g., an edge-based segmentation technique, a histogram-based segmentation technique, or the like may be used, but the method is not limited thereto. Referring to FIG. 5, the first object 112 may be detected from the background image 110 of the electronic device 200. Unlike a second object (e.g., reference sign 520) which does not overlap the detected first object 112 among second objects corresponding to at least application usable in the electronic device 200, a portion of the detected first object 112 is not displayed due to second objects (e.g., reference signs 522 and 524) overlapping the detected first object 112.

According to aspects of the disclosure, displayed on the background screen may be a plurality of second objects. The second objects may include icons, widgets, and or any suitable type of object that can be presented in a user interface page. Additionally or alternatively, the background screen may be associated with a set of object arrangeable spaces. Each object arrangeable space may be a data structure (e.g., a variable) that identifies the size and/or location of a particular area where a given second object may be placed. Some of the locations defined by the arrangeable spaces in the set may be occupied by respective second objects and some may not. Thus, in some aspects, the arrangeable spaces may act as placeholders for positions where the second objects can be relocated.

In operation S420, the control unit 210 may identify at least one first region in the user interface page corresponding to the at least one first object. In detail, the control unit 210 may determine, as the at least one first region, a region including object arrangeable spaces in which second objects overlapping the detected at least one first object are arrangeable. The first region may be a portion of the web page that includes all object arrangeable spaces that at least partially overlap with the first object.

Figure 6:
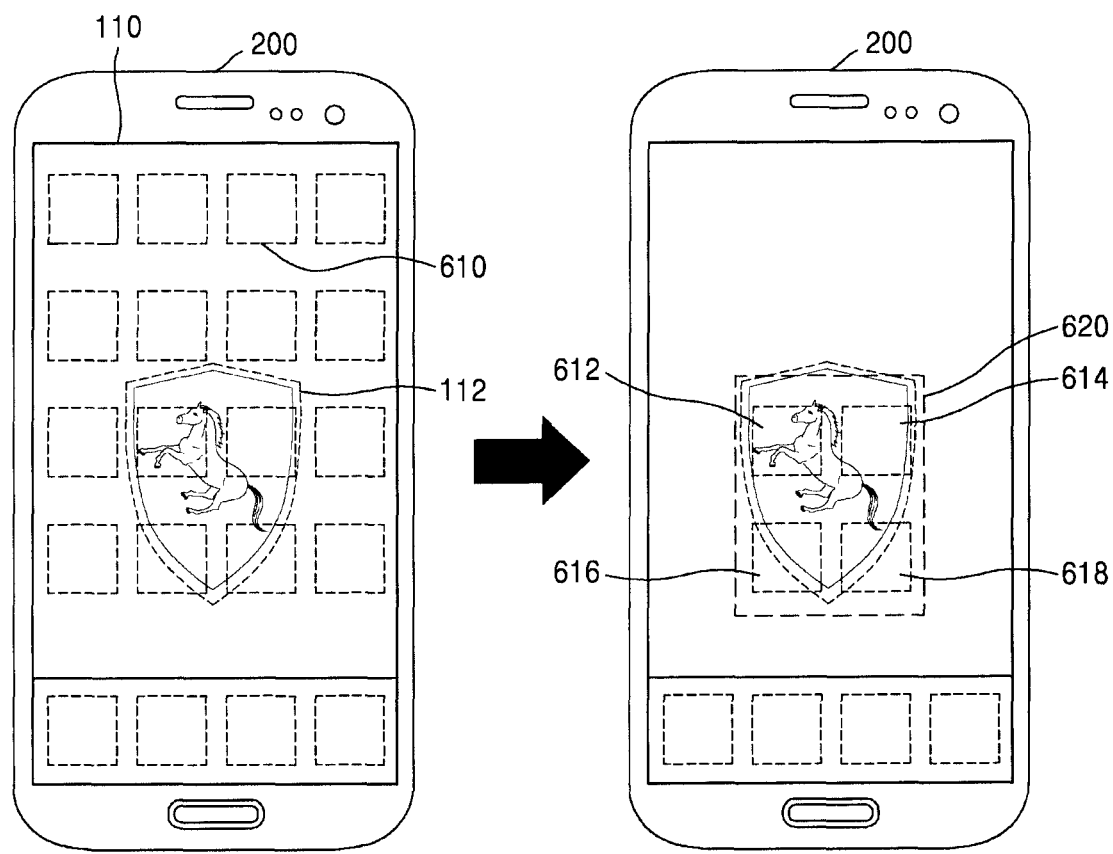
FIG. 6 is a diagram of an example of a user interface, according to aspects of the disclosure.

FIG. 6 illustrates an operation of determining, by the electronic device 200, a first region 610 corresponding to the first object 112 detected from the background image 110. The first region 610 may include an object arrangeable space in which a second object corresponding to at least one application is arrangeable. Referring to FIG. 6, the electronic device 200 may provide at least one space (e.g., reference sign 610) in which a second object is arrangeable in one page on a home screen on which the background image 110 is displayed as a background. In the drawings below, for convenience of description, the display unit 220 of the electronic device 200 may not display the object arrangeable space even though the electronic device 200 actually displays a space in which a second object is arrangeable through the display unit 220.

The control unit 210 of the electronic device 200 may detect the first object 112 included in the background image 110 and also determine, as the first region 610, at least one space in which a second object is arrangeable, the space corresponding to the detected first object 112. For example, referring to FIG. 6, a region including spaces 612, 614, 616, and 618 overlapping the first object 112 in the at least one space in which a second object is arrangeable may be determined as the first region 620.

In operation S430, the control unit 210 of the electronic device 200 may change the arrangement of one or more second objects (e.g., icons) that are located in the first region. According to an exemplary embodiment, re-arranging the one or more second objects may include moving the one or more second objects locations in the user interface page that are situated outside of the first region. More particularly, moving the one or more second objects may include associating the one or more second objects with object arrangeable spaces that are located outside of the first region.

Figure 7:
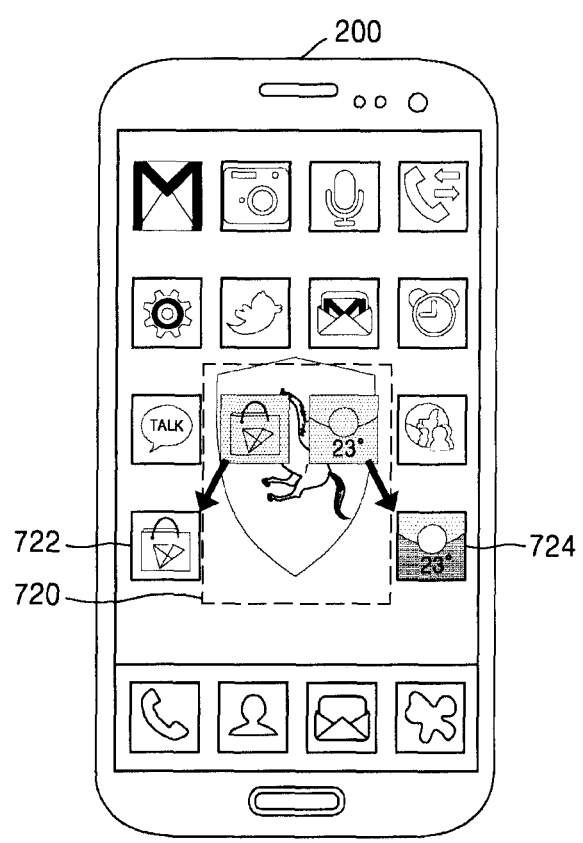
FIG. 7 is a diagram of an example of a user interface, according to aspects of the disclosure.

According to an embodiment, the control unit 210 may change the arrangement of the second objects such that the second objects are not arranged in the at least one first region. Referring to FIG. 7, before changing the arrangement, second objects (e.g., reference signs 722 and 724) overlapping a first region 720 among second objects displayed on the display unit 220 exist. The control unit 210 may change an arrangement of the second objects displayed on the display unit 220 such that the second objects 722 and 724 are arranged in other spaces which do not overlap the first region 720. A method of arranging the second objects 722 and 724 in other spaces which do not overlap the first region 720 may be achieved by aligning the second objects 722 and 724 according to an arrangement order of second objects before the change or to another condition (e.g., alignment according to a usage frequency, alignment in a name order, or alignment in an added date) but is not limited thereto.

In operation S440, according to an embodiment, the electronic device 200 may display the second objects in accordance with the changed arrangement. The second objects may be displayed on the display unit 220.

Figure 8:
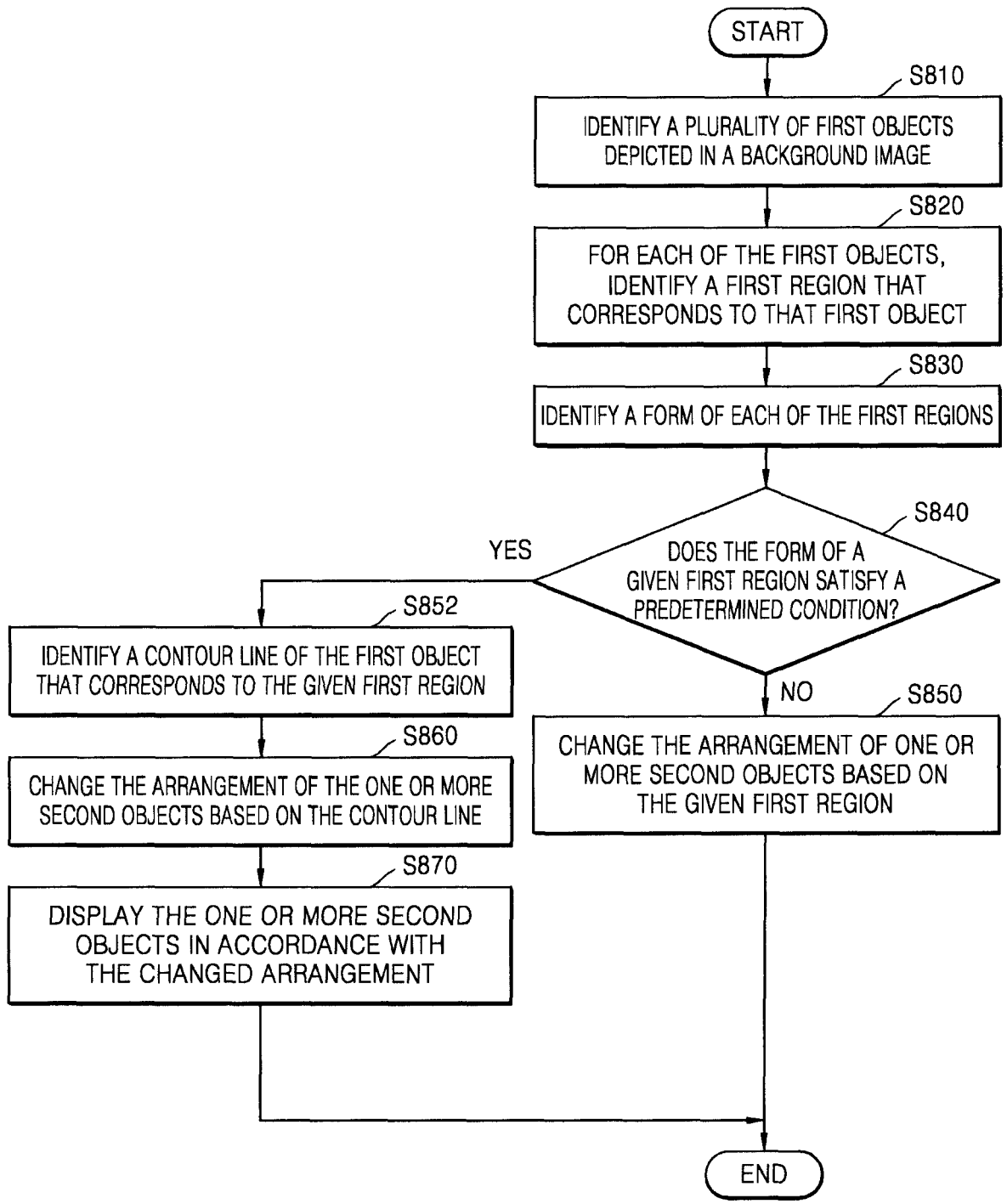
FIG. 8 is a flowchart of an example of a process, according to aspects of the disclosure.

FIG. 8 is a flowchart of an example of a process, according to aspects of the disclosure. According to the process, the control unit 210 may determine whether a first form which is a form of each of the at least one first region corresponding to at least one first object satisfies the predefined condition in an operation of changing an arrangement of the second objects. According to an embodiment, a first form which is a form of each of the at least one first region may be a matrix form determined based on a space in which the second objects are arrangeable. For example, when the space in which the second objects are arrangeable is a matrix form, the predefined condition may be used to determine whether the first form corresponds to a matrix having one or more rows and five or more columns.

Figure 9:
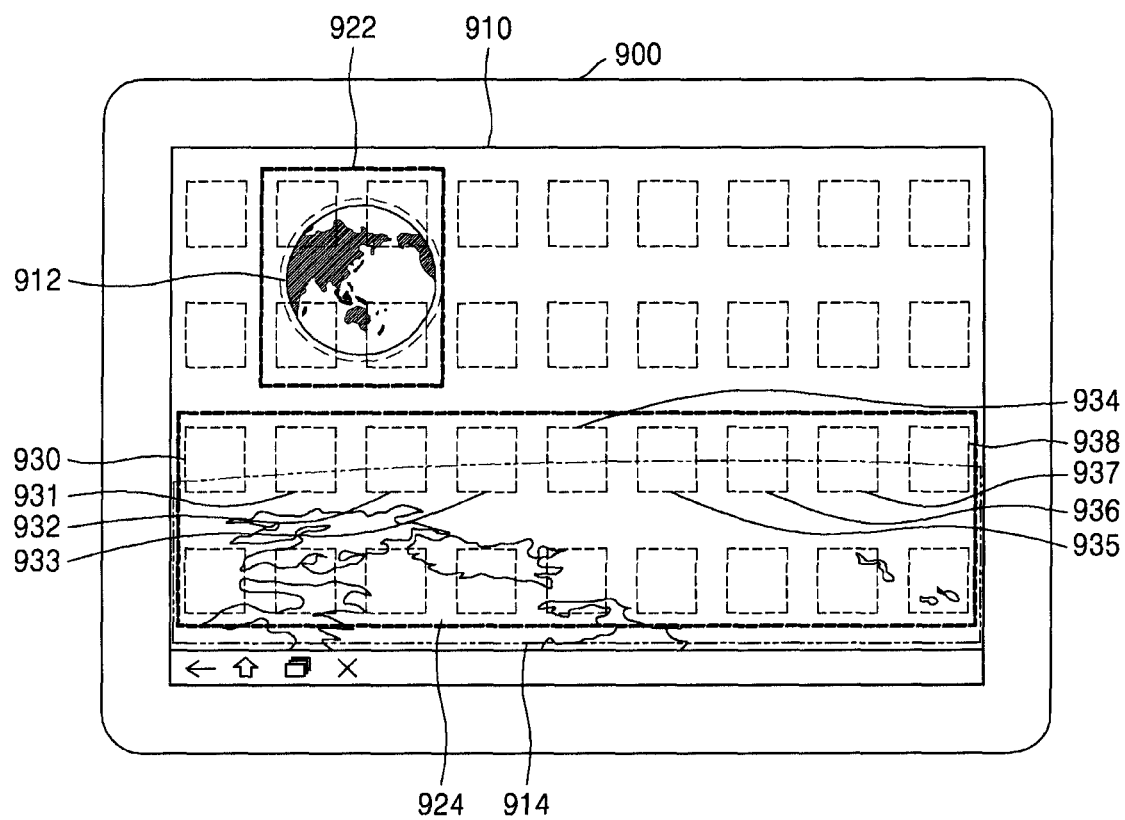
FIG. 9 is a diagram of an example of a user interface, according to aspects of the disclosure.

In operation S810, the control unit 210 may identify a plurality of first objects that are depicted in a background image. A detailed description thereof may correspond to the operation S410 of FIG. 4 and is thus omitted herein. An electronic device 900 of FIG. 9 may correspond to the electronic device 200 of FIG. 2. Referring to FIG. 9, the control unit 210 may detect first objects 912 and 914 as the at least one first object.

In operation S820, for each of the first objects, the control unit 210 may identify a respective first region. A detailed description thereof may correspond to operation S420 of FIG. 4 and is thus omitted herein. Referring to FIG. 9, the control unit 210 may determine first regions 922 and 924 corresponding to the first objects 912 and 914 detected in operation S810.

In operation S830, the control unit 210 may identify the form of each of the first regions identified in operation S820. Referring to FIG. 9, a space in which second objects are arrangeable on the display unit 210 of the control unit 210 may have an arrangement form such as a matrix having four rows and nine columns. A first form of the first region 922 may be a matrix having two rows and two columns, and a first form of the first region 924 may be a matrix having nine columns.

In operation S840, the control unit 210 may determine whether the form of a given first region satisfies a predefined condition. According to an embodiment, the control unit 210 may determine whether the form of a given first object satisfies the predefined condition based on a matrix having two or more rows and four or more columns. Referring to FIG. 9, the control unit 210 may determine that the first form corresponding to the first region 922 does not satisfy the predefined condition for the reason that the number of columns is less than four since the first form corresponding to the first region 922 corresponds to a matrix having two rows and two columns and may determine that the first form corresponding to the first region 924 satisfies the predefined condition since the first form corresponding to the first region 924 corresponds to a matrix having two rows and nine columns.

If the form of a given first region does not satisfy the predefined condition, the control unit 210 may change the arrangement of one or more second objects that are superimposed on the first region based on the form of the given region, in operation S850. A detailed description thereof may correspond to operation S430 of FIG. 4 and is thus omitted herein.

If the form of the given first region satisfies the predefined condition, the control unit 210 detects a contour line of a first object related to the given first region, in operation S852. Referring to FIG. 9, since only the first object 914 among the at least one first object 912 and 914 in a background image 910 corresponds to a matrix having two or more rows and four or more columns and thus satisfies the predefined condition, the control unit 210 may detect a contour line of the first object 914.

In operation S860, the control unit 210 may change the arrangement of one or more second objects that are located the given first region based on the contour line of the first object that corresponds to the given first region. According to aspects of the disclosure, the one or more second objects may include second objects that are superimposed on the contour. According to aspects of the disclosures, changing the arrangement of the one or more second objects may include relocating the one or more second objects to locations where they do not overlap with the contour.

Figure 10:
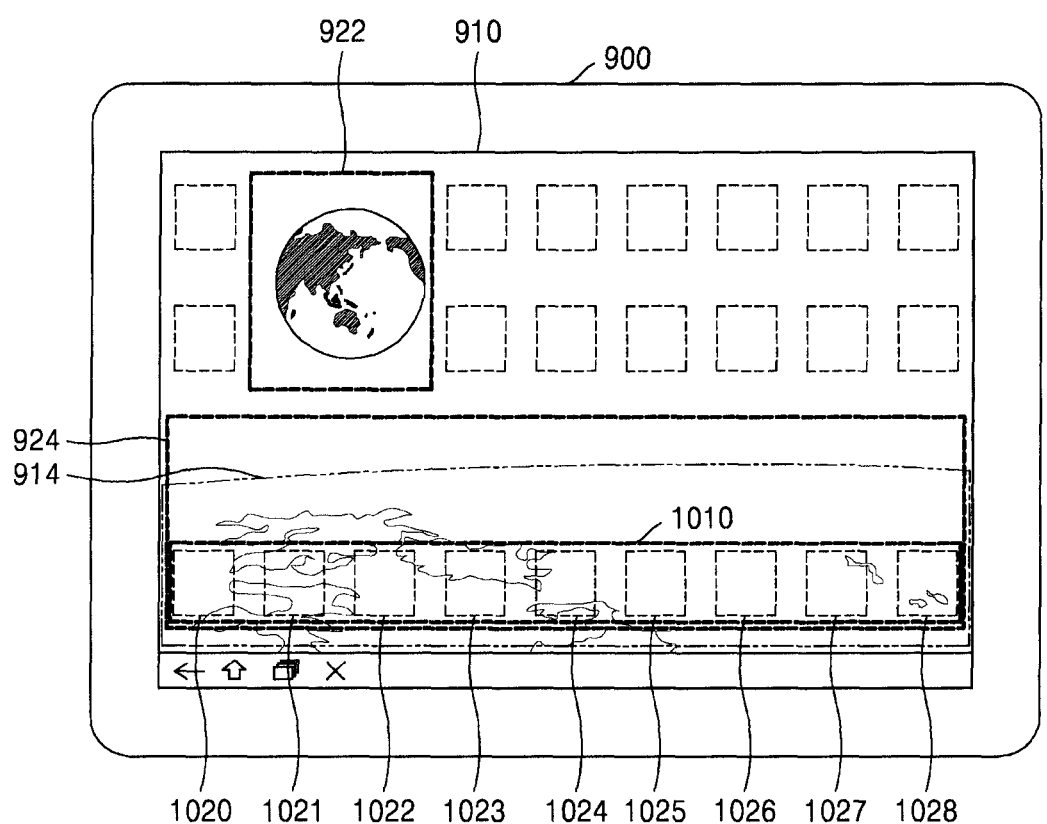
FIG. 10 is a diagram of an example of a user interface, according to aspects of the disclosure.

According to an embodiment, the control unit 210 may change an arrangement of second objects such that the second objects do not overlap the contour line of the first object. Referring to FIG. 9, the control unit 210 of the electronic device 900 provides, on a home screen of the electronic device 900, an object arrangeable space in which at least one second object including an icon, a widget, or the like corresponding to at least one application is arrangeable. The object arrangeable space may indicate a space in which an icon or a widget is arrangeable on the home screen, an application drawer, or the like. According to an embodiment, the control unit 210 may change an arrangement of second objects such that the second objects are not arranged in object arrangeable spaces 930, 931, 932, 933, 934, 935, 936, 937, and 938 overlapping a contour line of the first object 914 determined to satisfy the predefined condition among object arrangeable spaces in which the second objects are arrangeable. Referring to FIG. 10, as a result of changing an arrangement of second objects, the control unit 210 may arrange the second objects in a region 1010 which does not overlap the contour line of the first object 914 among object arrangeable spaces in the first region 924 corresponding to the first object 914. That is, the control unit 210 may change an arrangement of second objects by taking into account object arrangeable spaces 1020, 1021, 1022, 1023, 1024, 1025, 1026, 1027, and 1028 in the first region 924.

Figure 11:
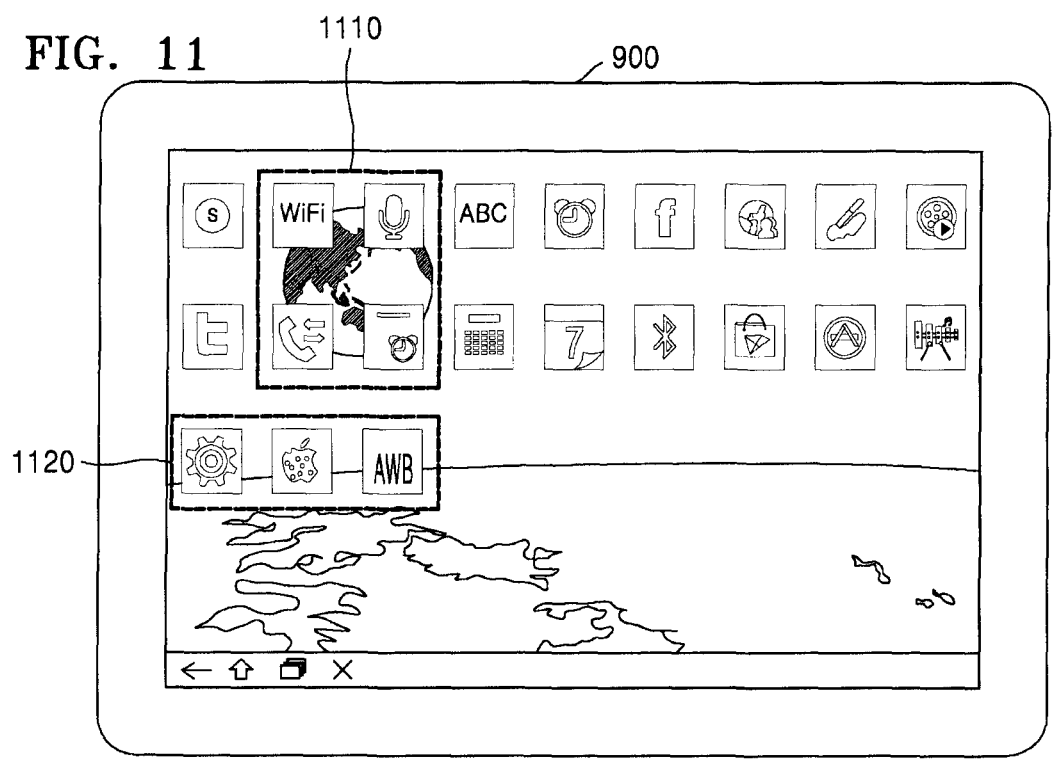
FIG. 11 is a diagram of an example of a user interface, according to aspects of the disclosure.
Figure 11:
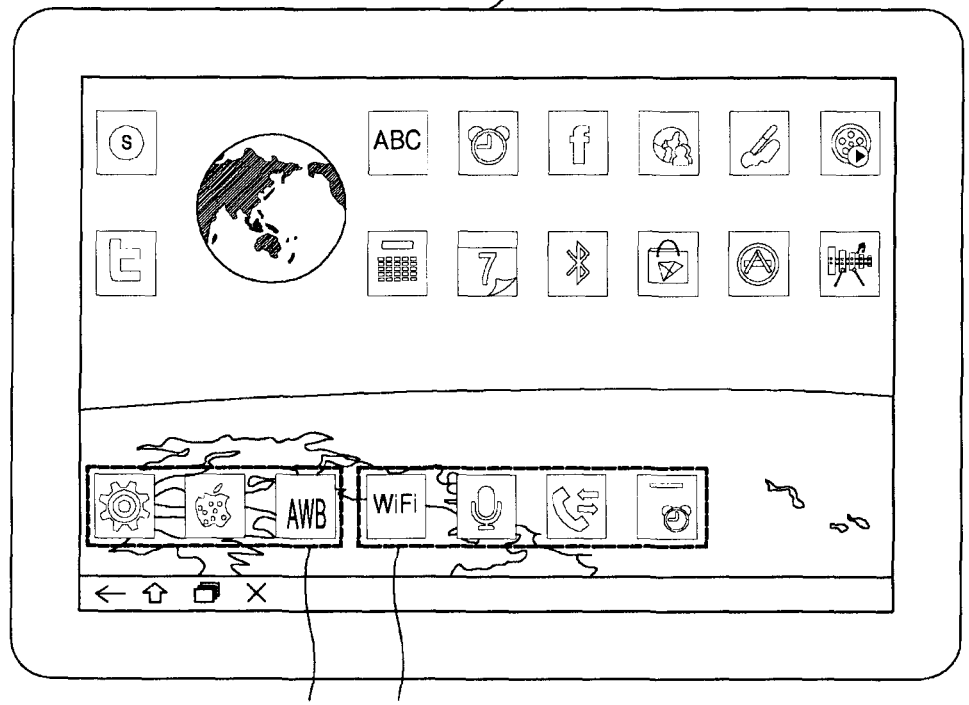

In operation S870, the control unit 210 may control the display unit 220 to display the second objects in accordance with the changed arrangement, in operation S860. FIG. 11 illustrates an operation of changing, by the electronic device 900, an arrangement of second objects such that the second objects do not overlap a contour line of a first object if a form of a first region satisfies the predefined condition. Referring to FIG. 11, according to an embodiment, arrangements 1110 and 1120 of second objects may be changed to arrangements 1112 and 1122 to avoid partially hiding the first object 914 in the second objects.

Figure 12:
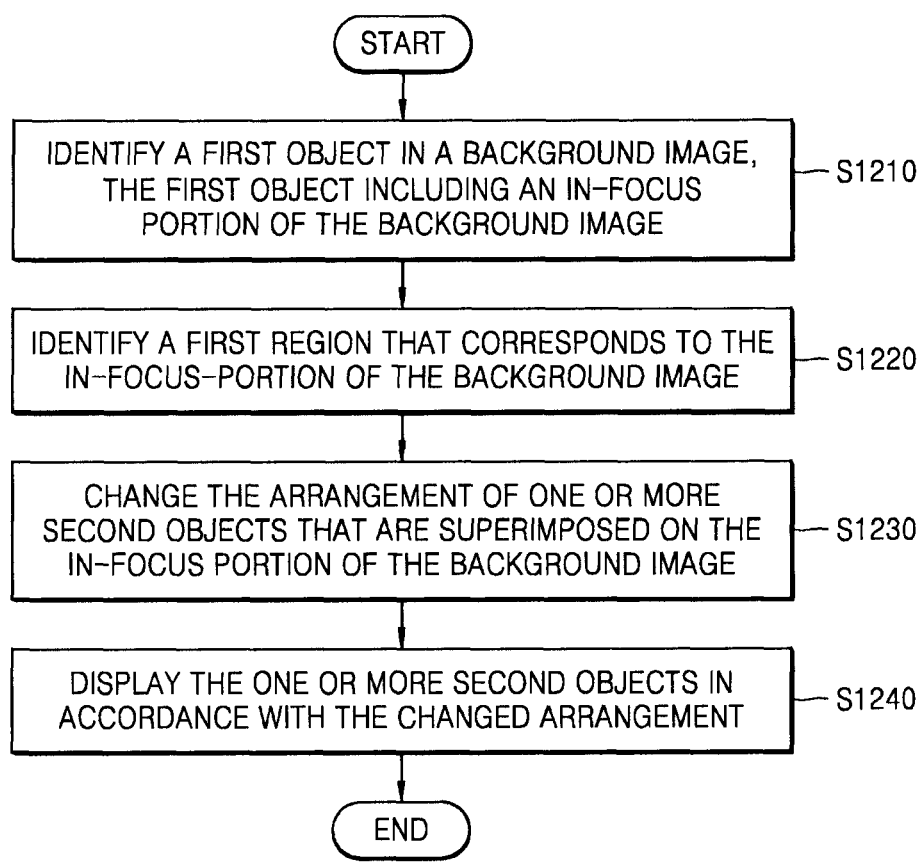
FIG. 12 is a flowchart of an example of a process, according to aspects of the disclosure.

FIG. 12 is a flowchart of an example of a process, according to aspects of the disclosure. According to the process, when the background image corresponds to an image captured by a camera, the background image may be provided by being blurred except for an in-focus portion according to an out-of-focus effect.

Figure 13:
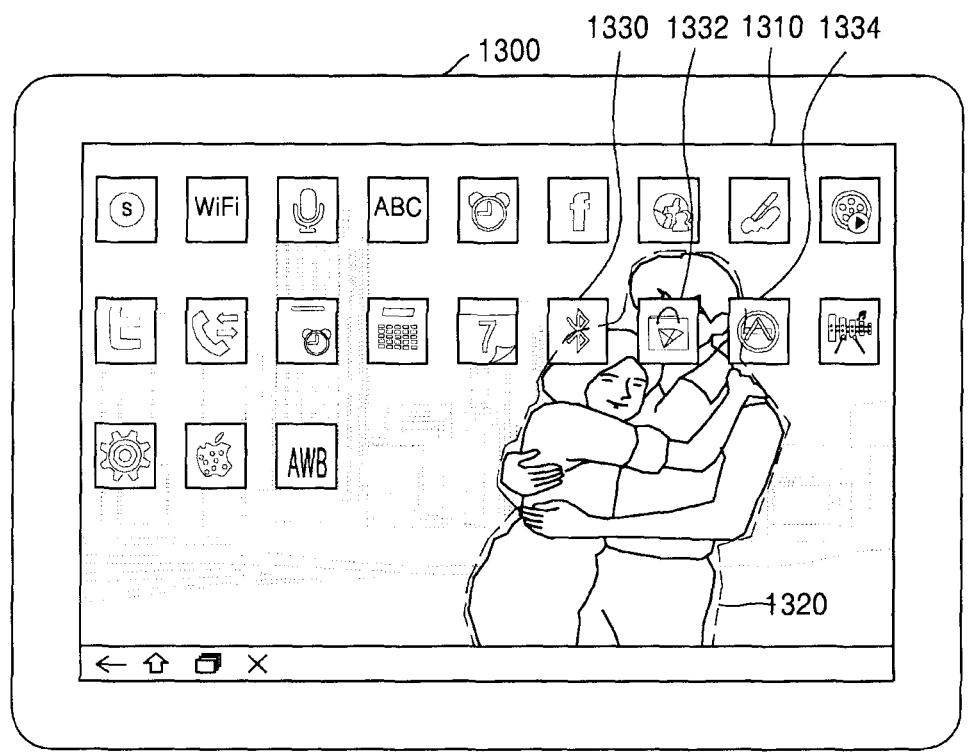
FIG. 13 is a diagram of an example of a user interface, according to aspects of the disclosure.

In operation S1210, the control unit 210 may identify a first object in a background image that includes an in-focus portion of the background image. By way of example, the background image may include a photograph and the in-focus portion of the background image may depict the main subject of the photograph. For a method of detecting the first object, an edge-based segmentation technique or the like may be used, but the method is not limited thereto. FIG. 13 illustrates an operation of detecting, by an electronic device 1300, a first object 1320 corresponding to an in-focus portion from a background image 1310. Referring to FIG. 13, the control unit 210 of the electronic device 1300 may detect the first object 1320 included in the background image 1310 displayed on the display unit 220. The electronic device 1300 of FIG. 13 may correspond to the electronic device 200 of FIG. 2. Since the first object 1320 is hidden by second objects 1330, 1332, and 1334, the electronic device 1300 may not display the whole first object 1320 on the display unit 220.

Figure 14:
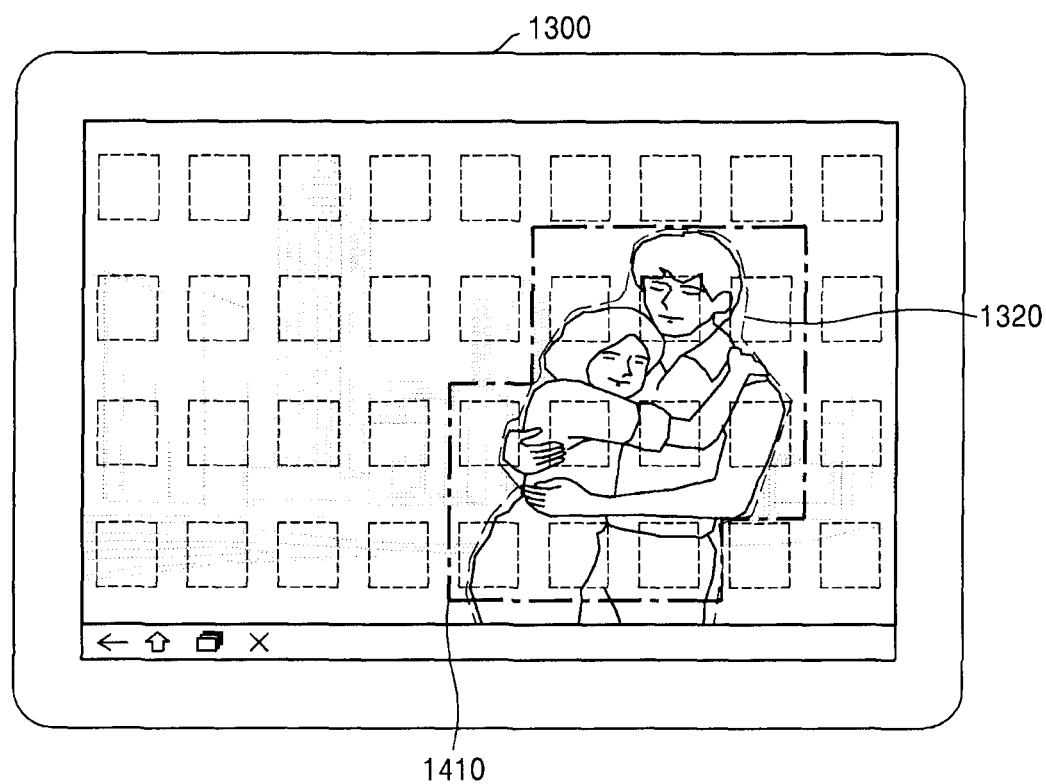
FIG. 14 is a diagram of an example of a user interface, according to aspects of the disclosure.

In operation S1220, the control unit 210 may identify a first region that corresponds to an in-focus portion of the background image. A detailed description thereof may correspond to operation S420 of FIG. 4 and is thus omitted herein. FIG. 14 illustrates an operation of determining, by the electronic device 1300, a first region 1410 corresponding to the detected first object 1320. Referring to FIG. 14, the control unit 210 may determine the first region 1410 which is a region corresponding to the in-focus first object 1320.

Figure 15A:
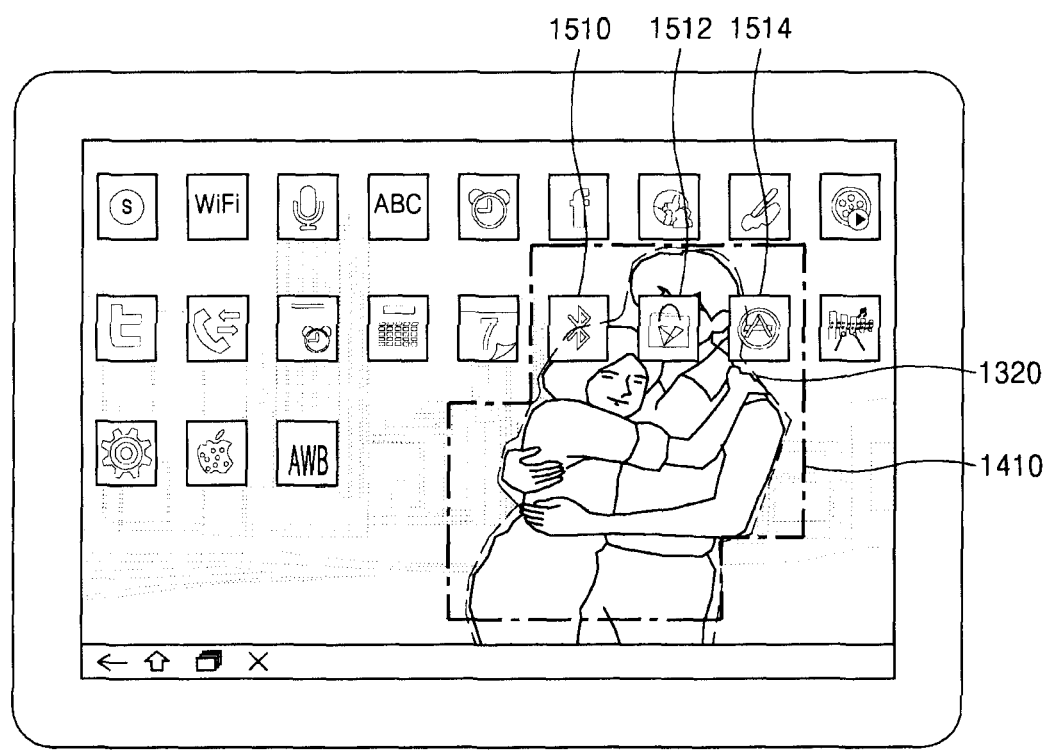
FIG. 15A is a diagram of an example of a user interface, according to aspects of the disclosure.
Figure 15B:
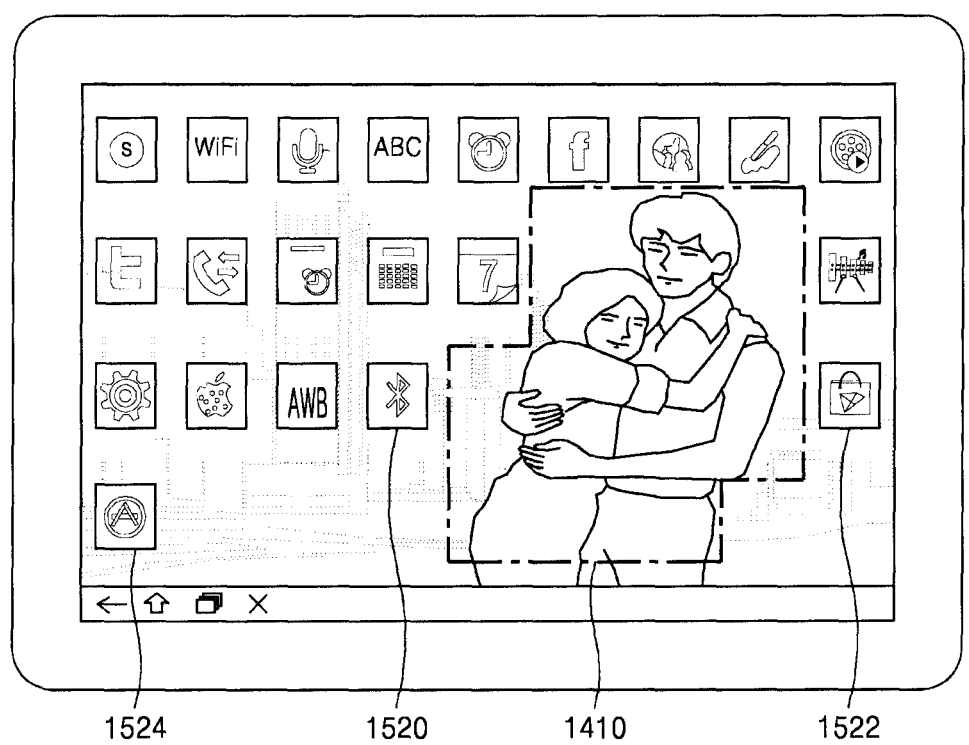
FIG. 15B is a diagram of an example of a user interface, according to aspects of the disclosure.

In operation S1230, the control unit 210 may change the arrangement of one or more second objects that are superimposed on the in-focus portion of the background image. In operation S1240, the control unit 210 may control the display unit 220 to display the one or more second objects in accordance with the changed arrangement. FIGS. 15A and 15B illustrate an operation of changing, by the electronic device 1300, an arrangement of second objects 1510, 1512, and 1514 based on the first region 1410 corresponding to the in-focus portion. Referring to FIG. 15A, the arrangement of the second objects 1510, 1512, and 1514 covering the first object 1320 may be changed based on the first region 1410, and the changed result may be as shown in FIG. 15B. Referring to FIG. 15B, the control unit 210 may control the display unit 220 to display the second objects 1510, 1512, and 1514 based on the changed arrangement, such that the second objects 1510, 1512, and 1514 do not hide the first region 1410.

Figure 16:
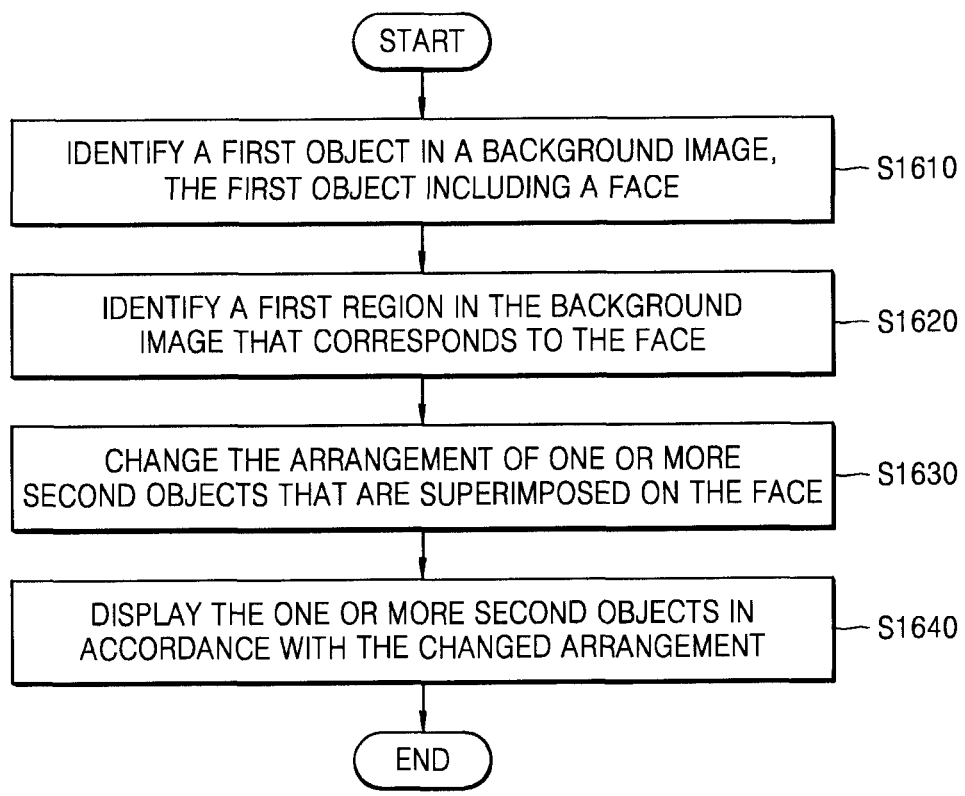
FIG. 16 is a flowchart of an example of a process, according to aspects of the disclosure.

FIG. 16 is a flowchart of an example of a process, according to aspects of the disclosure. According to the process, the control unit 210 may detect a face by using the face recognition function as a first object and arrange the second objects based on a corresponding face.

Figure 17A:
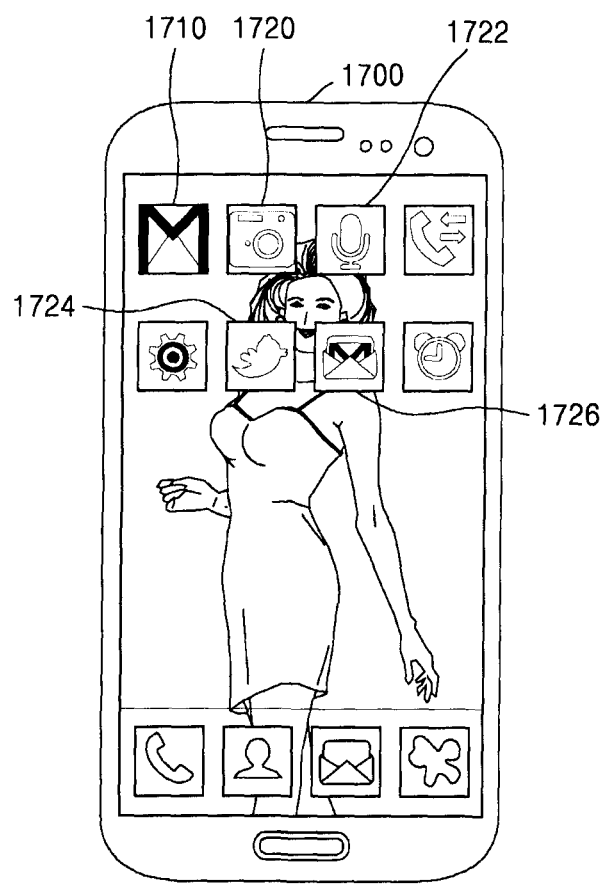
FIG. 17A is a diagram of an example of a user interface, according to aspects of the disclosure.
Figure 17B:
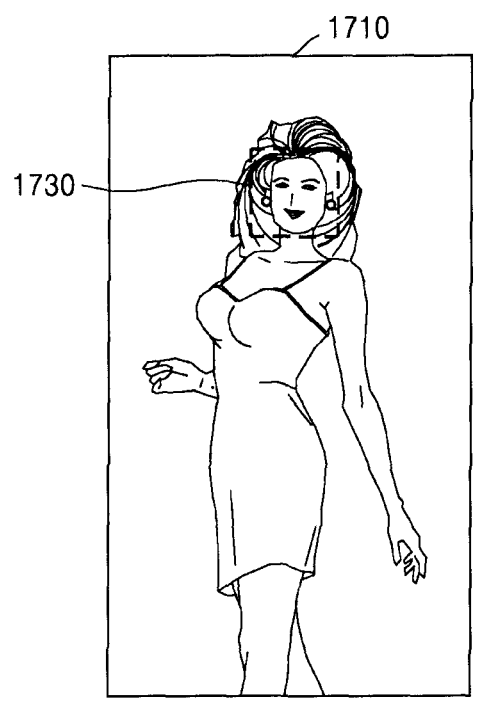
FIG. 17B is a diagram of an example of a background image, according to aspects of the disclosure.

In operation S1610, the control unit 210 may identify a first object. The first object may include a face. By way of example, the control unit 210 may recognize the face via the face recognition function. The face may be a face of a human being or a creature but is not limited thereto. Hereinafter, for convenience of description, it is premised that a face of a human being is recognized. Referring to FIG. 17A, a face of a person included in a background image 1710 of an electronic device 1700 is hidden by second objects 1720, 1722, 1724, and 1726. The electronic device 1700 of FIGS. 17A and 17C may correspond to the electronic device 200 of FIG. 2. Referring to FIG. 17B, a face 1730 may be detected from the background image 1710 via the face recognition function, and this may correspond to operation S410 of detecting the first object in FIG. 4.

Figure 17C:
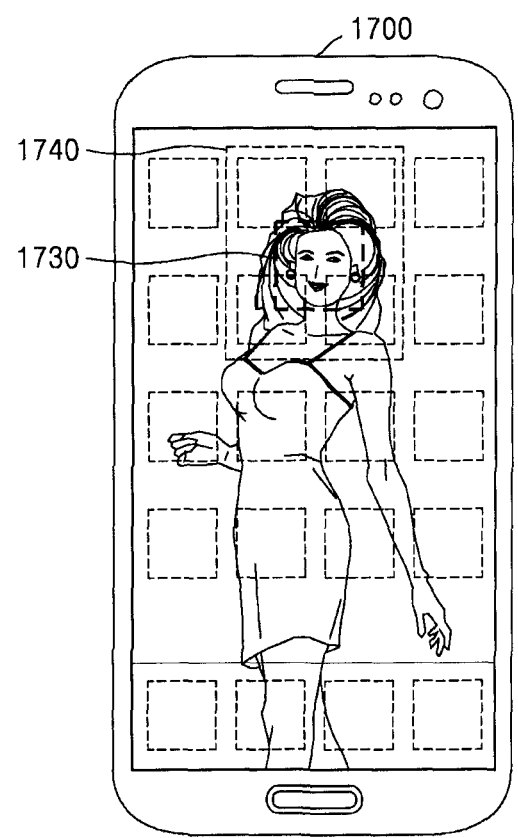
FIG. 17C is a diagram of an example of a user interface, according to aspects of the disclosure.

In operation S1620, the control unit 210 of the electronic device 200 may identify at least one first region corresponding to the face. Referring to FIG. 17C, a first region 1740 including a space in which at least one second object is arrangeable may be determined based on the face 1730 detected in operation S1610.

Figure 18A:
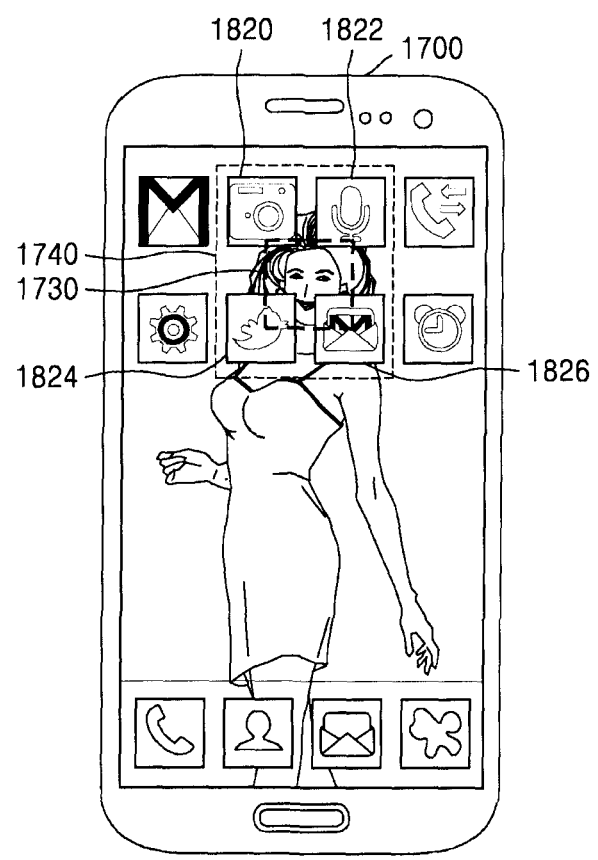
FIG. 18A is a diagram of an example of a user interface, according to aspects of the disclosure.

In operation S1630, the control unit 210 of the electronic device 200 may change the arrangement of one or more second objects that are superimposed on the face. Referring to FIG. 18A, the display unit 220 of the electronic device 1700 displays second objects 1820, 1822, 1824, and 1826 which hide the face 1730. According to an embodiment, the control unit 210 of the electronic device 1700 may change an arrangement of the second objects 1820, 1822, 1824, and 1826 based on the first region 1740 corresponding to the face 1730 such that the second objects 1820, 1822, 1824, and 1826 do not hide the face 1730.

Figure 18B:
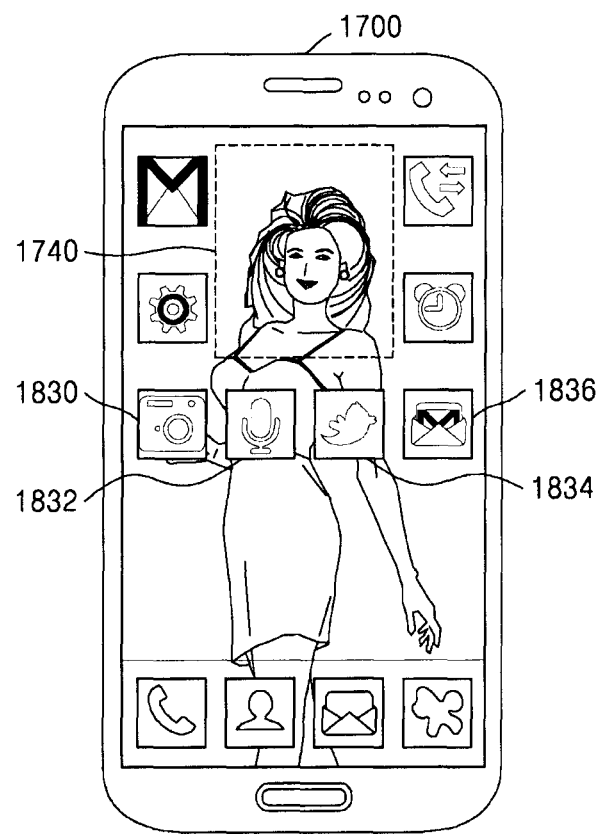
FIG. 18B is a diagram of an example of a user interface, according to aspects of the disclosure.

In operation S1640, the control unit 210 of the electronic device 200 may control the display unit 220 to display the one or more second objects in accordance with the changed arrangement. Referring to FIG. 18A, the control unit 210 may arrange the second objects 1820, 1822, 1824, and 1826, which have hidden the face 1730 that is a first object, in the outside of the first region 1740 by changing the arrangement such that no second object is arranged in the first region 1740 determined in operation S1620. Referring to FIG. 18B, as the arrangement change result, the control unit 210 may control the display unit 220 to display the second objects 1820, 1822, 1824, and 1826 in the changed arrangement such that the second objects 1820, 1822, 1824, and 1826 are arranged on the outside of the first region 1740.

Figure 19:
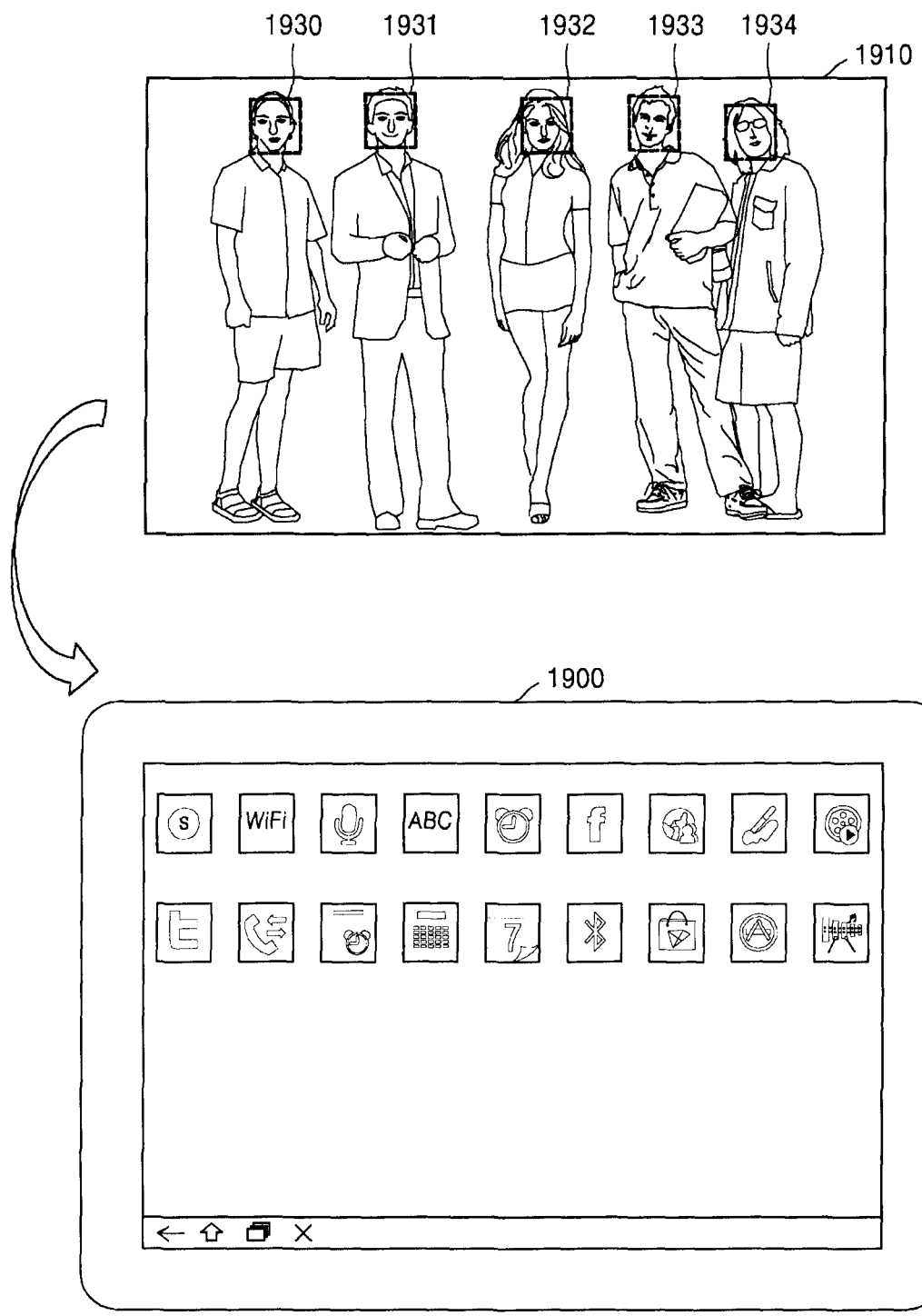
FIG. 19 is a diagram of an example of a user interface background image, according to aspects of the disclosure.

FIG. 19 illustrates an example in which a background image 1910 including a plurality of recognizable faces is applied to an electronic device 1900. The electronic device 1900 of FIG. 19 may correspond to the electronic device 200 of FIG. 2. Unlike the background image 1710 of FIG. 17B, when a plurality of faces are depicted in the background image 1910, a plurality of faces may be detected as at least one first object via the face recognition function. Referring to FIG. 19, the control unit 210 may detect a plurality of faces 1930, 1931, 1931, 1933, and 1934 as the at least one first object from the background image 1910.

Figure 20:
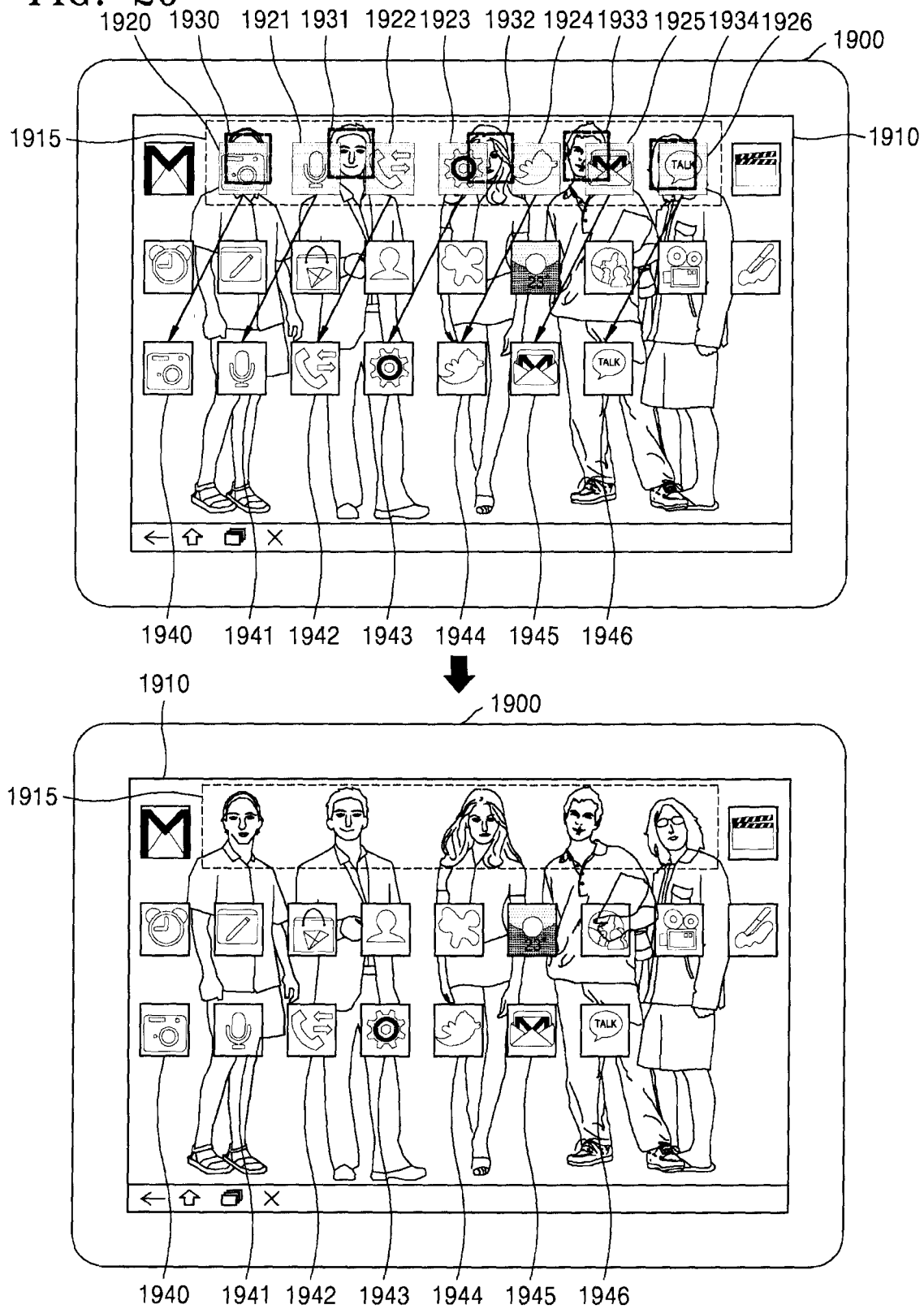
FIG. 20 is a diagram of an example of a user interface, according to aspects of the disclosure.

FIG. 20 illustrates an operation of changing, by the electronic device 1900, an arrangement of second objects 1920, 1921, 1922, 1923, 1924, 1925, and 1926 based on a first region 1915 corresponding to the plurality of faces 1930, 1931, 1931, 1933, and 1934 detected as the at least one first object. In detail, the control unit 210 of the electronic device 1900 needs to relocate, to other spaces, the second objects 1920, 1921, 1922, 1923, 1924, 1925, and 1926 arranged in the first region 1915 including object arrangeable spaces overlapping the plurality of faces 1930, 1931, 1931, 1933, and 1934. This operation of changing an arrangement of at least one second object may correspond to the object arrangement method described with reference to FIG. 16 and is thus omitted herein. By using an object arrangement method corresponding to that of FIG. 16, the control unit 210 of the electronic device 1900 may change the arrangement by arranging the second objects 1920, 1921, 1922, 1923, 1924, 1925, and 1926 arranged in the first region 1915 to other spaces except for the first region 1915, and accordingly, the control unit 210 may control the display unit to display the second objects 1920, 1921, 1922, 1923, 1924, 1925, and 1926 of which the arrangement has been changed such that the second objects 1920, 1921, 1922, 1923, 1924, 1925, and 1926 do not hide the plurality of faces 1930, 1931, 1931, 1933, and 1934.

Figure 21A:
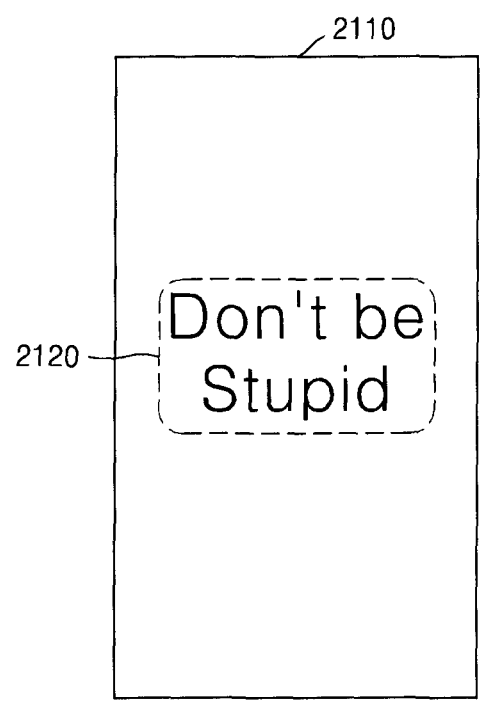
FIG. 21A is a diagram of an example of a background image, according to aspects of the disclosure.

FIG. 21A illustrates a case where recognizable characters 2120 are included in a background image 2110. The background image 2110 may include the characters 2120 as a first object. A user will not want that the characters 2120 included in the background image 2110 be hidden by at least one icon or widget included in a home screen when the characters 2120 are used as a background of the home screen and the like. According to an embodiment, provided are a method and apparatus for changing an arrangement such that objects such as at least one icon or widget are arranged based on the characters 2120 included in the background image 2110.

Figure 21B:
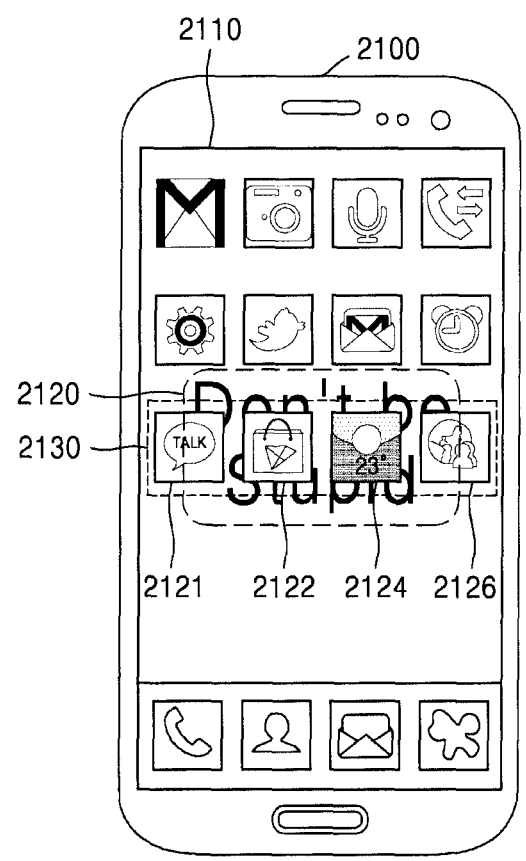
FIG. 21B is a diagram of an example of a user interface, according to aspects of the disclosure.

FIG. 21B illustrates a case where the background image 2110 is displayed as a background of a home screen in an electronic device 2100. The electronic device 2100 of FIG. 21B may correspond to the electronic device 200 of FIG. 2. Referring to FIG. 21B, the control unit 210 of the electronic device 2100 may control the display unit 220 to display the background image 2110 as the background of the home screen. In addition, at least one second object including at least one icon or widget corresponding to at least one application to be used in the electronic device 200 may be displayed.

According to an embodiment, the characters 2120 as at least one first object included in the background image 2110 may be detected by the control unit 210 of the electronic device 2100. When the control unit 210 detects the characters 2120 as the at least one first object, a first region 2130 may be determined as a region corresponding to the characters 2120. The characters may be identified by using any suitable type of character recognition algorithm. A detailed description of an operation of determining the first region 2130 may correspond to operation S420 of FIG. 4 and is thus omitted herein.

According to an embodiment, the control unit 210 of the electronic device 2100 may change an arrangement of second objects 2121, 2122, 2124, and 2126 based on the first region 2130. In detail, since the second objects 2121, 2122, 2124, and 2126 overlap the first object 2120, the control unit 210 of the electronic device 2100 may change the arrangement of the second objects 2121, 2122, 2124, and 2126 such that the second objects 2121, 2122, 2124, and 2126 are arranged in other positions except for the first region 2130 corresponding to the first object 2120.

Figure 22A:
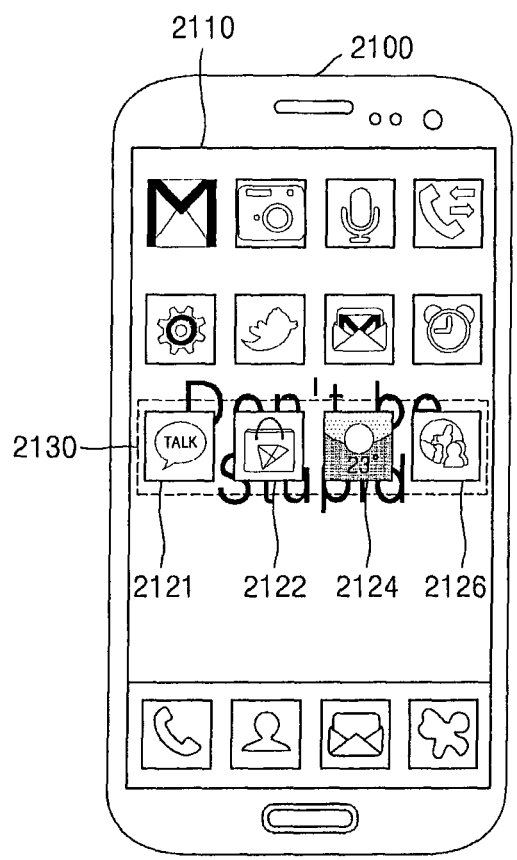
FIG. 22A and FIG. 22B are diagrams of an example of a user interface, according to aspects of the disclosure.
Figure 22B:
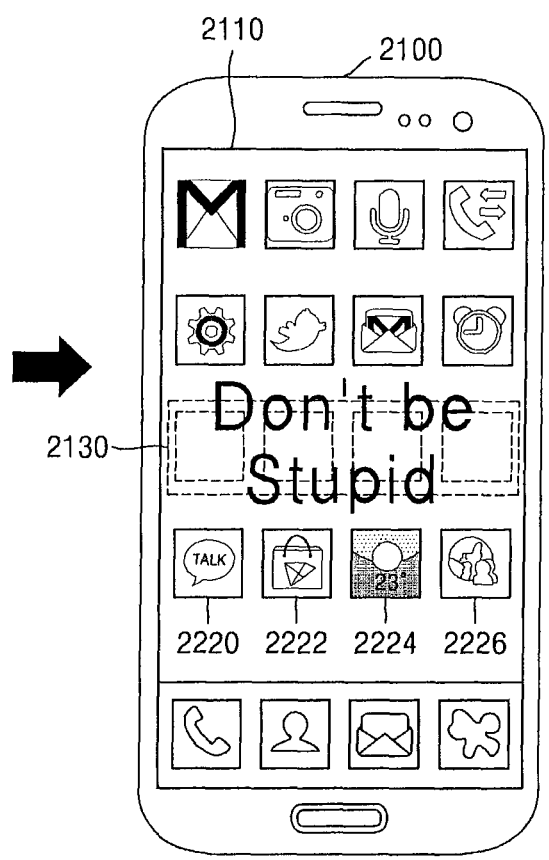

FIGS. 22A and 22B illustrate an operation of changing, by the electronic device 2100, the arrangement of the second objects 2121, 2122, 2124, and 2126 based on the first region 2130 corresponding to a portion from which the characters 2120 have been recognized if the recognizable characters 2120 are included in the background image 2110.

Referring to FIG. 22A, the control unit 210 of the electronic device 2100 may change the arrangement of the second objects 2121, 2122, 2124, and 2126 included in the first region 2130 of the background image 2110 such that the second objects 2121, 2122, 2124, and 2126 are arranged on the outside of the first region 2130. Accordingly, the control unit 210 of the electronic device 2100 may control the display unit 220 to display second objects 2220, 2222, 2224, and 2226 which do not hide the first region 2130 according to the changed arrangement. Referring to FIG. 22B, the control unit 210 of the electronic device 2100 may arrange the second objects 2220, 2222, 2224, and 2226 in such a manner that the first region 2130 is not hidden.

Figure 23:
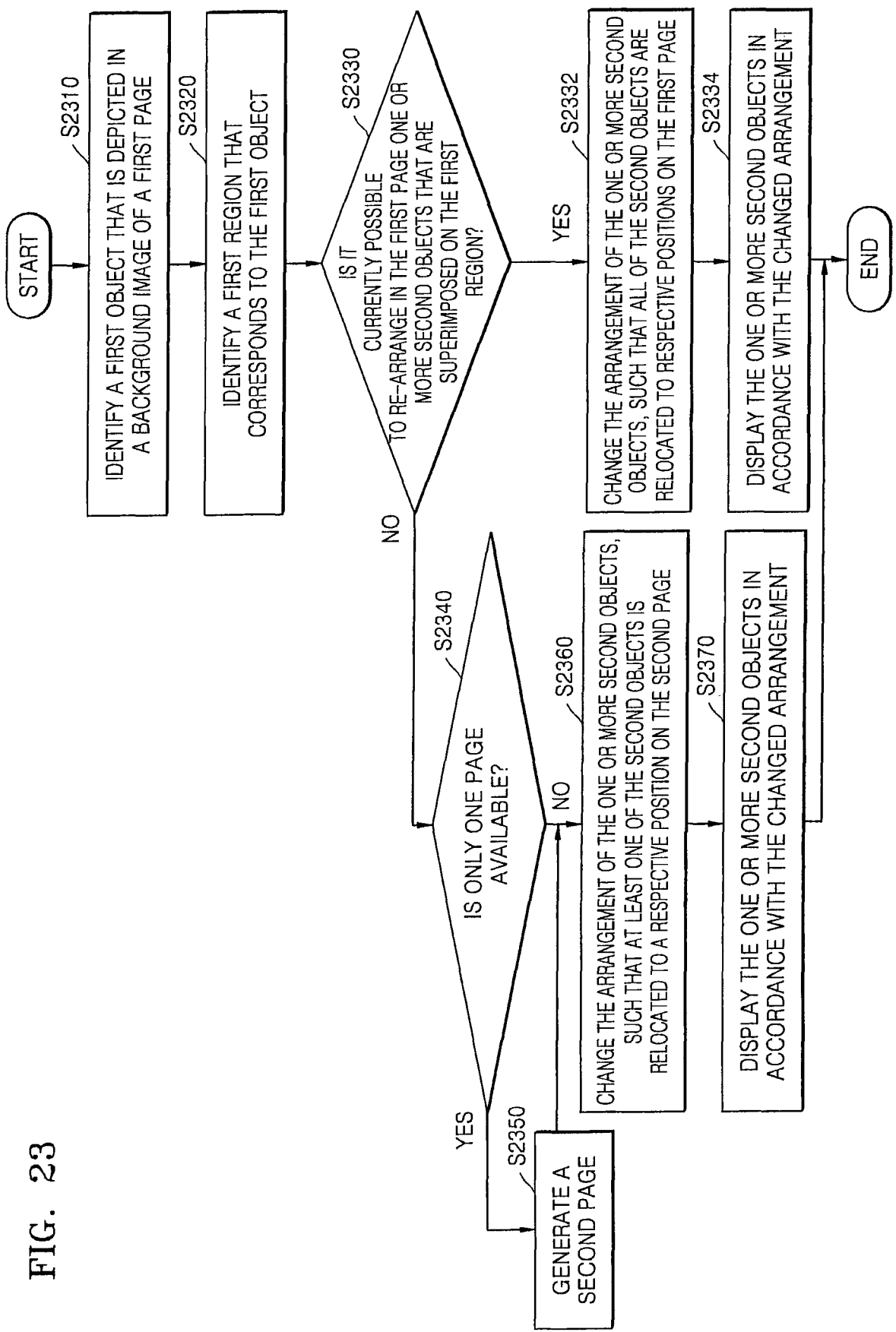
FIG. 23 is a flowchart of an example of a process, according to aspects of the disclosure.

FIG. 23 is a flowchart of an example of a process, according to aspects of the disclosure. According to the process, in situations in which the number of second objects displayable on a home screen is fixed, when taking into account at least one first object, the number of second objects displayable in one page of the home screen may be reduced than before changing the arrangement. Therefore, a case where all the second objects may not be displayed on the background image on which the second objects have been originally displayed may occur.

In operation S2310, the control unit 210 may identify a first object in the background image of a first page. A detailed description thereof may correspond to operation S410 of FIG. 4 and is thus omitted herein.

In operation S2320, the control unit 210 may identify a first image that corresponds to the first object. A detailed description thereof may correspond to operation S420 of FIG. 4 and is thus omitted herein.

In operation S2330, the control unit 210 may detect whether it is currently possible to re-arrange, in the first page, one or more second objects that are superimposed on the first region. By way of example, the control unit 210 may detect whether there is enough room in the first page to relocate the one or more second objects to positions in the first page where the one or more second objects would not overlap with the first region.

Figure 24A:
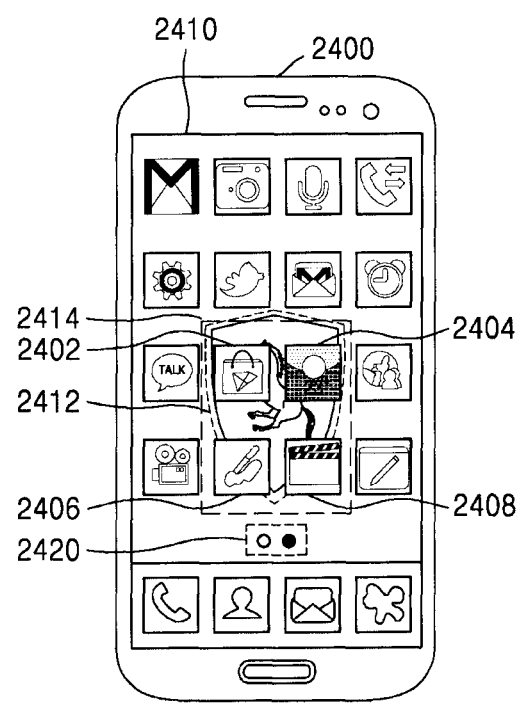
FIG. 24A is a diagram of an example of a user interface, according to aspects of the disclosure.
Figure 24B:
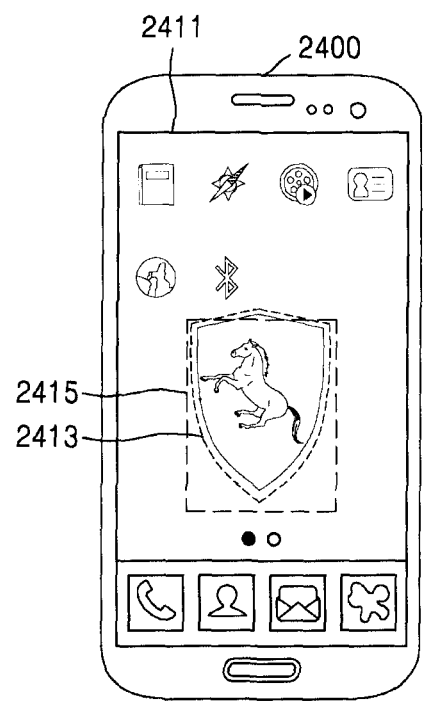
FIG. 24B is a diagram of an example of a user interface, according to aspects of the disclosure.

FIGS. 24A, 24B, 24C, and 24D illustrate an operation of changing, by an electronic device 2400, an arrangement of second objects if the second objects are arranged on a plurality of pages. Referring to FIGS. 24A and 24B, the electronic device 2400 may arrange the second objects over a plurality of pages. The electronic device 2400 of FIGS. 24A, 24B, 24C, and 24D may correspond to the electronic device 200 of FIG. 2. Hereinafter, for convenience of description, it is premised that background images of the plurality of pages are the same as each other. However, the background images displayed on the plurality of pages may be the same as each other or different from each other, or a single background image may be displayed over the plurality of pages, and thus, a method of displaying background images on the plurality of pages is not limited to the same background image.

According to an embodiment, when the one or more second objects can be rearranged in the first page, the control unit 210 of the electronic device 200 may change the arrangement of the one or more second objects, such that all of the one or more second objects are relocated to different respective positions on the first page. A detailed description thereof may correspond to operation S430 of FIG. 4 and is thus omitted herein. In operation S2334, the control unit 210 of the electronic device 200 may control the display unit 220 to display the one or more second objects in accordance with the changed arrangement.

Referring to FIGS. 24A and 24B, a background image 2410 of a first page displayed on the display unit 220 of the electronic device 2400 is the same as a background image 2411 of a second page displayed on the display unit 220 of the electronic device 2400. According to an embodiment, a page identifier 2420 indicating which one of the plurality of pages is displayed may be displayed on home screen images of the electronic device 2400. The page identifier 2420 may be displayed differently for each page to allow a user of the electronic device 2400 to identify a current page. The control unit 210 of the electronic device 2400 may detect a first object 2412 in operation S2310 and determine a first region 2414 corresponding to the first object 2412 in operation S2320. Second objects 2402, 2404, 2406, and 2408 hiding the first object 2412 may be arranged in the determined first region 2414. According to an embodiment, the control unit 210 of the electronic device 2400 may change an arrangement of the second objects 2402, 2404, 2406, and 2408 hiding the first object 2412 such that the second objects 2402, 2404, 2406, and 2408 are arranged in a region except for the first region 2414. However, when referring to FIG. 24A illustrating the background image 2410 of the electronic device 2400, no more space in which a second object is arrangeable exists on the background image 2410 of the electronic device 2400, but when referring to FIG. 24B illustrating the second page of the electronic device 2400, a space in which at least one second object is arrangeable may exist on the second page of the electronic device 2400. According to spaces in which second objects are arrangeable on the second page of the electronic device 2400, operations of determining an arrangement of second objects may correspond to the object arrangement methods described with reference to FIGS. 4, 8, 12, and 16. For convenience of description, it is premised that an arrangement of second objects on the second page of the electronic device 2400 is determined by the same as the operation of changing an arrangement of second objects on the background image of the electronic device 2400.

According to an embodiment, the electronic device 2400 may display second objects only on the first page related to the background image or over a plurality of pages including the first page. In operation S2340, the control unit 210 of the electronic device 200 may determine whether only the first page is part of a home screen.

Figure 24C:
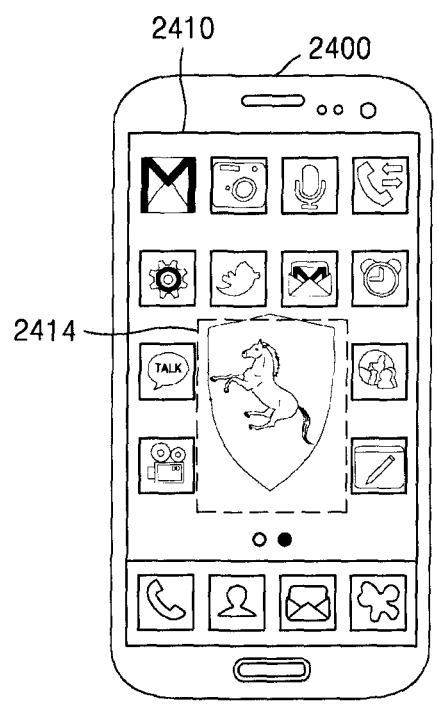
FIG. 24C is a diagram of an example of a user interface, according to aspects of the disclosure.
Figure 24D:
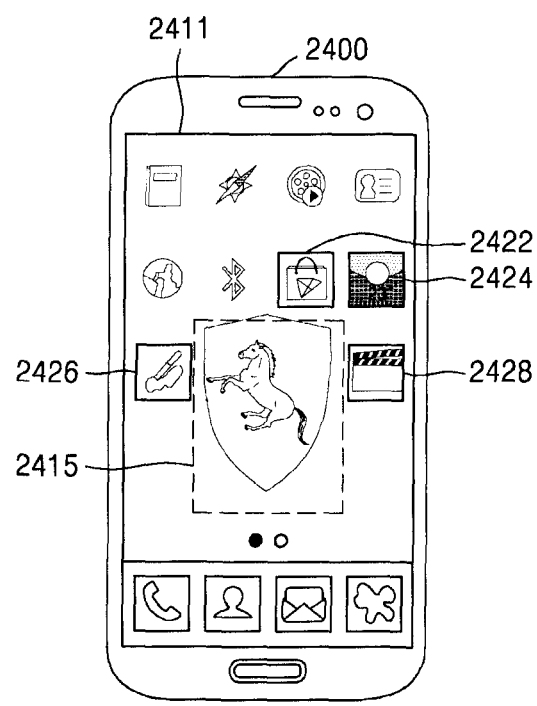
FIG. 24D is a diagram of an example of a user interface, according to aspects of the disclosure.

If the home screen includes at least a second page, the control unit 210 of the electronic device 200 may change the arrangement of the one or more second objects, such that at least one of the second objects is relocated to the second page, in operation S2360. Referring to FIGS. 24C and 24D with respect to operation S2360, the control unit 210 of the electronic device 2400 may arrange, in other spaces other than the first region 2414, the second objects 2402, 2404, 2406, and 2408 arranged in the first region 2414 on the first page of the electronic device 2400. However, since there is no more space to arrange a second object on the first page, the control unit 210 of the electronic device 2400 may move the second objects 2402, 2404, 2406, and 2408 arranged in the first region 2414 on the first page to the second page. Therefore, referring to FIG. 24D, the control unit 210 of the electronic device 2400 may arrange second objects 2422, 2424, 2426, and 2428 on the second page based on a first region 2415 corresponding to the background image 2411 on the second page, the second objects 2422, 2424, 2426, and 2428 corresponding to the second objects 2402, 2404, 2406, and 2408 arranged in the first region 2414 on the first page of the electronic device 2400.

Figure 25A:
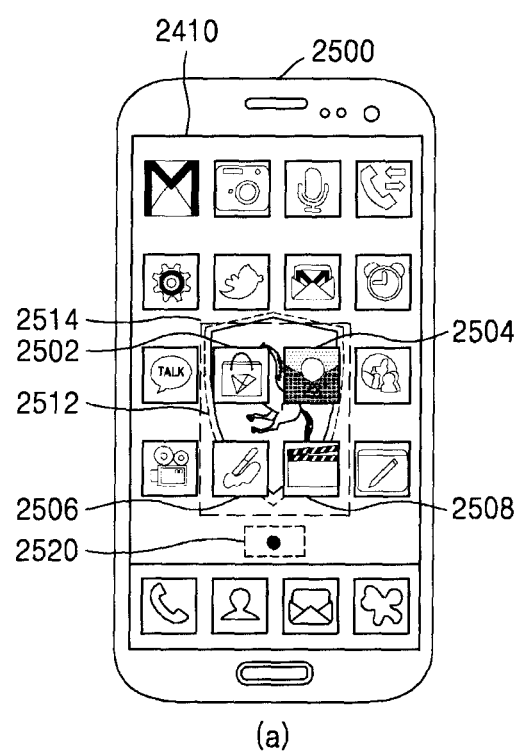
FIG. 25A is a diagram of an example of a user interface, according to aspects of the disclosure.
Figure 25B:
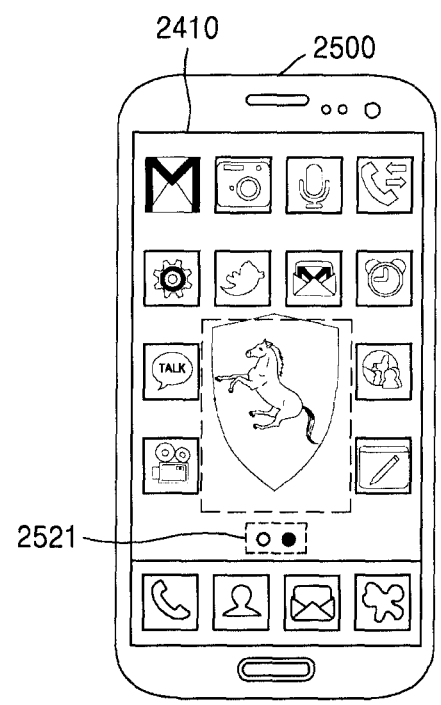
FIG. 25B is a diagram of an example of a user interface, according to aspects of the disclosure.
Figure 25C:
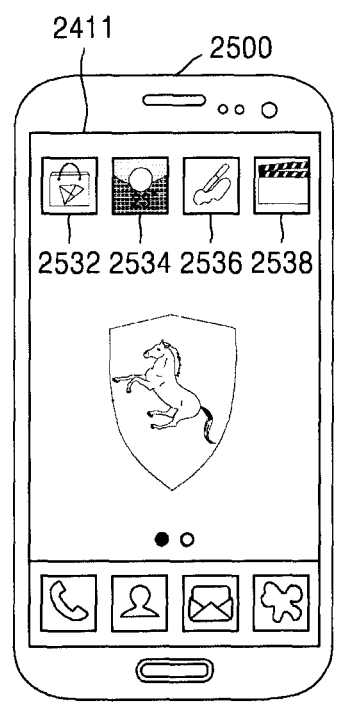
FIG. 25C is a diagram of an example of a user interface, according to aspects of the disclosure.

FIGS. 25A, 25B, and 25C illustrate an operation of changing, by an electronic device 2500, an arrangement of second objects by generating a new page if the second objects are arranged on one page. Referring to FIG. 25A, only a single page, i.e., a first page, exists on a home screen of the electronic device 2500. Accordingly, if it is determined in operation S2340 that only the first page exists on the home screen at present, according to an embodiment, the control unit 210 of the electronic device 2500 may newly generate at least one second page other than the first page. The electronic device 2500 of FIG. 25A may correspond to the electronic device 200 of FIG. 2. According to an embodiment, the control unit 210 of the electronic device 2500 may detect a first object 2512 from the background image 2410 in operation S2310 and determine a first region 2514 corresponding to the first object 2512 in operation S2320. Second objects 2502, 2504, 2506, and 2508 hiding the first object 2512 may be arranged in the determined first region 2514.

According to an embodiment, the control unit 210 of the electronic device 2500 may change an arrangement of the second objects 2502, 2504, 2506, and 2508 hiding the first object 2512 such that the second objects 2502, 2504, 2506, and 2508 are arranged in a region except for the first region 2514. However, when referring to FIG. 24A illustrating the first page of the electronic device 2400, no more space in which a second object is arrangeable exists on the first page of the electronic device 2400, and unlike FIGS. 24A and 24B, the second page of the electronic device 2400 in which second objects are arrangeable may not exist. In this case, the electronic device 2500 may newly generate at least a second page. Accordingly, referring to FIG. 25A, a page identifier 2520 of the electronic device 2500 may indicate a single page, and when the electronic device 2500 newly generates the second page, a display form of the page identifier 2520 may be changed to a page identifier 2521 as shown in FIG. 25B.

In operation 2350, if the home screen includes only the first page, the control unit generates a second page. FIG. 25C illustrates the second page newly generated by the electronic device 2500 in operation S2350. The control unit 210 of the electronic device 2500 may move the second objects 2502, 2504, 2506, and 2508 arranged in the first region 2514 before changing the arrangement to the second page and arrange second objects 2532, 2534, 2536, and 2538 on the second page based on the background image 2411 on the second page as shown in FIG. 25C. In operation S2370, the control unit 210 of the electronic device 200 may control the display unit 220 to display the second objects in accordance with the changed arrangement.

According to an embodiment, the control unit 210 of the electronic device 200 may change an arrangement of second objects by moving second objects displayed on a first page to an existing second page that is different from the first page or by generating a new second page and moving the second objects displayed on the first page to the new second page. In this case, it may be determined based on a certain criterion which ones of the second objects displayed on the first page are moved to the second page. FIGS. 26A, 26B, 26C, and 26D illustrate an operation of changing, by an electronic device 2600, an arrangement of second objects based on a usage frequency if the second objects are arranged on a plurality of pages in an operation of changing the arrangement of the second objects based on a first region 2614.

Figure 26A:
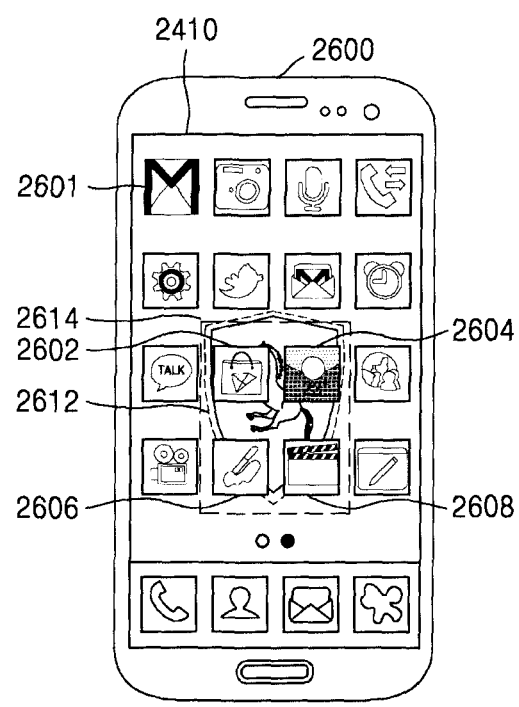
FIG. 26A is a diagram of an example of a user interface, according to aspects of the disclosure.
Figure 26B:
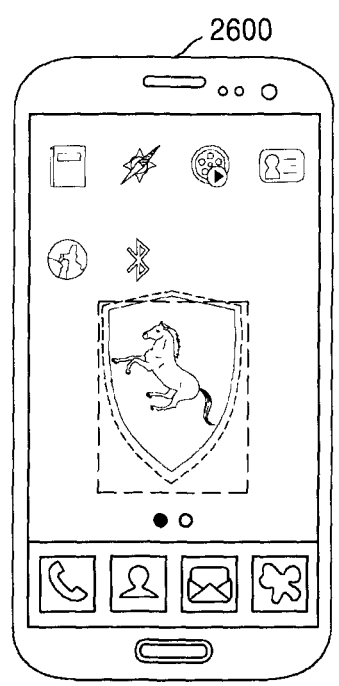
FIG. 26B is a diagram of an example of a user interface, according to aspects of the disclosure.
Figure 26C:
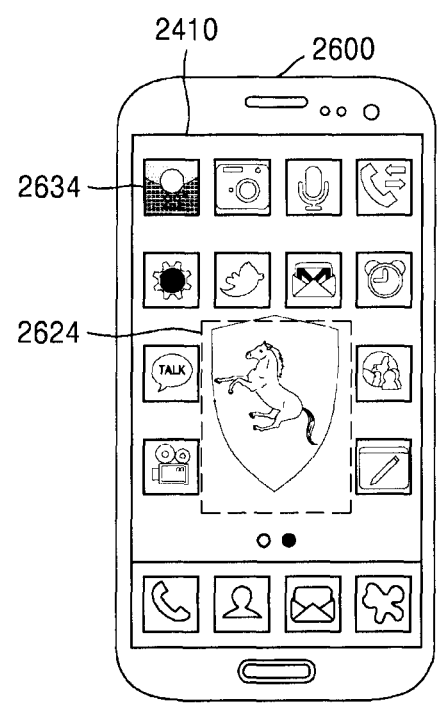
FIG. 26C is a diagram of an example of a user interface, according to aspects of the disclosure.
Figure 26D:
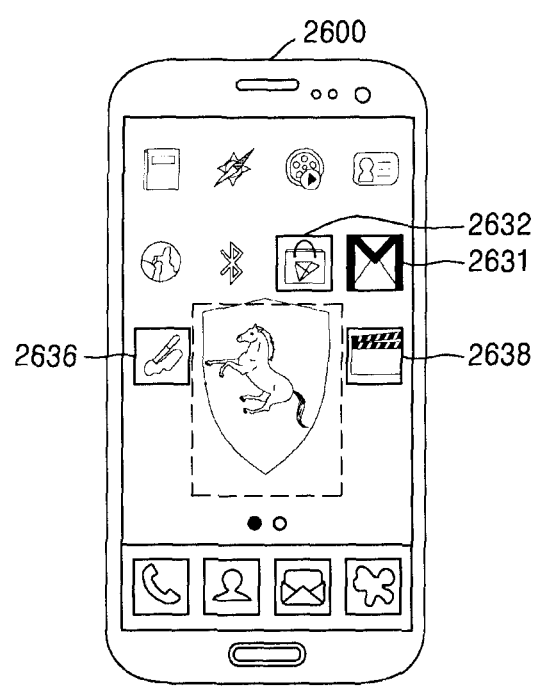
FIG. 26D is a diagram of an example of a user interface, according to aspects of the disclosure.

Referring to FIGS. 26A, 26B, 26C, and 26D, the control unit 210 of the electronic device 2600 may detect a first object 2612 from the background image 2410 and determine the first region 2614 corresponding to the first object 2612. Second objects 2602, 2604, 2606, and 2608 hiding the first object 2612 may be arranged in the determined first region 2614. Therefore, the control unit 210 of the electronic device 2600 may move some of the second objects from a first page to a second page since an arrangement of the second objects on the first page is supposed to be changed not to arrange second objects in the first region 2614. According to an embodiment, the control unit 210 of the electronic device 2600 may move second objects to the second page based on a usage frequency of at least one application respectively corresponding to the second objects. For example, the control unit 210 of the electronic device 2600 may move, to the second page, a second object corresponding to an application of which a usage frequency is relatively low. Referring to FIG. 26A, when an application corresponding to a second object 2601 has a lower usage frequency than that of any one of applications corresponding to the second objects 2602, 2604, 2606, and 2608, the control unit 210 of the electronic device 2600 may move the second object 2601 to the second page shown in FIG. 26B instead of one of the second objects 2602, 2604, 2606, and 2608. Referring to FIG. 26C, the control unit 210 of the electronic device 2600 may change the arrangement such that no second object is arranged in a first region 2624 and move some of the second objects on the first page to the second page as shown in FIG. 26D. However, the control unit 210 of the electronic device 2600 may move the second object 2601 in FIG. 26A to the second page based on usage frequencies of applications and arrange the second object 2604 of which a usage frequency is relatively high on the first page from among the second objects 2602, 2604, 2606, and 2608. Referring to FIGS. 26C and 26D, a second object 2634 corresponding to the second object 2604 is arranged on the first page such that the second object 2634 is arranged in a space in which the second object 2601 was arranged, and second objects 2631, 2632, 2636, and 2638 corresponding to the second objects 2601, 2602, 2606, and 2608 are arranged on the second page. That is, the control unit 210 of the electronic device 2600 may move not only second objects included in the first region 2614 to the second page but also second objects arranged in spaces other than the first region 2614 to second page based on a usage frequency.

Figure 27:
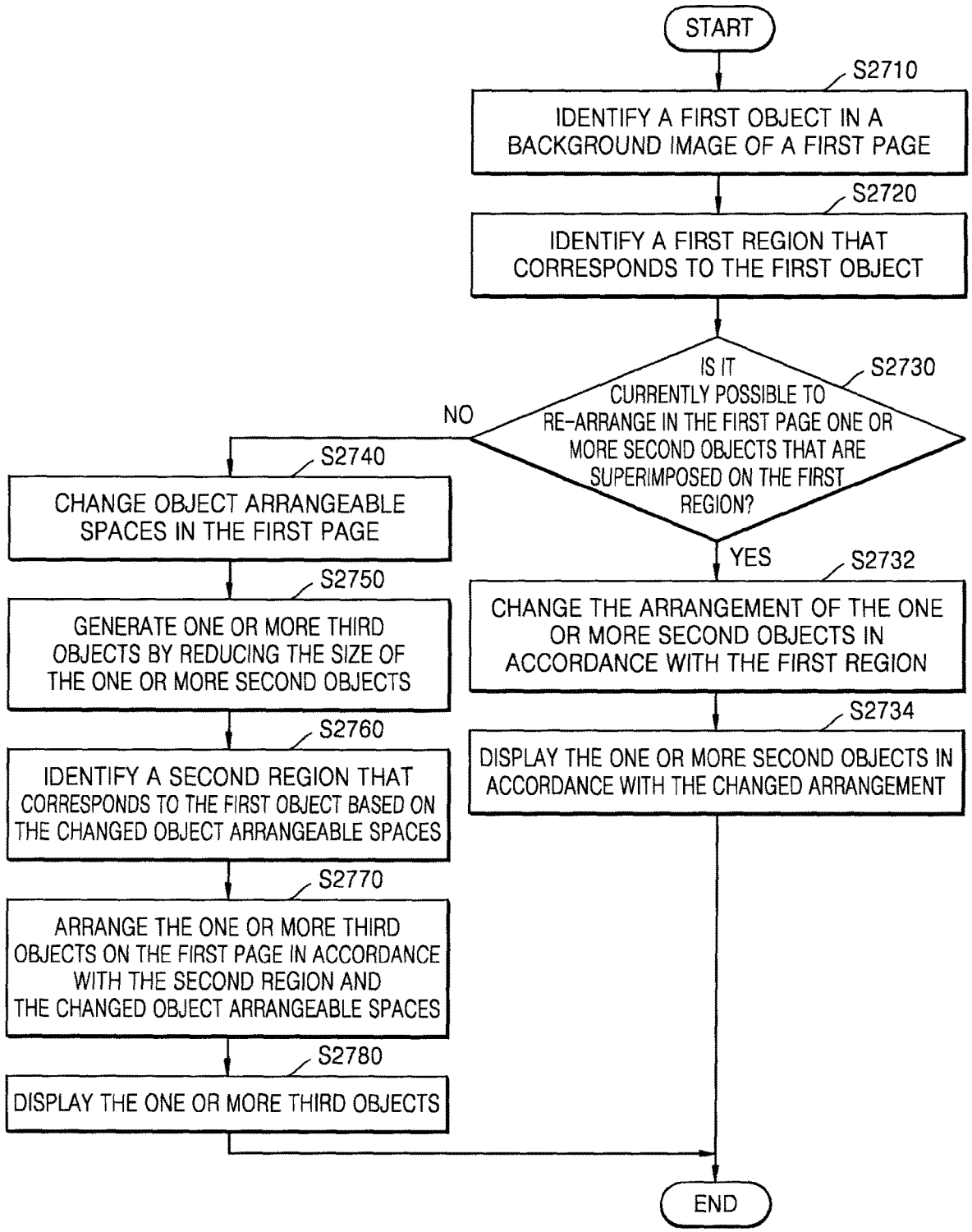
FIG. 27 is a flowchart of an example of a process, according to aspects of the disclosure.

FIG. 27 illustrates a flowchart of an object arrangement method of changing an arrangement by changing sizes of second objects to generate third objects therefrom. In detail, FIG. 27 illustrates a method of changing an arrangement by changing a number arrangeable on one page of a home screen by using third objects obtained by reducing sizes of second objects.

Figure 28A:
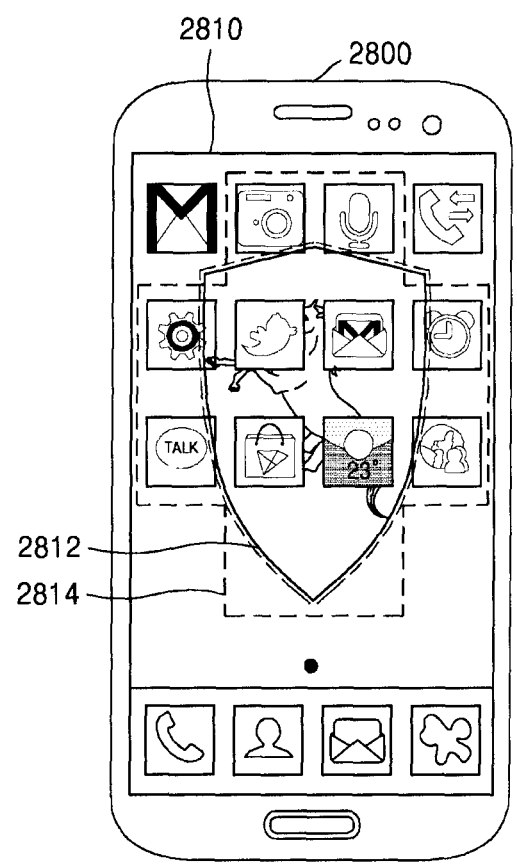
FIG. 28A is a diagram of an example of a user interface, according to aspects of the disclosure.

In operation S2710, the control unit 210 of the electronic device 200 may identify a first object in a background image of a first page. A detailed description thereof may correspond to operation S410 of FIG. 4 and is thus omitted herein. An electronic device 2800 of FIG. 28A may correspond to the electronic device 200 of FIG. 2. Referring to FIG. 28A, the control unit 210 of the electronic device 2800 may detect a first object 2812 included in a background image 2810.

In operation S2720, the control unit 210 of the electronic device 200 may identify a first region that corresponds to the first object. A detailed description thereof may correspond to operation S420 of FIG. 4 and is thus omitted herein. According to an embodiment, Referring to FIG. 28A, the control unit 210 of the electronic device 2800 may determine a first region 2814 corresponding to the first object 2812.

In operation S2730, the control unit 210 of the electronic device 200 may. detect whether it is currently possible to re-arrange, in the first page, one or more second objects that are superimposed on the first region. By way of example, the control unit 210 may detect whether there is enough room in the first page to relocate the one or more second objects to positions in the first page where the one or more second objects would not overlap with the first region. According to an embodiment, the electronic device 200 may configure at least one page related to the background image. When all the second objects can be re-arranged on the first page, the control unit 210 of the electronic device 200 may change the arrangement of the one or more second objects in accordance with the first region, in operation S2732. A detailed description thereof may correspond to operation S430 of FIG. 4 and is thus omitted herein. In operation S2734, the control unit 210 of the electronic device 200 may control the display unit 220 to display the one or more second objects in accordance with the changed arrangement. A detailed description thereof may correspond to operation S440 of FIG. 4 and is thus omitted herein.

Figure 28B:
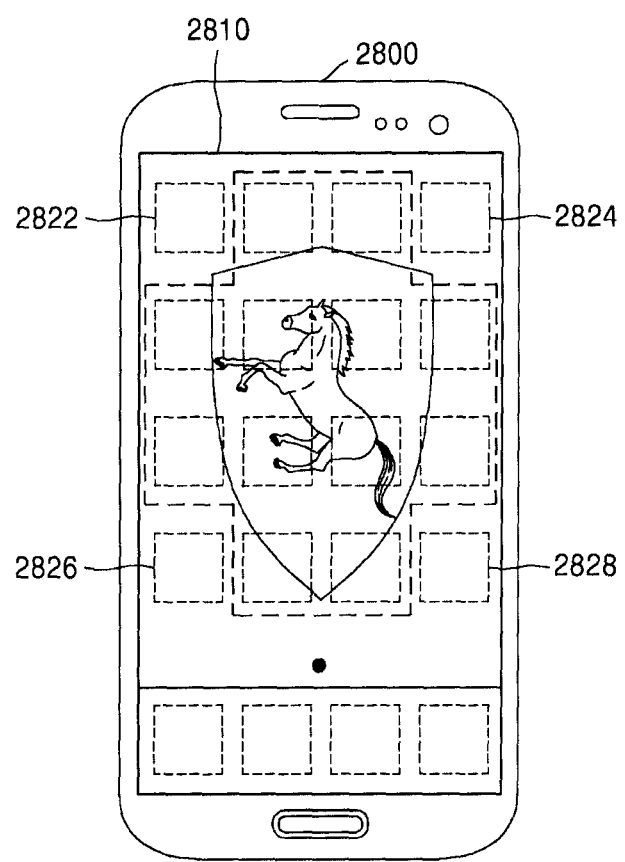
FIG. 28B is a diagram of an example of a user interface, according to aspects of the disclosure.

The electronic device 2800 of FIGS. 28A and 28B may correspond to the electronic device 200 of FIG. 2. Referring to FIG. 28A, according to an embodiment, 10 second objects including icons may be arranged in object arrangeable spaces included in the first region 2814 of the electronic device 2800. In this case, the 10 second objects are supposed to be arranged in spaces other than the first region 2814. However, since only four object arrangeable spaces 2822, 2824, 2826, and 2828 exist as the spaces other than the first region 2814 at present as shown in FIG. 28B, the control unit 210 of the electronic device 2800 may be in a state where 12 icons that are second objects currently displayed on the first page cannot be arranged in the first page.

As shown in FIG. 28A, when the control unit 210 of the electronic device 2800 detects that it cannot re-arrange, on the first page, the one or more second objects on the first page, the method proceeds to operation S2740. In operation S2740, the control unit 210 of the electronic device 200 may change the set of object arrangeable spaces that is associated with the first page. According to aspects of the disclosure, changing the object arrangeable spaces may include making each of the object arrangeable spaces smaller. According to an embodiment, the control unit 210 of the electronic device 200 may change the number of object arrangeable spaces to be provided on each page and may, for example, increase the number of object arrangeable spaces for each page. In detail, the control unit 210 of the electronic device 200 may increase the number of object arrangeable spaces for each page by reducing sizes of the object arrangeable spaces or changing intervals between the object arrangeable spaces, wherein object arrangeable spaces having the reduced sizes are for third objects.

Figure 29A:
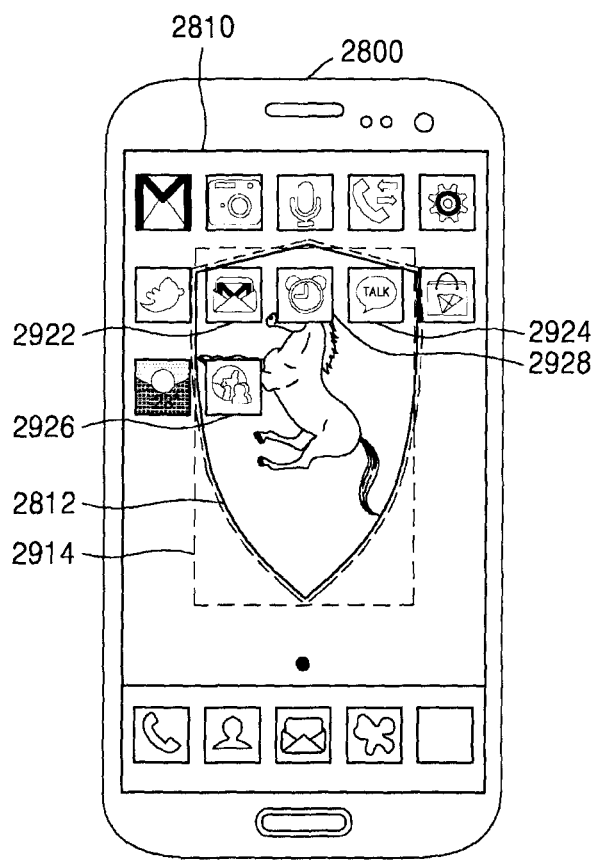
FIG. 29A is a diagram of an example of a user interface, according to aspects of the disclosure.
Figure 29B:
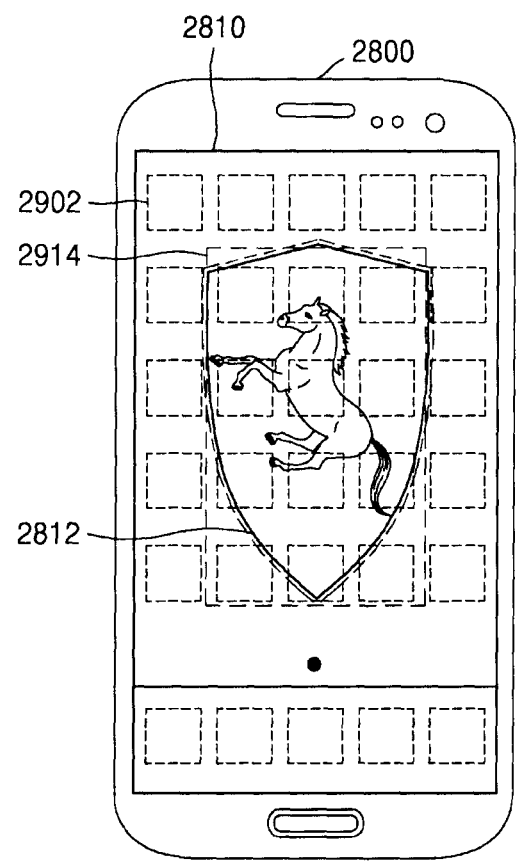
FIG. 29B is a diagram of an example of a user interface, according to aspects of the disclosure.

Referring to FIG. 28A, the control unit 210 of the electronic device 2800 may determine the first region 2814 by undergoing operations S2710 and S2720. Referring to FIGS. 28B and 29B, the control unit 210 of the electronic device 2800 may increase the number of object arrangeable spaces for each page. The electronic device 2800 of FIGS. 29A, 29B, and 29C may correspond to the electronic device 200 of FIG. 2. Operation S2740 of changing the number of object arrangeable spaces may be an operation of changing an arrangement such as a matrix in which at least one icon, widget, or the like corresponding to at least one application is arrangeable. For example, referring to FIG. 28B, object arrangeable spaces are provided in a form of a matrix having four rows and four columns on each page of the electronic device 2800, but after operation S2740, object arrangeable spaces may be provided in a form of a matrix having five rows and five columns as shown in FIG. 29B.

In operation S2750, the control unit 210 of the electronic device 200 may generate third objects by changing reducing the sizes of (some or all) second objects that are presented in the first page. According to an embodiment, the third objects may be smaller than the second objects. Referring to FIG. 29A, third objects obtained by reducing sizes of second objects are arranged in object arrangeable spaces of which sizes have been changed as well on the background image 2810.

In operation S2760, the control unit 210 of the electronic device 200 may identify a second region that corresponds to the first region. The second region may be identified based on the changed object arrangeable spaces. In detail, referring to FIG. 29B, the control unit 210 of the electronic device 2800 may determine a second region 2914 overlapping the first object 2812 based on object arrangeable spaces having reduced sizes such as an object arrangeable space 2902. An operation of determining the second region 2914 may be similar to operation S2720 of determining the first region 2814 but differs from operation S2720 in that the second region 2914 is determined using the changed object arrangeable spaces unlike the first region 2814.

Figure 29C:
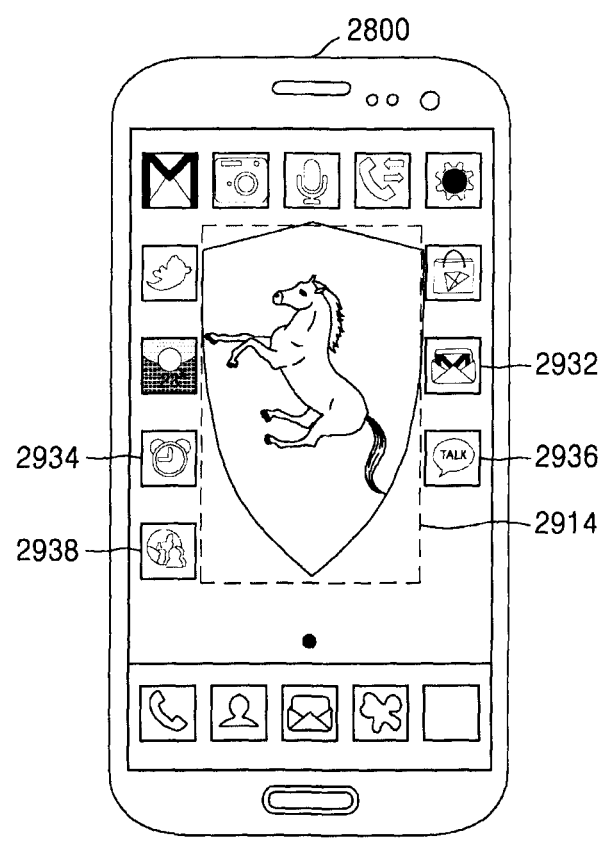
FIG. 29C is a diagram of an example of a user interface, according to aspects of the disclosure.

In operation S2770, the control unit 210 of the electronic device 200 may arrange the third objects in the first page in accordance with the second region and the changed object arrangeable spaces. That is, the third objects may be arranged in the changed arrangement. In detail, referring to FIG. 29A, third objects 2922, 2924, 2926, and 2928 hide the first object 2812. Referring to FIG. 29B, the control unit 210 of the electronic device 2800 may determine the second region 2914 corresponding to the first object 2812 included in the background image 2810. Referring to FIGS. 29A and 29C, the control unit 210 of the electronic device 2800 may arrange, in object arrangeable spaces which are not included in the second region 2914, the third objects 2922, 2924, 2926, and 2928 included in the second region 2914.

In operation S2780, the control unit 210 of the electronic device 200 may control the display unit 220 to display the third objects. Referring to FIG. 29C, the third objects 2922, 2924, 2926, and 2928 are arranged such that the third objects 2922, 2924, 2926, and 2928 are not included in the second region 2914. Although an arrangement cannot be changed to display all the second objects on the first page related to the background image 2810 based on the first region 2814, the electronic device 2800 may display all objects on the first page by using third objects, which are obtained by reducing sizes of the second objects, and changing object arrangeable spaces even without newly generating a second page besides the first page by using the object arrangement method of FIG. 27.

Figure 30:
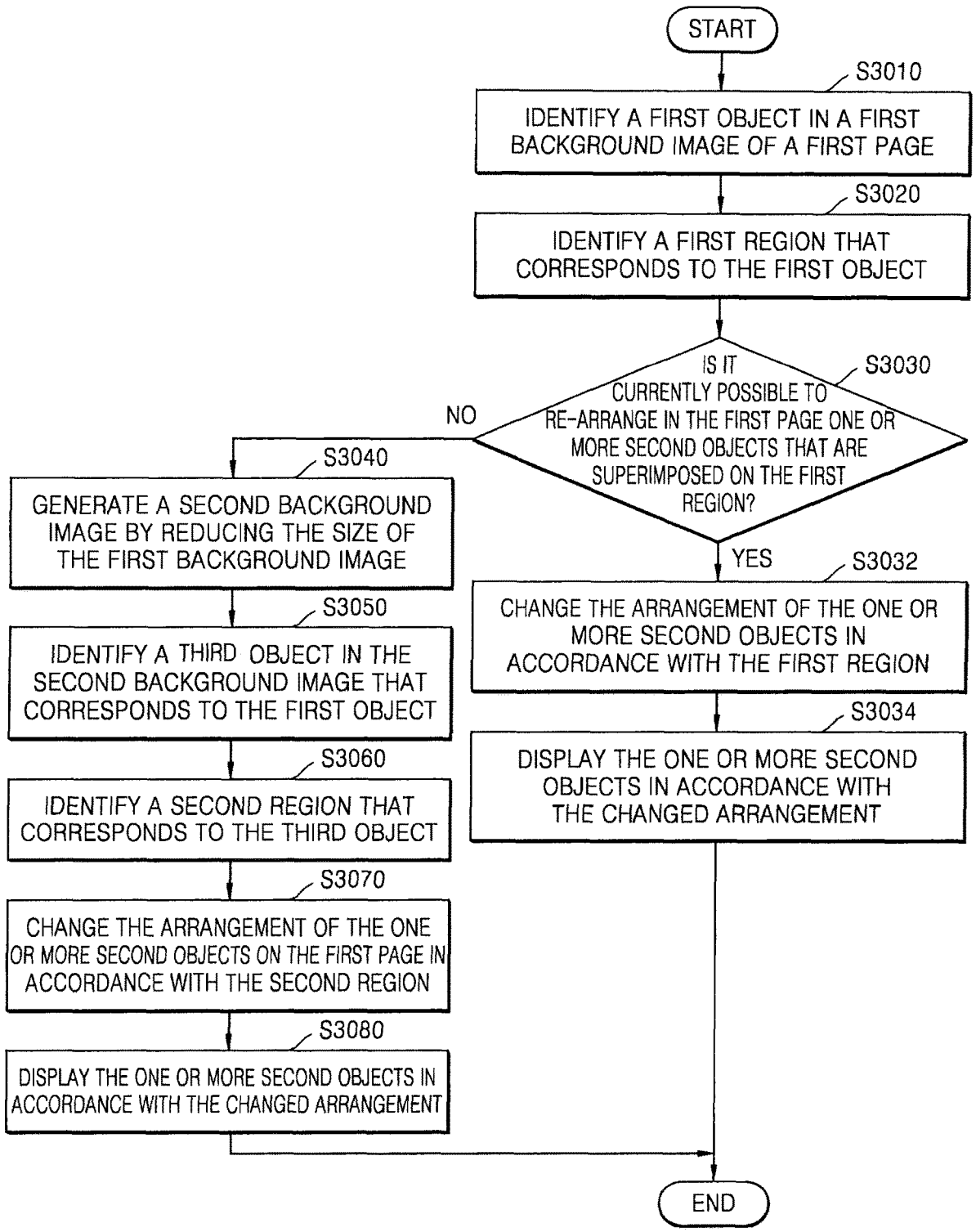
FIG. 30 is a flowchart of an example of a process, according to aspects of the disclosure.

FIG. 30 is a flowchart of an example of a process, according to aspects of the disclosure. According to the process, an electronic device may generate a second background image by reducing a size of a first background image, and changing an arrangement of second objects while displaying a third background image including the second background image as a background of a home screen. The first background image may correspond to a background image before the arrangement of the second objects is changed. The electronic device 200 may configure at least one page related to the first background image. In detail, when an arrangement of second objects arranged on a first page related to the first background image, if all of the second objects cannot be arranged on the first page because of a size of a first object included in the first background image of the electronic device 200, all of the second objects may be arranged on the first page by reducing a size of the first background image.

Figure 31A:
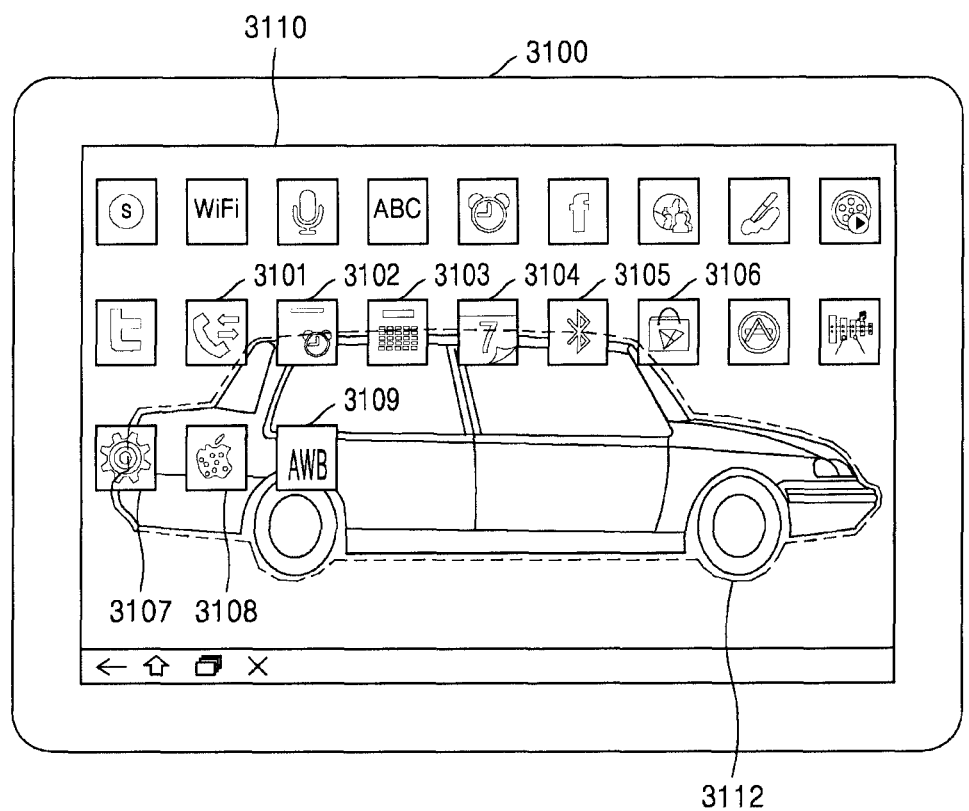
FIG. 31A is a diagram of an example of a user interface, according to aspects of the disclosure.
Figure 31B:
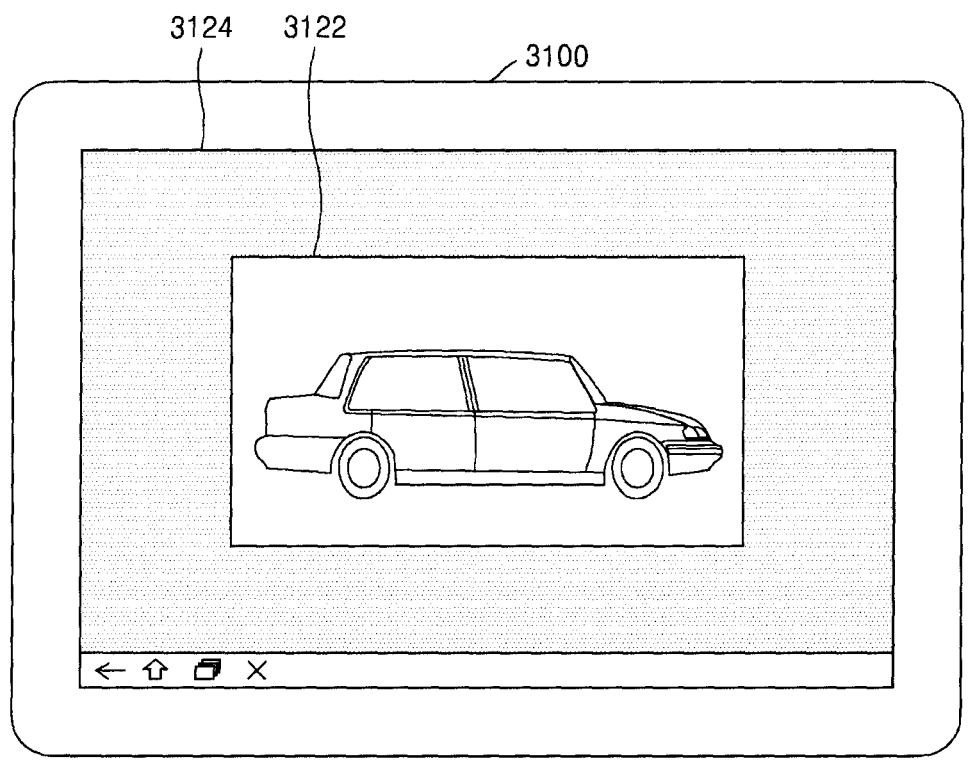
FIG. 31B is a diagram of an example of a reduced background image, according to aspects of the disclosure.

In operation S3010, the control unit 210 of the electronic device 200 may identify a first object in a first background image of a first page. FIGS. 31A and 31B illustrate an operation of generating, by an electronic device 3100, a second background image 3122 by reducing a size of a first background image 3110 including a first object 3112 and generating a third background image 3124 including the second background image 3122. The electronic device 3100 of FIGS. 31A and 31B may correspond to the electronic device 200 of FIG. 2. Referring to FIG. 31A, the control unit 210 of the electronic device 3100 may detect the first object 3112 included in the first background image 3110 of the electronic device 3100. An arrangement of second objects 3101, 3102, 3103, 3104, 3105, 3106, 3107, 3108, and 3109 hiding the detected first object 3112 needs to be changed such that the second objects 3101, 3102, 3103, 3104, 3105, 3106, 3107, 3108, and 3109 do not hide the first object 3112. A detailed description thereof may correspond to operation S410 of FIG. 4 and is thus omitted herein.

Figure 32A:
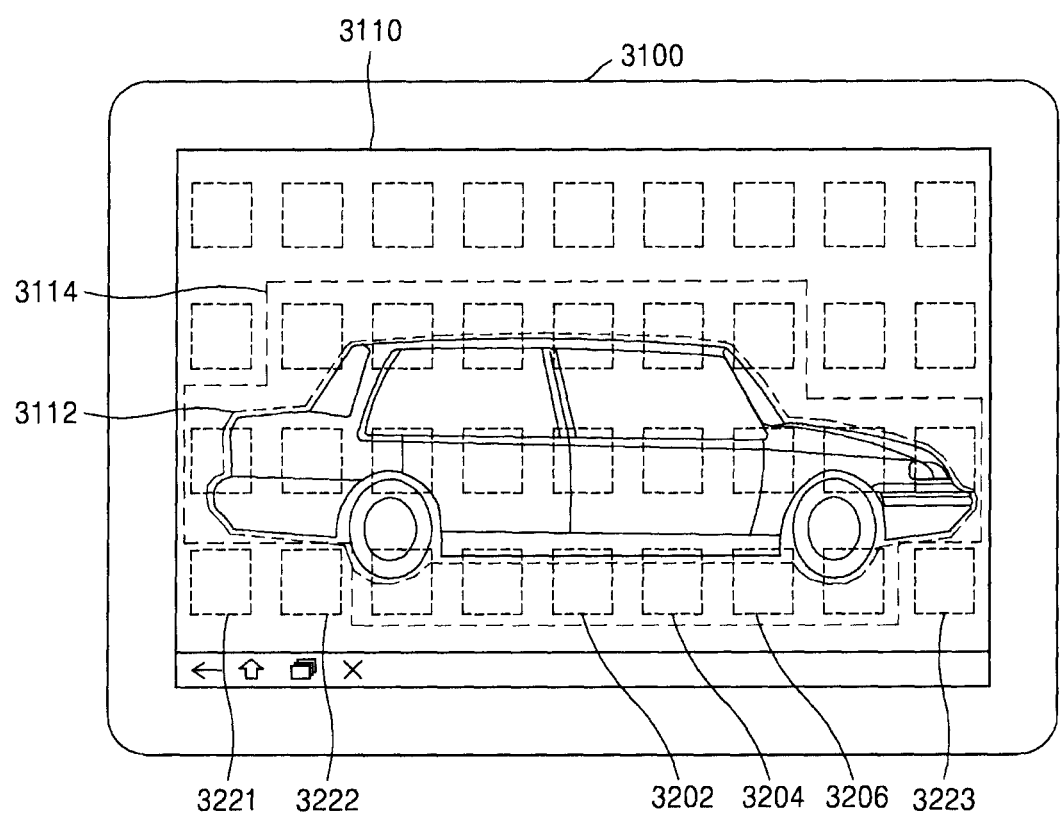
FIG. 32A is a diagram of an example of a user interface, according to aspects of the disclosure.

In operation S3020, the control unit 210 of the electronic device 200 may identify a first region corresponding to the first object. A detailed description thereof may correspond to operation S420 of FIG. 4 and is thus omitted herein. Referring to FIG. 32A, the control unit 210 of the electronic device 3100 may determine a first region 3114 corresponding to the first object 3112. The first region 3114 may include object arrangeable spaces (e.g., reference signs 3202, 3204, and 3206) in which second objects are arrangeable.

In operation S3030, the control unit 210 of the electronic device 200 may detect whether it is currently possible to re-arrange, in the first page, one or more second objects that are superimposed on the first region. By way of example, the control unit 210 may detect whether there is enough room in the first page to relocate the one or more second objects to positions in the first page where the one or more second objects would not overlap with the first region.

According to an embodiment, when the one or more second objects can be re-arranged in the first page, the control unit 210 of the electronic device 200 may change the arrangement of the one or more second objects in the first page in accordance with the first region in operation S3032. A detailed description thereof may correspond to operation S430 of FIG. 4 and is thus omitted herein. In operation S3034, the control unit 210 of the electronic device 200 may control the display unit 220 to display the one or more second objects in accordance with the changed arrangement. A detailed description thereof may correspond to operation S440 of FIG. 4 and is thus omitted herein.

In operation 3040, when the one or more second objects cannot be re-arranged in the first page, the control unit 210 of the electronic device 200 may generate the second background image by reducing a size of the first background image including the at least one first object. Referring to FIGS. 31A and 32A, the control unit 210 of the electronic device 3100 may change an arrangement of the second objects 3101, 3102, 3103, 3104, 3105, 3106, 3107, 3108, and 3109 included in the first region 3114 corresponding to the first object 3112 such that the second objects 3101, 3102, 3103, 3104, 3105, 3106, 3107, 3108, and 3109 are arranged in other object arrangeable spaces. However, when taking into account the first region 3114 and the second objects 3101, 3102, 3103, 3104, 3105, 3106, 3107, 3108, and 3109 before changing the arrangement, object arrangeable spaces in which the second objects 3101, 3102, 3103, 3104, 3105, 3106, 3107, 3108, and 3109 included in the first region 3114 are arrangeable are only three object arrangeable spaces 3221, 3222, and 3223. In this case, the second objects 3101, 3102, 3103, 3104, 3105, 3106, 3107, 3108, and 3109 may be arranged by generating at least one new page besides the first page related to the first background image of the electronic device 3100. However, referring to FIG. 32B, according to an embodiment, the second background image 3122 may be generated by reducing a size of the first background image 3110 to arrange, on the first page, all of the second objects 3101, 3102, 3103, 3104, 3105, 3106, 3107, 3108, and 3109 included in the first region 3114. Furthermore, the third background image 3124 including the second background image 3122 may be generated to meet resolution of the display unit 220 of the electronic device 3100.

Figure 32B:
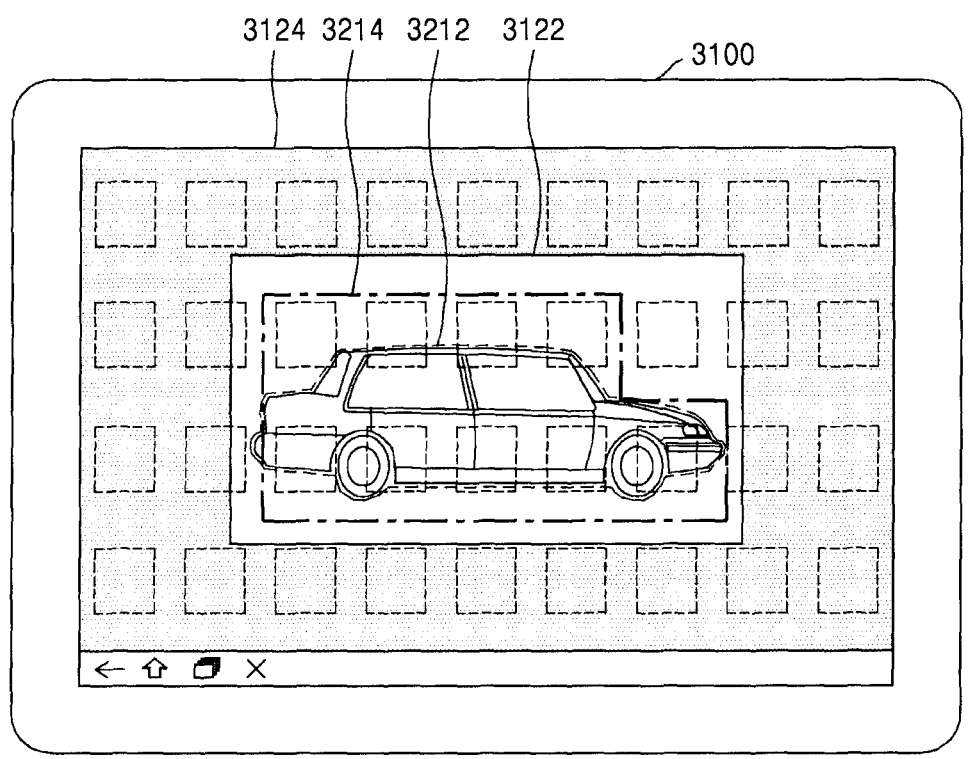
FIG. 32B is a diagram of an example of a reduced background image, according to aspects of the disclosure.

In operation S3050, the control unit 210 of the electronic device 200 may identify a third object in the second background image that corresponds to the first object. Referring to FIG. 32B, a third object 3212 included in the third background image 3124, which corresponds to the first object 3112 included in the first background image 3110, may be detected. A size of the third object 3212 may be smaller than that of the first object 3112.

In operation S3060, the control unit 210 of the electronic device 200 may identify a second region corresponding to the third object. When comparing a size of the first region 3114 of FIG. 32A with a size of a second region 3214 of FIG. 32B, the size of the second region 3214 may be smaller than that of the first region 3114. That is, the number (e.g., 9) of object arrangeable spaces included in the second region 3214 may be less than the number (e.g., 21) of object arrangeable spaces included in the first region 3114.

In operation S3070, the control unit 210 of the electronic device 200 may change the arrangement of the one or more second objects in accordance with the second region.

Figure 33A:
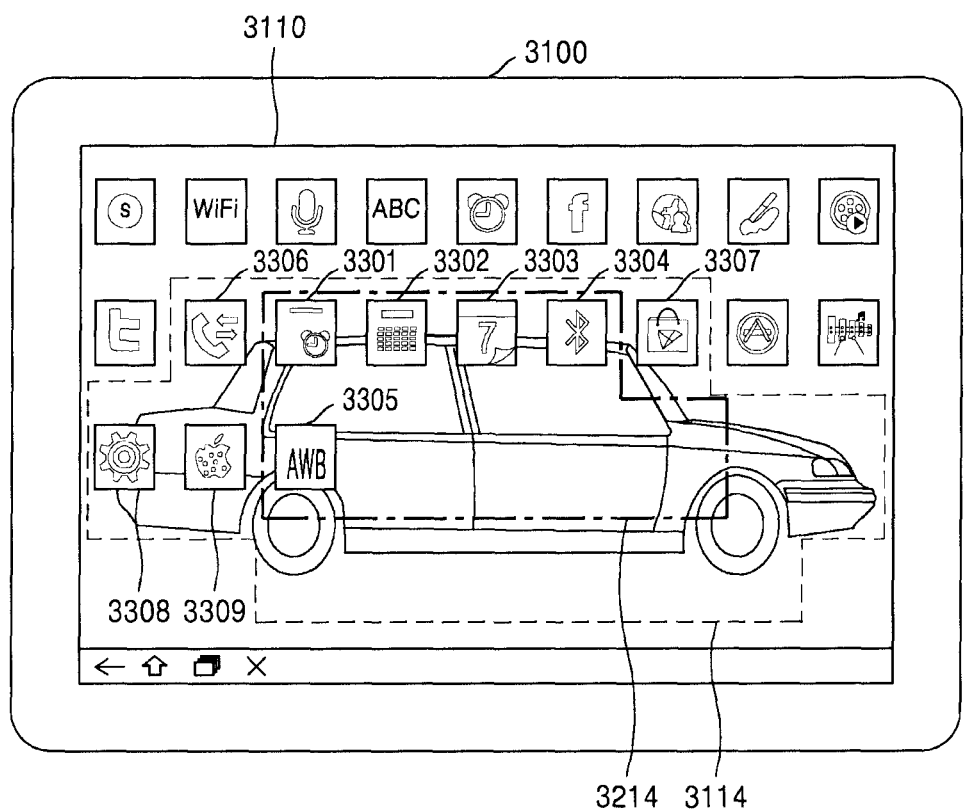
FIG. 33A is a diagram of an example of a user interface, according to aspects of the disclosure.
Figure 33B:
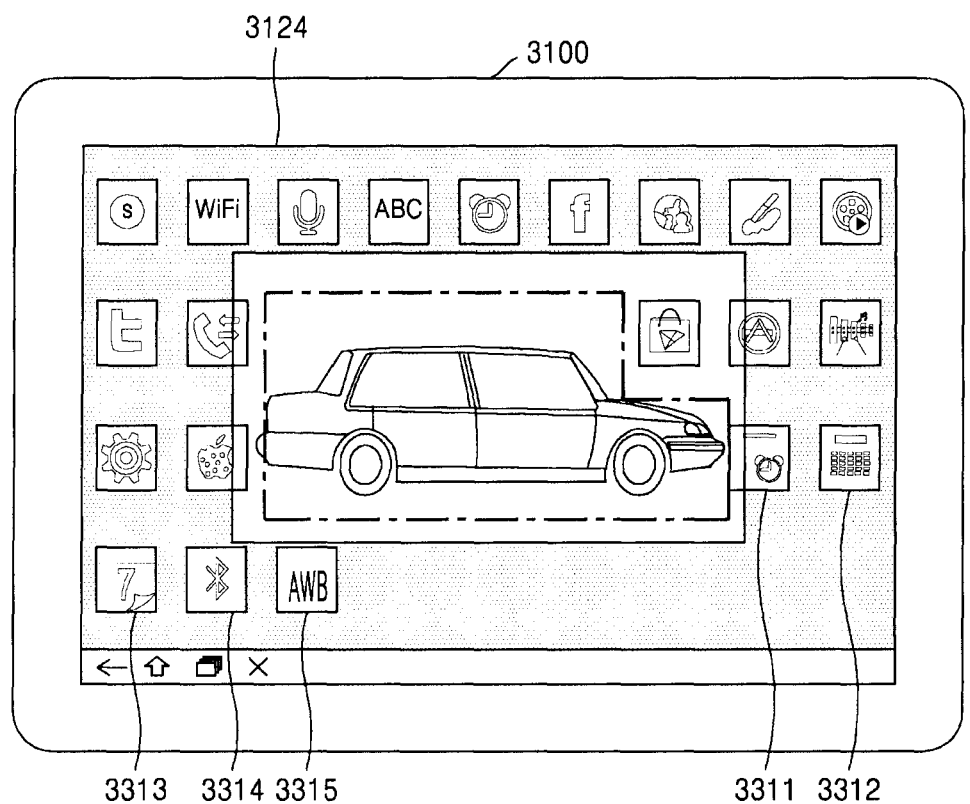
FIG. 33B is a diagram of an example of a reduced background image, according to aspects of the disclosure.

FIGS. 33A and 33B provide a comparison between second objects displayed before the electronic device 3100 changes the arrangement and the second objects displayed based on the at least one third object. Referring to FIG. 33A before changing the arrangement, some of the second objects 3101, 3102, 3103, 3104, 3105, 3106, 3107, 3108, and 3109 arranged in the first region 3114 cannot be arranged in a region other than the first region 3114. However, by using the object arrangement method of FIG. 30, the control unit 210 of the electronic device 3100 may change an arrangement such that all second objects are arrangeable on the first page without arranging any second object in the second region 3214 as a result of changing the arrangement of the second objects based on the second region 3214. As a result, referring to FIG. 33A, only second objects 3301, 3302, 3303, 3304, and 3305 included in the second region 3214 among second objects 3301, 3302, 3303, 3304, 3305, 3306, 3307, 3308, and 3309 included in the first region 3114 of the electronic device 3100 before changing the arrangement may be arranged in other spaces.

In operation S3080, the control unit 210 of the electronic device 200 may control the display unit 220 to display the second objects in accordance with the changed arrangement. According to an embodiment, referring to FIG. 33B, the control unit 210 of the electronic device 3100 may control the display unit 220 to display second objects 3311, 3312, 3313, 3314, and 3315 originally included in the second region 3214 such that the second objects 3311, 3312, 3313, 3314, and 3315 are not included in the second region 3214 based on the changed arrangement and to display the third background image 3124 including the second background image 3122.

Figure 34:
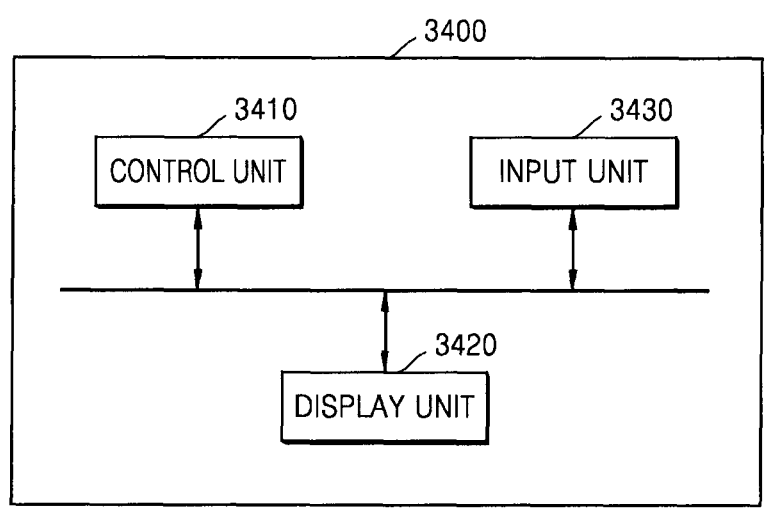
FIG. 34 is a diagram of an example of an electronic device, according to aspects of the disclosure.

FIG. 34 illustrates a block diagram of an electronic device 3400 according to another embodiment of the inventive concept. Referring to FIG. 34, unlike the electronic device 200 of FIG. 2, the electronic device 3400 may further include an input unit 3430. A control unit 3410 of FIG. 34 may correspond to the control unit 210 of FIG. 2, and a display unit 3420 of FIG. 34 may correspond to the display unit 220 of FIG. 2. The input unit 3430 of FIG. 34 may correspond to the input unit 350 of FIG. 3.

Figure 35:
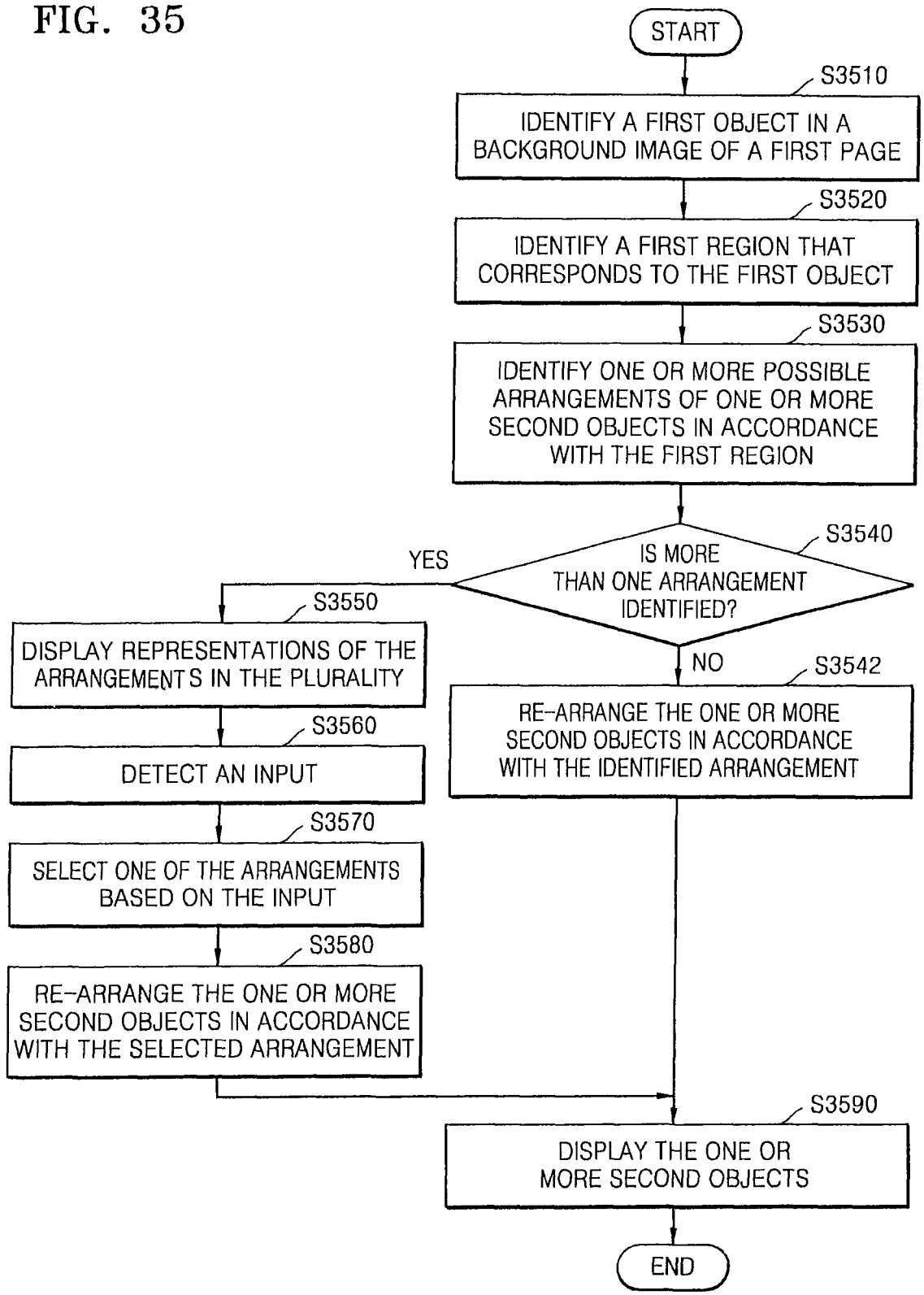
FIG. 35 is a flowchart of an example of a process, according to aspects of the disclosure.

FIG. 35 is a flowchart of an example of a process, according to aspects of the disclosure.

In operation S3510, the control unit 3410 of the electronic device 3400 may identify at least one first object in a background image of a first page. A detailed description thereof may correspond to operation S410 of FIG. 4 and is thus omitted herein.

In operation S3520, the control unit 3410 of the electronic device 3400 may identify at least one first region corresponding to the at least one first object. A detailed description thereof may correspond to operation S420 of FIG. 4 and is thus omitted herein.

In operation S3530, the control unit 3410 of the electronic device 3400 may identify one or more possible arrangement of one or more second objects that overlap with the first region.

In operation S3540, the control unit 3410 of the electronic device 3400 may determine whether more than one arrangement is identified. If only one arrangement is identified, the control unit 3410 of the electronic device 3400 may re-arrange the one or more second objects in accordance with the identified arrangement, in operation S3542. A detailed description thereof may correspond to operation S430 of FIG. 4 and is thus omitted herein.

If multiple arrangements are identified, the control unit 3410 of the electronic device 3400 may control the display unit 3420 to display respective representations of the plurality of arrangements in operation S3550. According to an embodiment, a plurality of arrangements may exist according to which object is included as a first object in the background image.

Figure 36A:
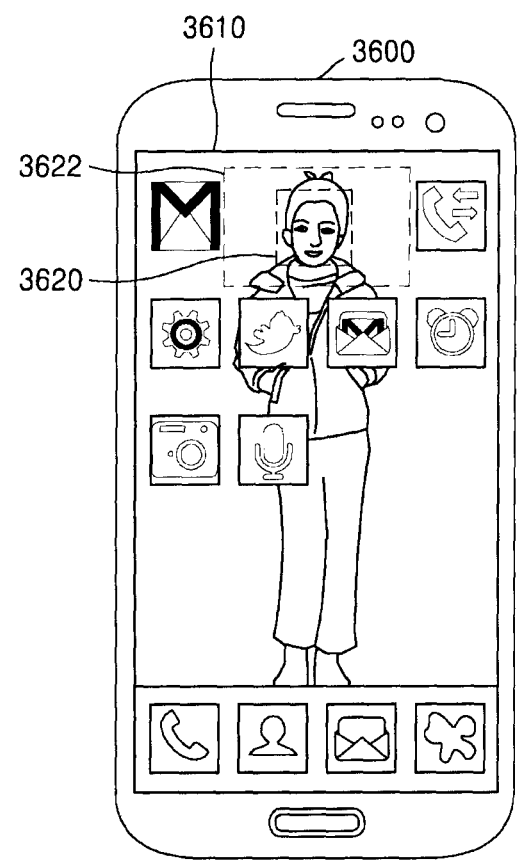
FIG. 36A is a diagram of an example of a user interface, according to aspects of the disclosure.
Figure 36B:
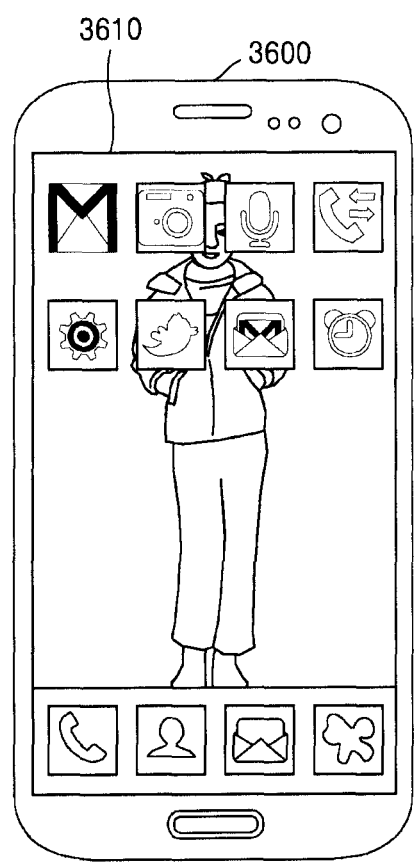
FIG. 36B is a diagram of an example of a user interface, according to aspects of the disclosure.
Figure 36C:
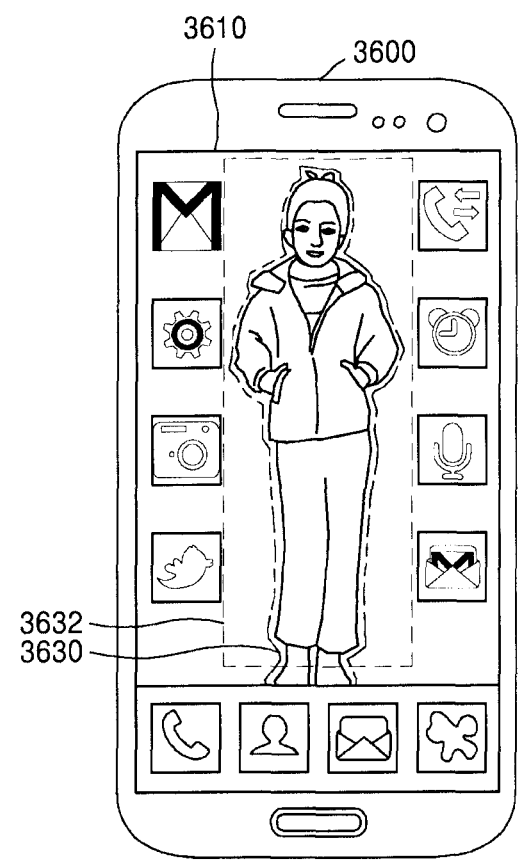
FIG. 36C is a diagram of an example of a user interface, according to aspects of the disclosure.

FIGS. 36A, 36B, and 36C illustrate cases where a plurality of arrangements of second objects are changeable by an electronic device 3600. Referring to FIG. 36A, a person may be included as a first object included in a background image 3610 of the electronic device 3600. When a person is included as the first object, a face area recognized using the face recognition function may be detected as the first object as in the object arrangement method described with reference to FIG. 16. Referring to FIG. 36B, the control unit 3410 of the electronic device 3600 may detect a face area 3620 as the first object from the background image 3610 and determine a first region 3622 corresponding to the face area 3620. An operation of detecting the face area 3620 may correspond to operation S1610 of FIG. 16, and an operation of determining the first region 3622 corresponding to the detected face area 3620 may correspond to operation S1620 of FIG. 16, and thus, a detailed description thereof is omitted herein. Referring to FIG. 36C, the control unit 3410 of the electronic device 3600 may detect a first object 3630 included in the background image 3610, and in this case, unlike FIG. 36A, the first object 3630 may be detected using an object segmentation technique, e.g., an edge-based segmentation technique, a histogram-based segmentation technique, or the like without using the face recognition function. A detailed description thereof may correspond to operation S410 of FIG. 4 and is thus omitted herein. In FIG. 36C, the control unit 3410 of the electronic device 3600 may detect the whole body of the person included in the background image 3610 as the first object 3630. Furthermore, the control unit 3410 of the electronic device 3600 may determine a first region 3632 corresponding to the first object 3630, and a detailed description thereof may correspond to operation S420 of FIG. 4 and is thus omitted herein.

Figure 37A:
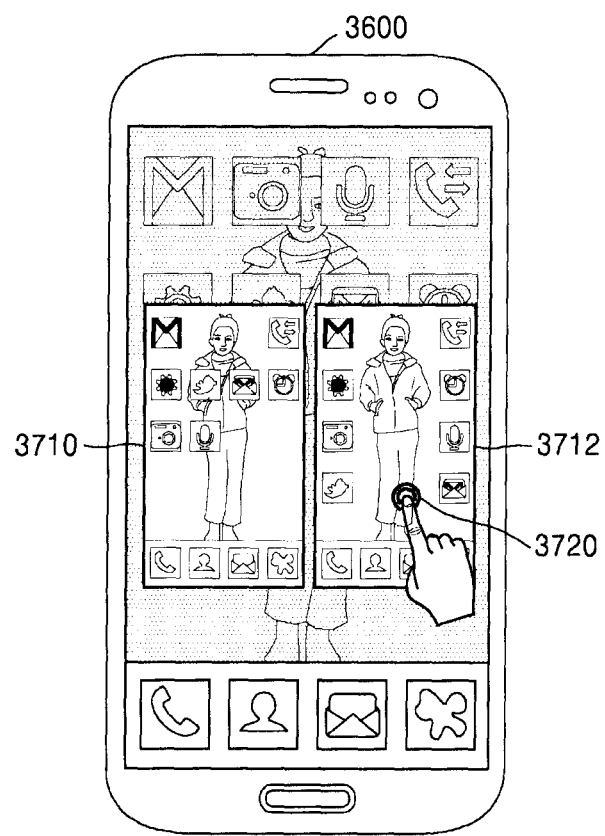
FIG. 37A is a diagram of an example of a user interface, according to aspects of the disclosure.

FIG. 37A illustrates an operation of displaying, by the electronic device 3600, a plurality of changeable arrangements on the display unit 3420, selecting one of the plurality of changeable arrangements based on a first input, and arranging second objects in the selected arrangement. Referring to FIG. 37A, the control unit 3410 of the electronic device 3600 may control the display unit 3420 to display a plurality of arrangements of second objects based on the background image 3610 corresponding to FIGS. 36B and 36C. The control unit 3410 of the electronic device 3600 may control the display unit 3420 to display an arrangement 3710 corresponding to FIG. 36B and an arrangement 3712 corresponding to FIG. 36C thereon.

In operation S3560, the control unit 3410 of the electronic device 3400 may detect a first input.

In operation S3570, the control unit 3410 of the electronic device 3400 may select one of the plurality of arrangements based on the first input received in operation S3560. According to an embodiment, referring to FIG. 37A, when the input unit 3430 of the electronic device 3600 is the touch panel 354, if the electronic device 3600 receives, as the first input, a touch signal 3720 through the arrangement 3712 on the display unit 3420 of the electronic device 3600, the arrangement 3712 may be selected an arrangement to be changed.

In operation S3580, the control unit 3410 of the electronic device 3400 may re-arrange the one or more second objects in accordance with the selected arrangement. A detailed description thereof may correspond to operation S430 of FIG. 4 and is thus omitted herein.

Figure 37B:
FIG. 37B is a diagram of an example of a reduced background image, according to aspects of the disclosure.

In operation S3590, the control unit 3410 of the electronic device 3400 may control the display unit 3420 to display the second objects. FIG. 37B illustrates an operation of arranging the second objects in the selected arrangement. Referring to FIG. 37B, the control unit 3410 of the electronic device 3600 may control the display unit 3420 to arrange and display the second objects according to the arrangement changed in operation S3580.

Figure 38:
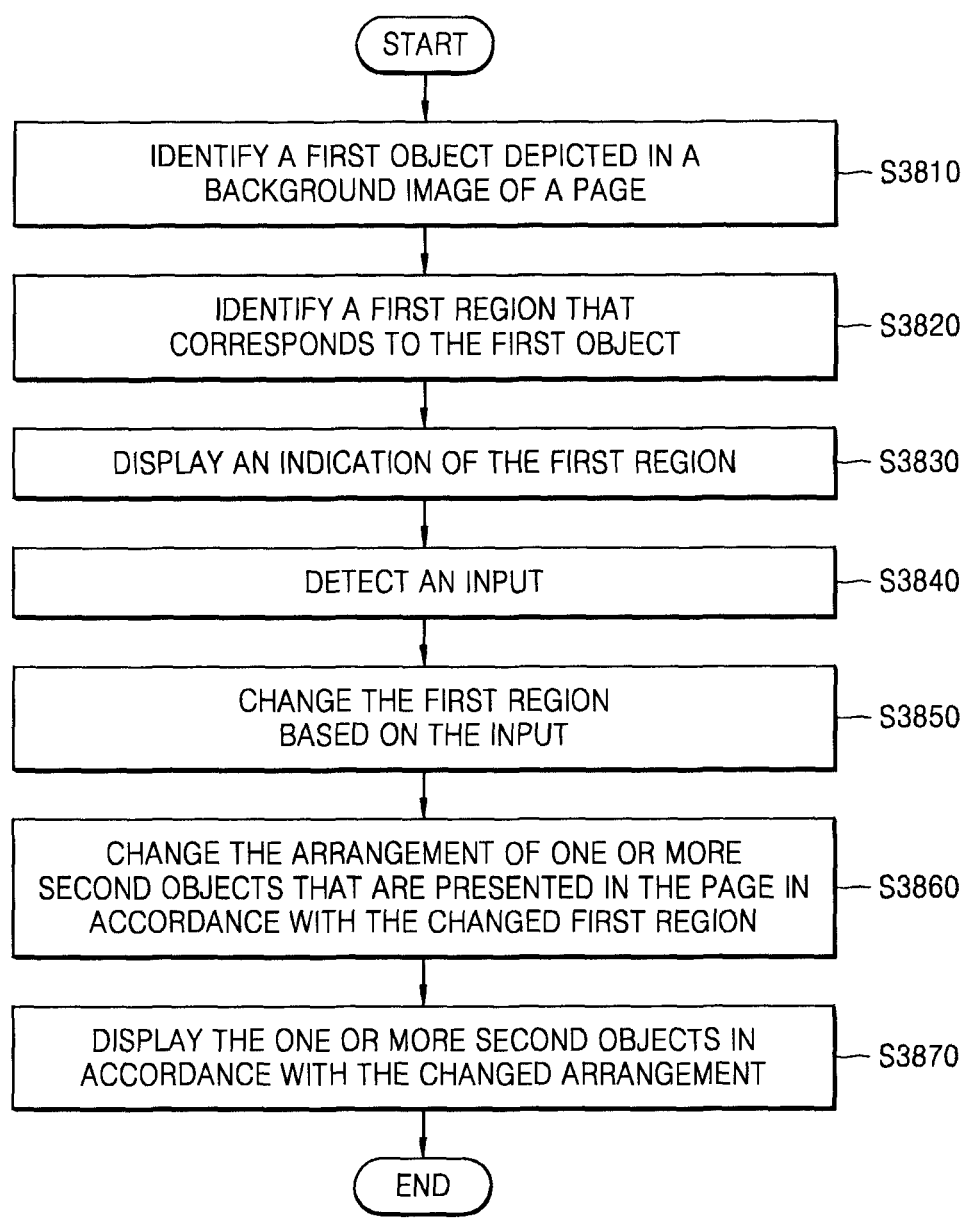
FIG. 38 is a flowchart of an example of a process, according to aspects of the disclosure.

FIG. 38 is a flowchart of an example of a process, according to aspects of the disclosure.

In operation S3810, the control unit 3410 of the electronic device 3400 may identify at least one first object in a background image. A detailed description thereof may correspond to operation S410 of FIG. 4 and is thus omitted herein.

In operation S3820, the control unit 3410 of the electronic device 3400 may identify at least one first region corresponding to the at least one first object. A detailed description thereof may correspond to operation S420 of FIG. 4 and is thus omitted herein.

Figure 39A:
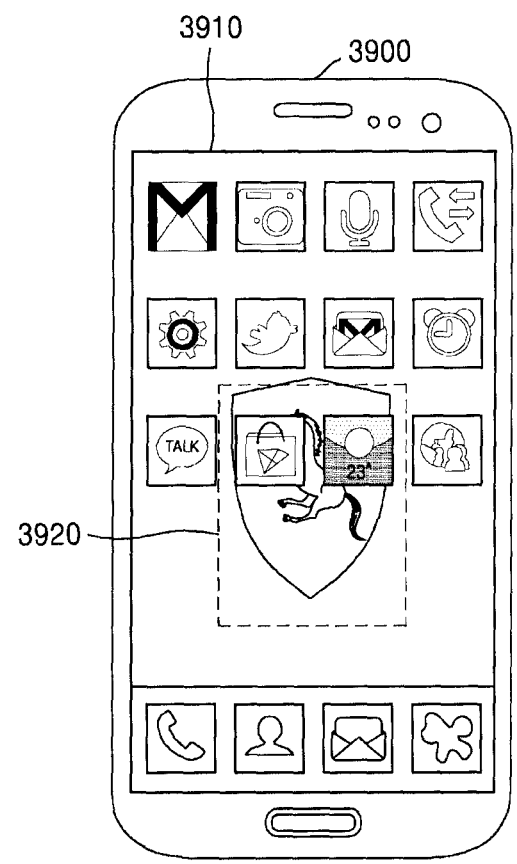
FIG. 39A is a diagram of an example of a user interface, according to aspects of the disclosure.
Figure 39B:
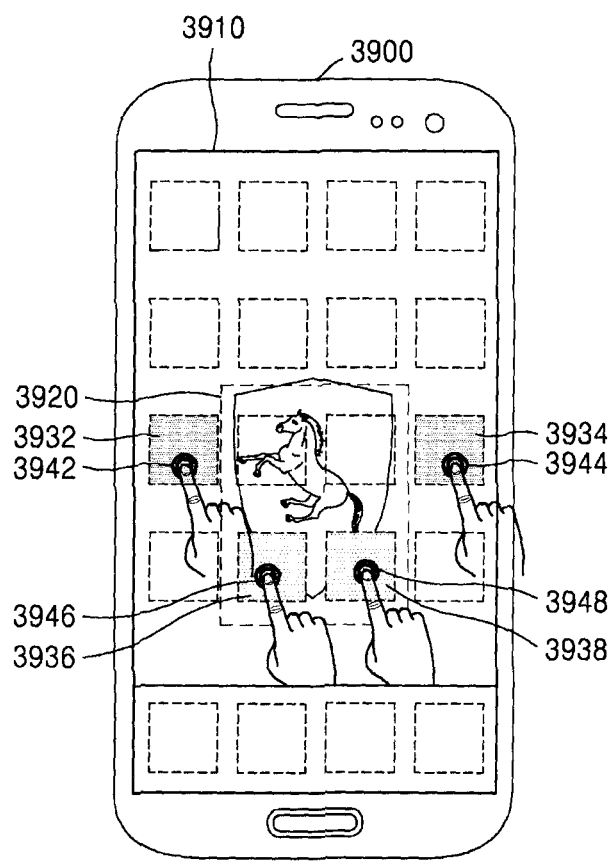
FIG. 39B is a diagram of an example of a user interface, according to aspects of the disclosure.
Figure 39C:
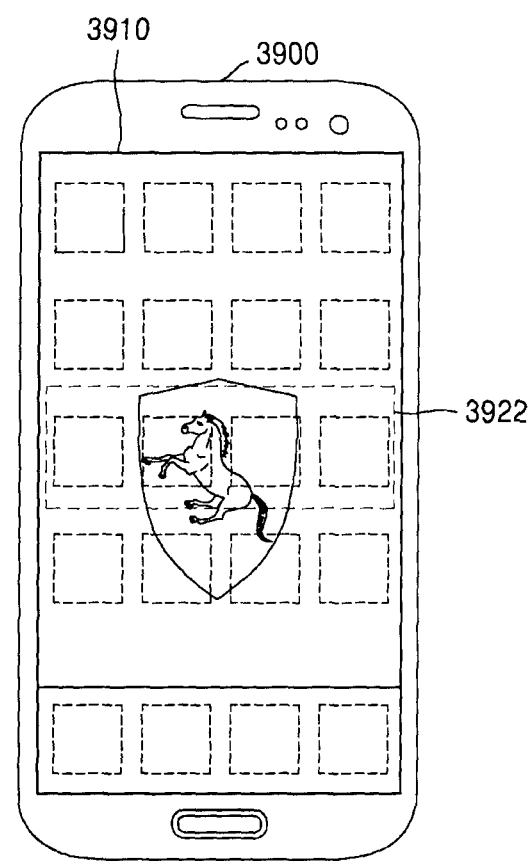
FIG. 39C is a diagram of an example of a user interface, according to aspects of the disclosure.

In operation S3830, the control unit 3410 of the electronic device 3400 may control the display unit 3420 to display an indication of the first region. FIGS. 39A, 39B, and 39C illustrate an operation of changing, by an electronic device 3900, an arrangement of second objects by changing a first region 3920 based on a second input. Referring to FIG. 39A, the control unit 3410 of the electronic device 3900 may control the display unit 3420 to display the first region 3920 determined in operation S3820. According to an embodiment, the second objects may not be displayed in operation S3830. Through this, a user may accurately change the first region 3920 according to which portion of a background image 3910 is not hidden while checking the display unit 3420 of the electronic device 3900.

In operation S3840, the control unit 3410 of the electronic device 3400 may detect an input.

In operation S3850, the control unit 3410 of the electronic device 3400 may change the first region based on the input. According to an embodiment, referring to FIG. 39B, when the input unit 3430 of the electronic device 3900 is the touch panel 354, if second inputs 3942 and 3944 are respectively received by touching object arrangeable spaces 3932 and 3934 other than the first region 3920 on the display unit 3420 of the electronic device 3900, the control unit 3410 of the electronic device 3900 may extend the first region 3920 up to regions corresponding to the touched object arrangeable spaces 3932 and 3934. In contrast, if second inputs 3946 and 3948 are respectively received by touching object arrangeable spaces 3936 and 3938 in the first region 3920 on the display unit 3420 of the electronic device 3900, the control unit 3410 of the electronic device 3900 may exclude regions corresponding to the touched object arrangeable spaces 3936 and 3938 from the first region 3920. According to an embodiment, a form of a second input may be a click, a drag, a button click, or the like but is not limited thereto. Referring to FIG. 39C, the control unit 3410 of the electronic device 3900 may determine a first region 3922 changed to have a different shape based on the second inputs 3942, 3944, 3946, and 3948.

In operation S3860, the control unit 3410 of the electronic device 3400 may change an arrangement of the one or more second objects based on the changed first region.

Figure 40A:
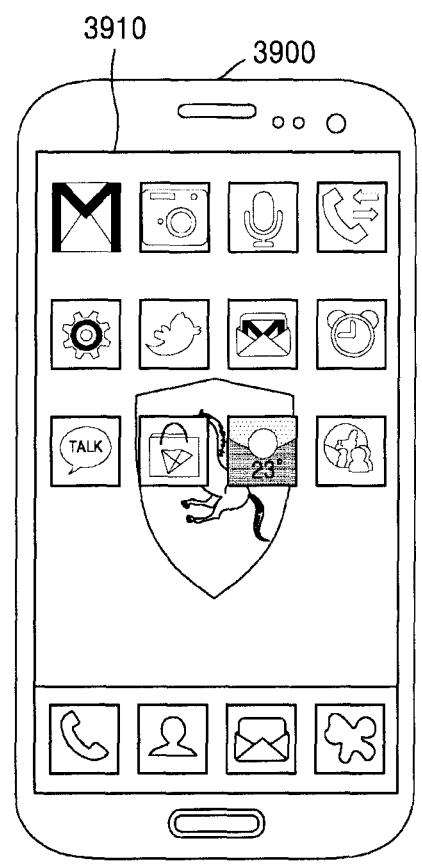
FIG. 40A is a diagram of an example of a user interface, according to aspects of the disclosure.
Figure 40B:
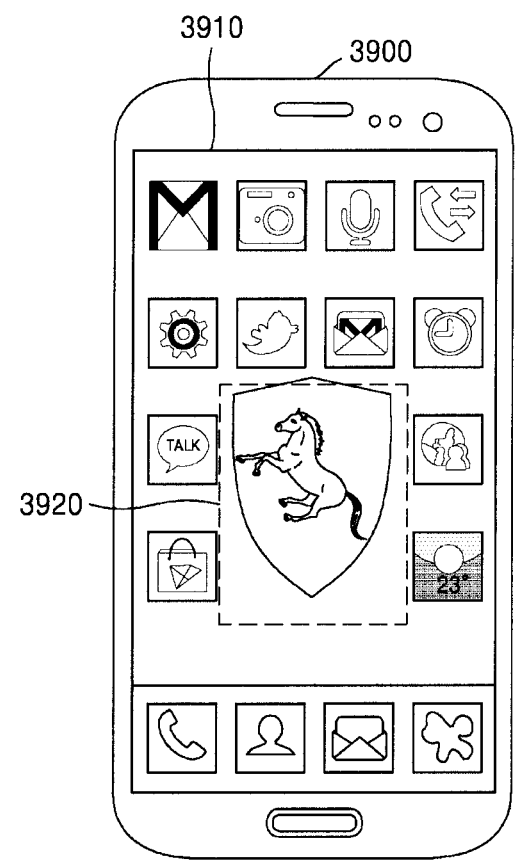
FIG. 40B is a diagram of an example of a user interface, according to aspects of the disclosure.
Figure 40C:
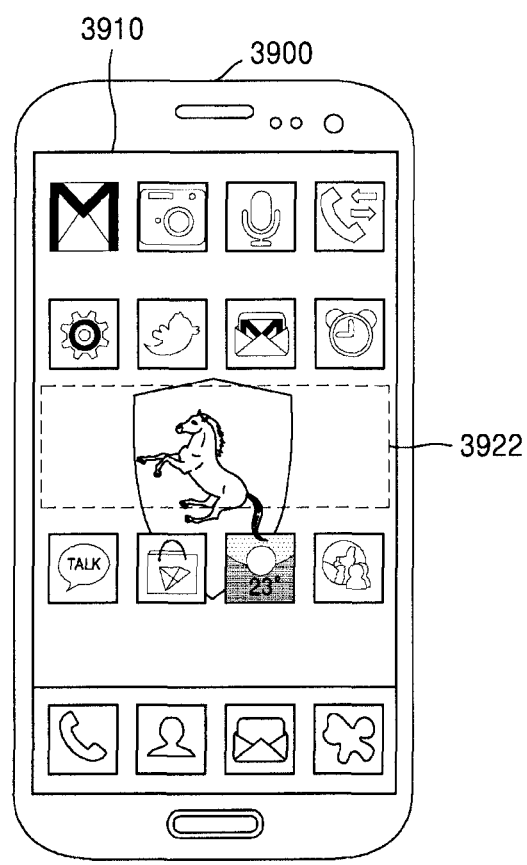
FIG. 40C is a diagram of an example of a user interface, according to aspects of the disclosure.

In operation S3870, the control unit 3410 of the electronic device 3400 may control the display unit 3420 to display the one or more second objects in accordance with the changed arrangement. FIGS. 40A, 40B, and 40C provide a comparison between a result obtained by the electronic device 3900 by changing the first region 3920 based on a second input to change an arrangement of second objects and a result obtained by the electronic device 3900 by changing the arrangement of the second objects without receiving the second input. According to an embodiment, the electronic device 3900 may arrange the second objects as shown in FIG. 40A before changing the arrangement of the second objects. Without changing the first region 3920 based on the second inputs 3942, 3944, 3946, and 3948, the electronic device 3900 may arrange the second objects in the arrangement as shown in FIG. 40B. However, according to an embodiment, the control unit 3410 of the electronic device 3900 may control the display unit 3420 to display the second objects according to the arrangement determined in operation S3860. FIG. 40C illustrates the electronic device 3900 on which the arrangement of the second objects is changed and displayed based on a changed first region 3922.

Figure 41A:
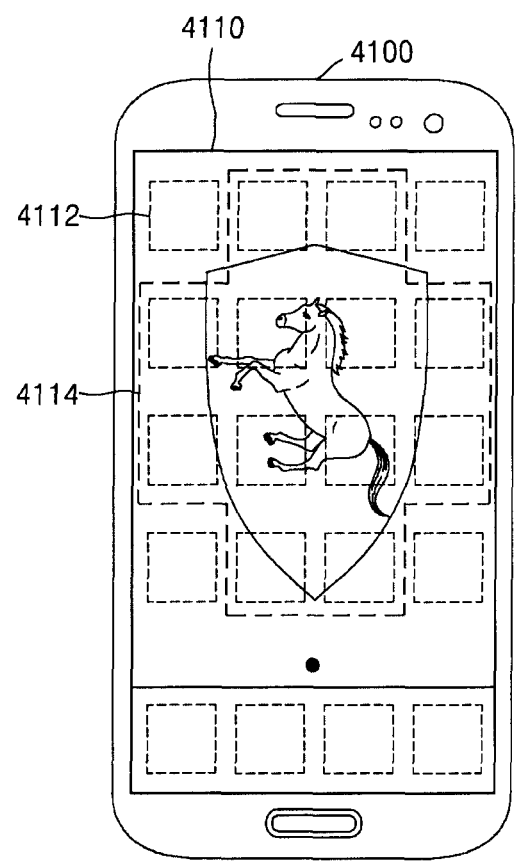
FIG. 41A is a diagram of an example of a user interface, according to aspects of the disclosure.
Figure 41B:
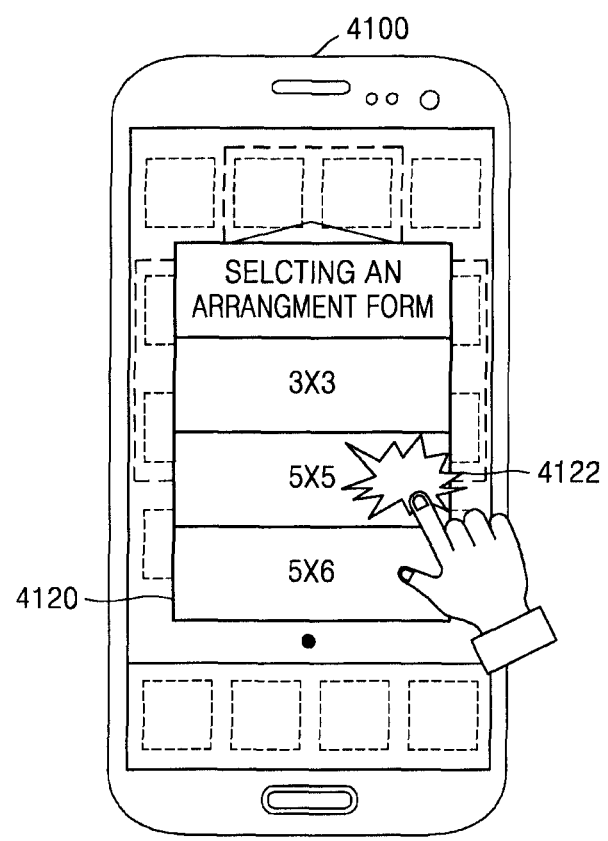
FIG. 41B is a diagram of an example of a user interface, according to aspects of the disclosure.
Figure 41C:
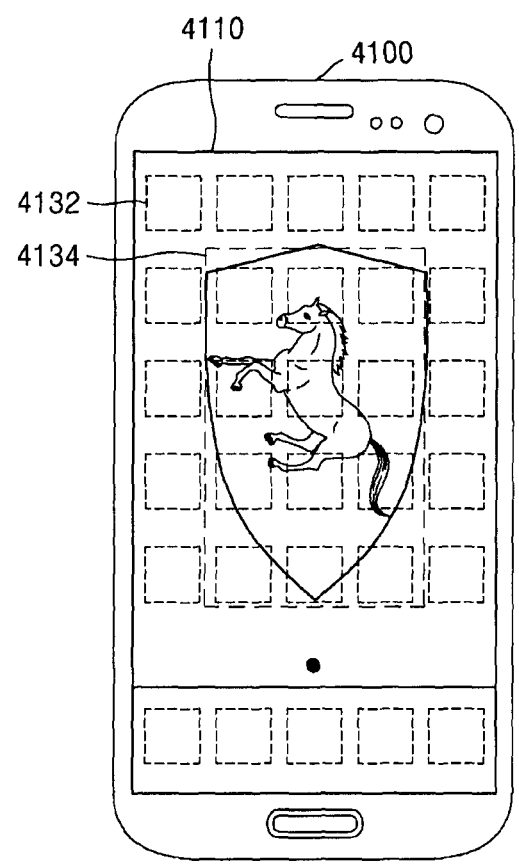
FIG. 41C is a diagram of an example of a user interface, according to aspects of the disclosure.

In an embodiment, the electronic device 3400 may receive an external input, change the number of object arrangeable spaces based on the received external input, and change an arrangement of second objects based on the changed object arrangeable spaces. FIGS. 41A, 41B, and 41C illustrate an operation of changing an arrangement of object arrangeable spaces for each page based on an external input. Referring to FIGS. 41A, 41B, and 41C, an electronic device 4100 may receive an external input through the input unit 3430, and the control unit 3410 may change object arrangeable spaces based on the received external input. The electronic device 4100 of FIGS. 41A, 41B, and 41C may correspond to the electronic device 3400 of FIG. 34. For example, the electronic device 4100 may determine an arrangement of object arrangeable spaces based on an external input, change a size of each object arrangeable space based on an external input, and change the number of object arrangeable spaces for each page based on an external input. If the number of second objects is large, the electronic device 4100 may change object arrangeable spaces such that a greater number of second objects is arrangeable on one page by increasing the number of second objects arrangeable for each page. The electronic device 4100 may automatically change object arrangeable spaces to a form in which a greater number of second objects are arrangeable. Alternatively, the electronic device 4100 may receive an external input and change a form of object arrangeable spaces based on the received external input. For example, when the electronic device 4100 changes an arrangement of second objects, if all the second objects cannot be arranged on one page, the electronic device 4100 may change an arrangement of object arrangeable spaces such that the second objects are arrangeable. A detailed operation thereof may correspond to operations S2710 to S2780 of FIG. 27. However, in operation S2740, the electronic device 4100 may receive an external input to change object arrangeable spaces on a first page. Referring to FIG. 41A, the electronic device 4100 may determine a first region 4114 corresponding to non-arrangeable spaces due to a first background image 4110 among object arrangeable spaces including reference sign 4112. A method of determining the first region 4114 may correspond to operations S410 and S420 of FIG. 4, and thus a detailed description thereof is omitted. Referring to FIG. 41B, in an embodiment, the electronic device 4100 may receive an external input 4122 through the input unit 3430 to change object arrangeable spaces. The electronic device 4100 may display a list 4120 of changeable arrangements to change an arrangement of object arrangeable spaces, and the control unit 3410 may select one arrangement from the list 4120 based on the external input 4122. If the control unit 3410 of the electronic device 4100 selects an object arrangement as an arrangement having five rows and five columns based on the external input 4122, the control unit 3410 may change the object arrangeable spaces in the arrangement having five rows and five columns as shown FIG. 41C. When the arrangement of the object arrangeable spaces is changed, both a size of each of the object arrangeable spaces and the arrangement may be changed or only the arrangement may be changed without changing the size. Unlike FIG. 41A, the electronic device 4100 may determine a new first region 4134 based on the changed arrangement of object arrangeable spaces. Therefore, the electronic device 4100 may provide further various arrangements of icons or the like by changing object arrangeable spaces based on the external input 4122 and determining the first region 4134 based on the changed object arrangeable spaces.

The inventive concept may be implemented by storing computer-readable codes in a non-transitory computer-readable storage medium. The non-transitory computer-readable storage medium is any data storage device that stores data which may be thereafter read by a computer system.

The computer-readable codes are configured to execute operations of implementing the object arrangement methods according to the inventive concept when the computer-readable codes are read, from the non-transitory computer-readable storage medium, and executed by a processor. The computer-readable codes may be implemented by various programming languages. And the functional programs, codes and code segments for embodying the inventive concept may be easily construed by programmers in the art which the inventive concept belongs to.

FIGS. 1-41C are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
  a display unit for displaying a background image and a second object on a first page, the second object is arranged in a matrix including a plurality of rows and columns;
  an input device; and
  at least one processor configured to:
    identify a first object depicted in the background image,
    identify a first region corresponding to the first object,
    when a first number of the rows or a second number of the columns of the matrix overlapping the first region is lower than or equal to a predefined number:
      detect whether it is possible to relocate the second object to a first position on the first page where the second object would not overlap with the first object, and
      relocate the second object to the first position on the first page or a second page where the second object does not overlap with the first object based on the detection result,
    when the first number of the rows or the second number of the columns exceeds the predefined number:
      identify a contour line of the first object, and
      relocate the second object to a second position on the first page where the second object does not overlap with the contour line but does overlap with remaining portions of the first object.

2. The electronic device of claim 1, wherein relocating the second object to the first page or the second page comprises:
  relocate the second object to the second page.

3. The electronic device of claim 1, wherein the at least one processor is further configured to:
  in response to detection, via the input device, of a first input outside the first region and on a first arrangeable space for the second object, extend the first region to include the first arrangeable space, in response to detection, via the input device, of a second input inside the first region and on a second arrangeable space for the second object, reduce the first region to exclude the second arrangeable space.

4. The electronic device of claim 1, wherein identifying the first object includes identifying an in-focus portion of the background image.

5. The electronic device of claim 1, wherein identifying the first object includes identifying a face depicted in the background image.

6. The electronic device of claim 1, wherein identifying the first object includes identifying one or more characters depicted in the background image.

7. The electronic device of claim 1, wherein relocating the second object to the first page or the second page comprises:
relocate the second object to a position of a third object, the third object having a lower usage frequency than the second object, and
relocate the third object to the second page.

8. The electronic device of claim 1, wherein the second page is generated in response to detecting that relocating the second object to the position on the first page is not possible.

9. The electronic device of claim 1, wherein:
the at least one processor is further configured to display a list identifying at least two arrangements of the first page, and detect, via the input device, a third input selecting one of the arrangements, and
the second object is relocated in accordance with the selected arrangement.

10. The electronic device of claim 1, wherein relocating the second object includes:
scaling down the background image to generate a reduced background image that depicts the first object,
replacing the background image with the reduced background image in the first page, and
moving the second object to the position on the first page where the second object does not overlap with the first object.

11. The electronic device of claim 1, wherein:
the at least one processor is further configured to concurrently display representations corresponding to at least two possible arrangements of the first page, and detect, via the input device, a third input selecting one of the representations, and
the second object is relocated in accordance with the arrangement corresponding to the selected representation.

12. A method comprising:
displaying, by an electronic device, a background image and a second object on a first page, the second object is arranged in a matrix including a plurality of rows and columns;
identifying, by the electronic device, a first object depicted in the background image;
identifying, by the electronic device, a first region corresponding to the first object;
when a first number of the rows or a second number of the columns of the matrix overlapping the first region is lower than or equal to a predefined number:
detecting whether it is possible to relocate the second object to a first position on the first page where the second object would not overlap with the first object, and
relocating, by the electronic device, the second object to the first position on the first page or a second page where the second object does not overlap with the first object based on the detection result; and
when the first number of the rows or the second number of the columns exceeds the predefined number:
identifying a contour line of the first object, and
relocating the second object to a second position on the first page where the second object does not overlap with the contour line but does overlap with remaining portions of the first object.

13. The method of claim 12, wherein relocating the second object to the first page or the second page comprises:
relocating the second object to the second page.

14. The method of claim 12, further comprising:
in response to detecting a first input outside the first region and on a first arrangeable space for the second object, extending the first region to include the first arrangeable space; and
in response to detecting a second input inside the first region and on a second arrangeable space for the second object, reducing the first region to exclude the second arrangeable space.

15. The method of claim 12, wherein identifying the first object includes identifying an in-focus portion of the background image.

16. The method of claim 12, wherein identifying the first object includes identifying a face depicted in the background image.

17. The method of claim 12, wherein identifying the first object includes identifying one or more characters depicted in the background image.

18. The method of claim 12, wherein relocating the second object to the first page or the second page comprises:
relocating the second object to a position of a third object, the third object having a lower usage frequency than the second object, and
relocating the third object to the second page.

19. The method of claim 12, wherein the second page is generated in response to detecting that relocating the second object to the position on the first page is not possible.

20. The method of claim 12, further comprising:
displaying a list identifying at least two arrangements of the first page; and
detecting a third input selecting one of the arrangements, the second object being relocated in accordance with the selected arrangement.

21. The method of claim 12, wherein relocating the second object includes:
scaling down the background image to generate a reduced background image that depicts the first object,
replacing the background image with the reduced background image in the first page, and
moving the second object to the position on the first page where the second object does not overlap with the first object.

22. The method of claim 12, further comprising:
concurrently displaying representations corresponding to least two possible arrangements of the first page; and
detecting a third input selecting one of the representations, the second object being relocated in accordance with the arrangement corresponding to the selected representation.

23. A non-transitory computer-readable recording medium having stored therein a computer-readable program for performing the method of claim 12.

* * * * *